US011649059B2

(12) United States Patent
Morrison

(10) Patent No.: US 11,649,059 B2
(45) Date of Patent: May 16, 2023

(54) INTEGRATED MULTIMODE THERMAL ENERGY TRANSFER SYSTEM, METHOD AND APPARATUS FOR CLEAN FUEL ELECTRIC MULTIROTOR AIRCRAFT

(71) Applicant: Alakai Technologies Corporation, Hopkinton, MA (US)

(72) Inventor: Brian D. Morrison, Hopkinton, MA (US)

(73) Assignee: Alakai Technologies Corporation, Stow, MA (US)

( * ) Notice: Subject to any disclaimer, the term of this patent is extended or adjusted under 35 U.S.C. 154(b) by 457 days.

(21) Appl. No.: 16/880,732

(22) Filed: May 21, 2020

(65) Prior Publication Data

US 2020/0391876 A1   Dec. 17, 2020

Related U.S. Application Data

(60) Provisional application No. 62/852,651, filed on May 24, 2019.

(51) Int. Cl.
*H02K 5/20* (2006.01)
*H02K 9/19* (2006.01)
(Continued)

(52) U.S. Cl.
CPC ............ *B64D 27/24* (2013.01); *B64D 33/08* (2013.01); *H01M 8/04029* (2013.01);
(Continued)

(58) Field of Classification Search
CPC ............ H02K 5/203; H02K 9/12; H02K 9/16; H02K 9/06
(Continued)

(56) References Cited

U.S. PATENT DOCUMENTS

2006/0237583 A1   10/2006   Fucke et al.
2007/0144183 A1*   6/2007   Sakajo .................. B60H 1/14
62/7
(Continued)

OTHER PUBLICATIONS

International Search Report from PCT/US2020/034075, dated Aug. 19, 2020.

*Primary Examiner* — Jose A Gonzalez Quinones
(74) *Attorney, Agent, or Firm* — Morse, Barnes-Brown & Pendleton, P.C.; Sean D. Detweiler, Esq.

(57) ABSTRACT

An integrated multimode thermal energy transfer system, method and apparatus for full-scale clean fuel electric-powered multirotor aircraft with automatic on-board-capability to provide sensor-based temperature awareness and adjustment to critical components and zones of the aircraft. Automatic computer monitoring, including by a programmed triple-redundant digital autopilot computer, controls each motor-controller and motor to produce pitch, bank, yaw and elevation, while simultaneously measuring, calculating, and adjusting temperature and heat transfer of aircraft components and zones, to protect critical components from exceeding operating parameters and to provide a safe, comfortable environment for occupants during flight. By using the results of the measurements to inform computer monitoring, the methods and systems can use byproducts including thermal energy disparities and differentials related to both fuel supply systems and power generating systems to both add and remove heat from different aircraft zones to improve aircraft function, comfort, and efficiency.

33 Claims, 27 Drawing Sheets

(51) Int. Cl.
  *B64D 27/24*   (2006.01)
  *B64D 33/08*   (2006.01)
  *H01M 10/613*   (2014.01)
  *H01M 8/04029*   (2016.01)
  *H01M 8/04082*   (2016.01)
  *B64D 13/06*   (2006.01)
  *B64D 45/00*   (2006.01)
  *B64C 29/00*   (2006.01)

(52) U.S. Cl.
  CPC ..... *H01M 8/04201* (2013.01); *H01M 10/613* (2015.04); *H02K 5/203* (2021.01); *H02K 9/19* (2013.01); *B64C 29/0025* (2013.01); *B64D 2013/0607* (2013.01); *B64D 2013/0611* (2013.01); *B64D 2045/0085* (2013.01)

(58) Field of Classification Search
  USPC .......................................... 310/53, 64, 68 B
  See application file for complete search history.

(56)     References Cited

U.S. PATENT DOCUMENTS

2008/0145731 A1*  6/2008  Sakajo .............. H01M 8/04014
                              429/442
2011/0126562 A1   6/2011  Dittmar et al.
2013/0340459 A1*  12/2013  Pomme ................. B64D 13/06
                              62/238.6

* cited by examiner

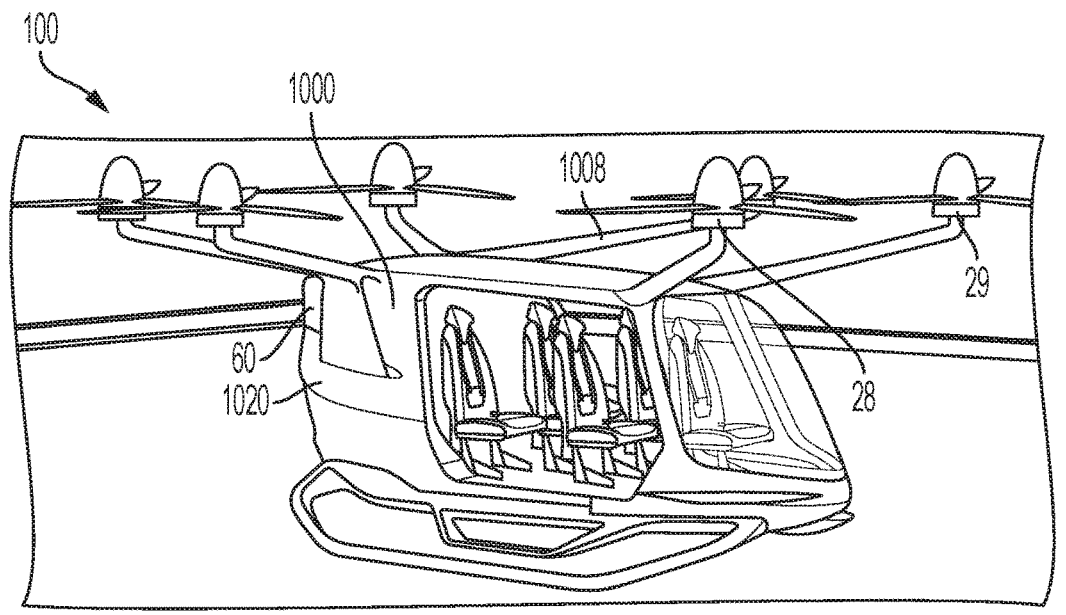
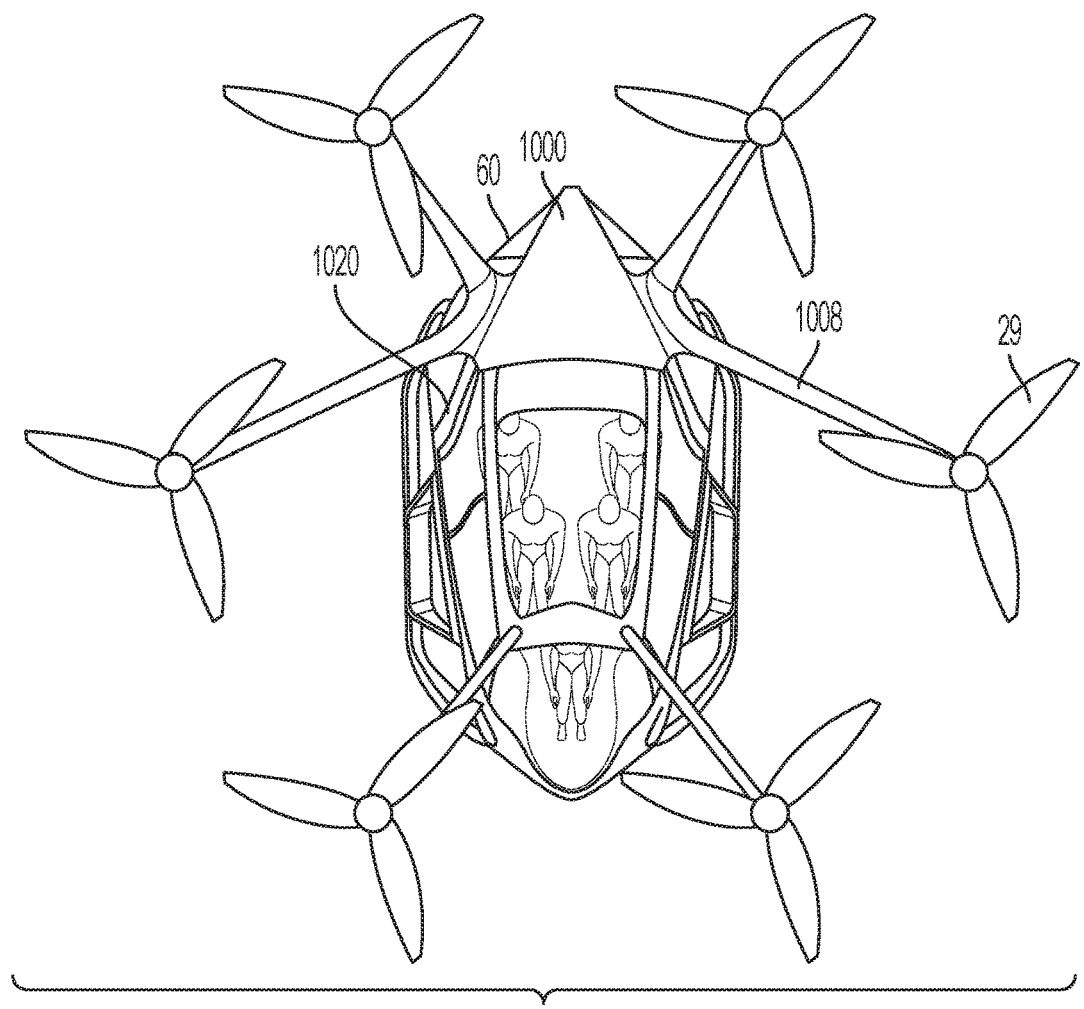
FIG. 7

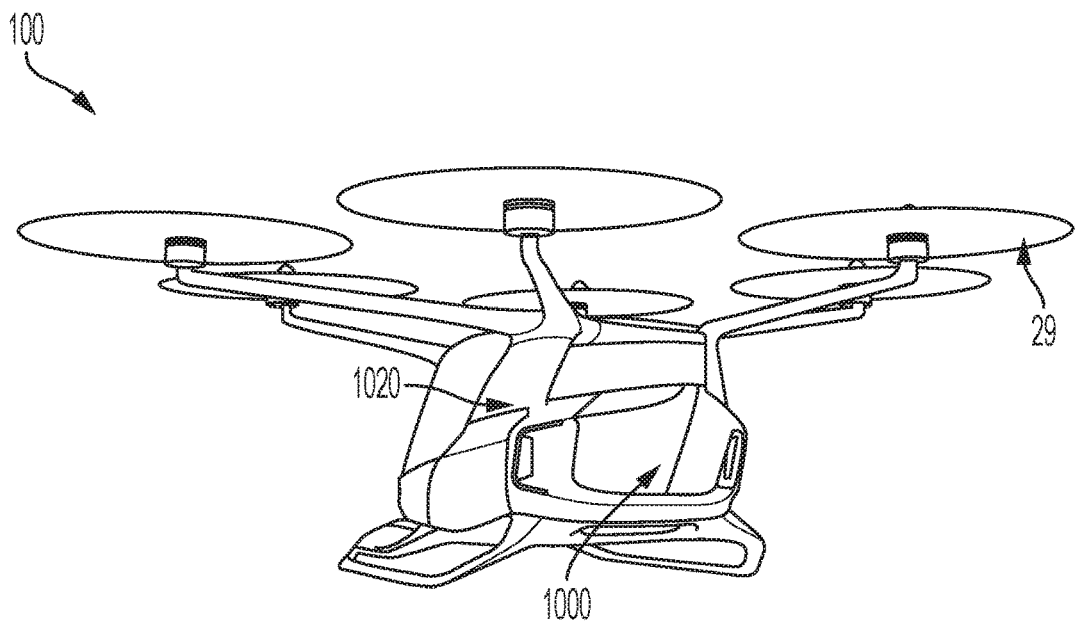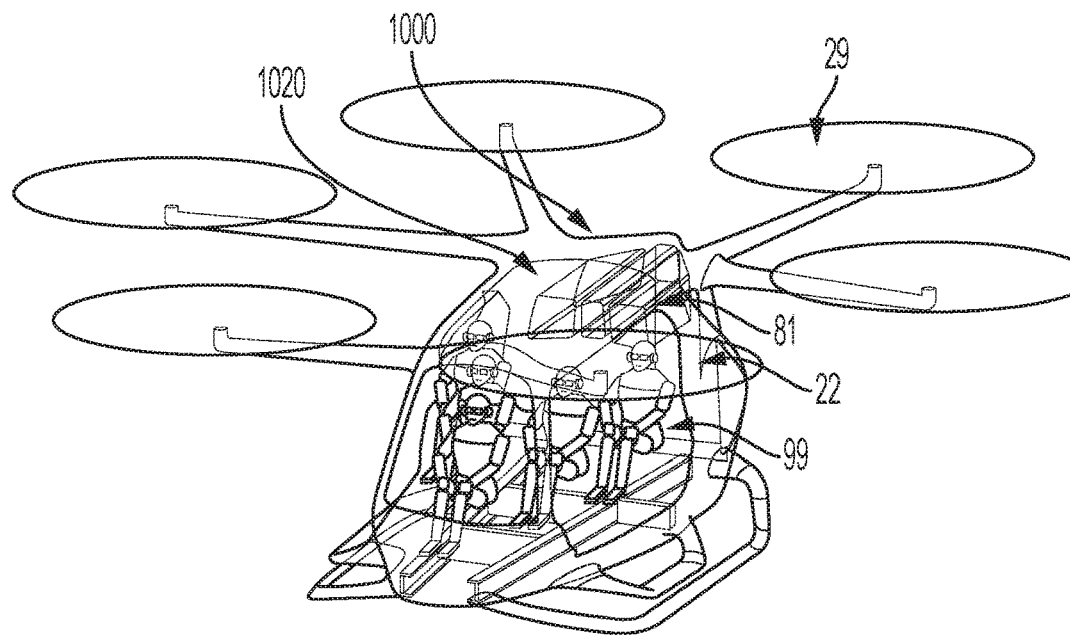
FIG. 8

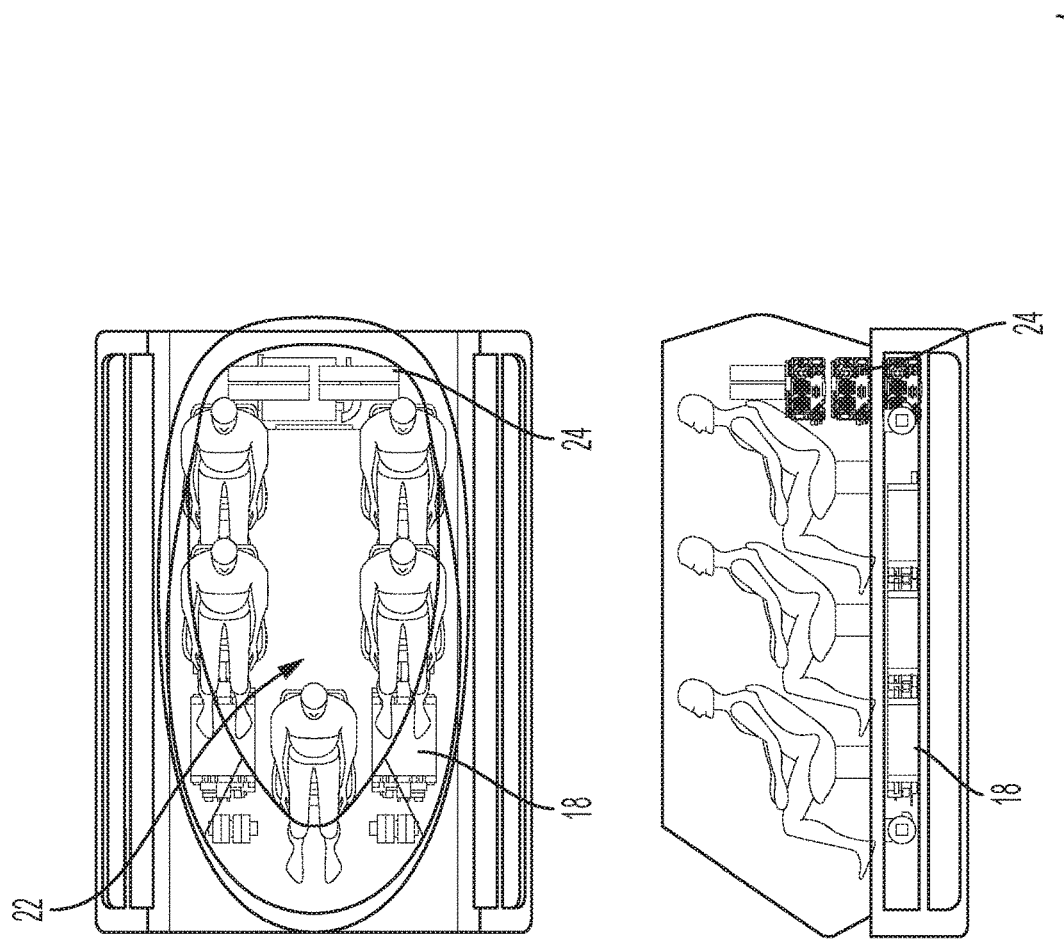
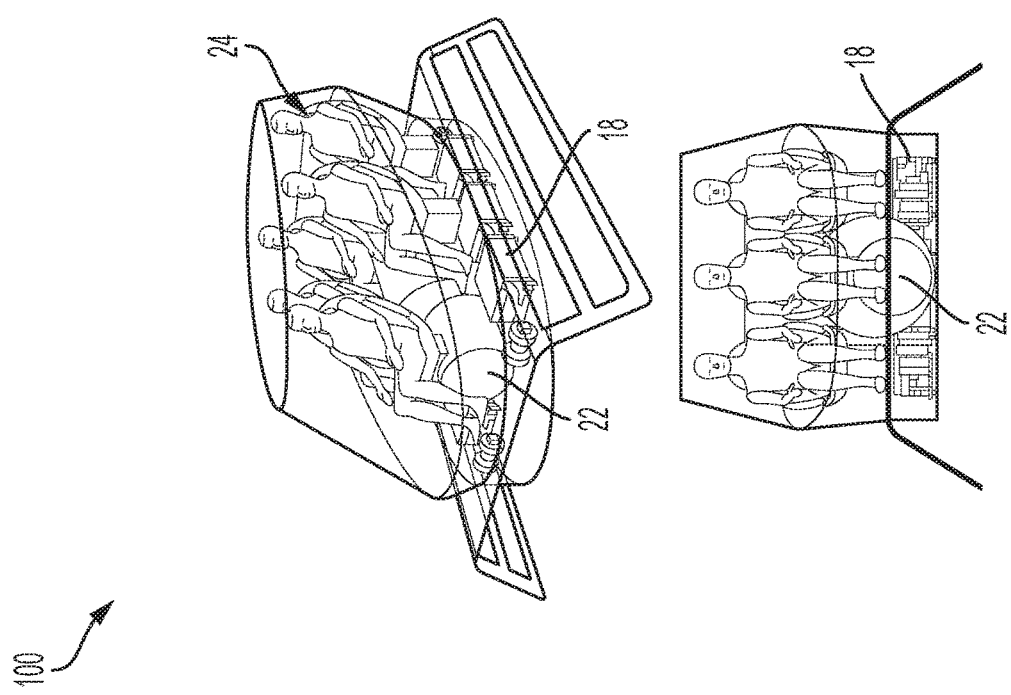
FIG. 11

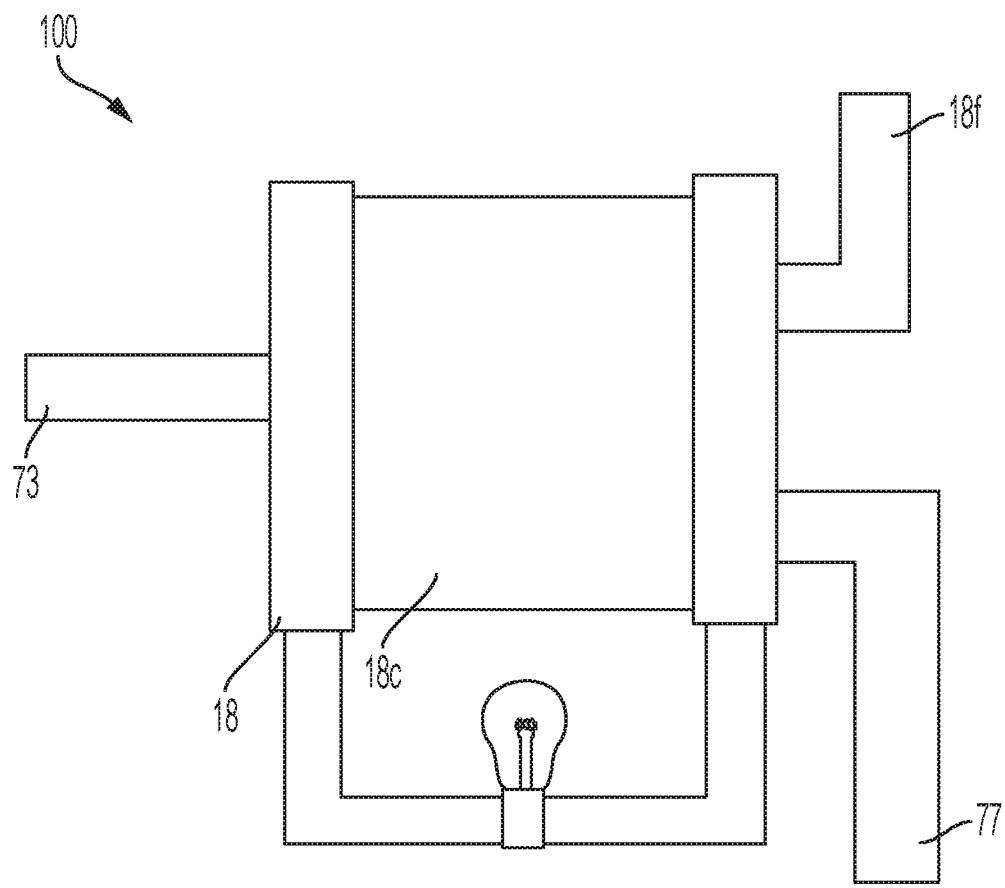
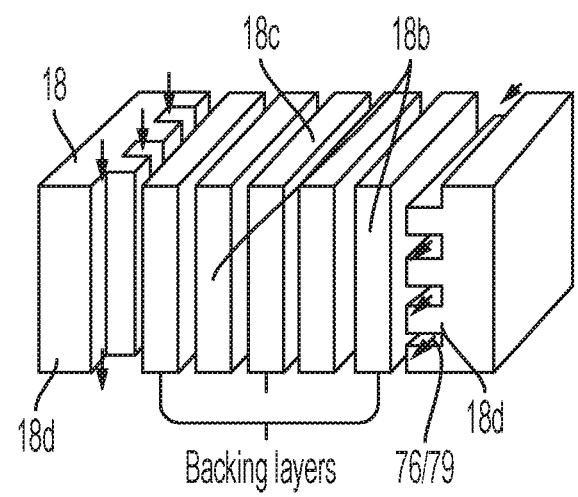
FIG. 15

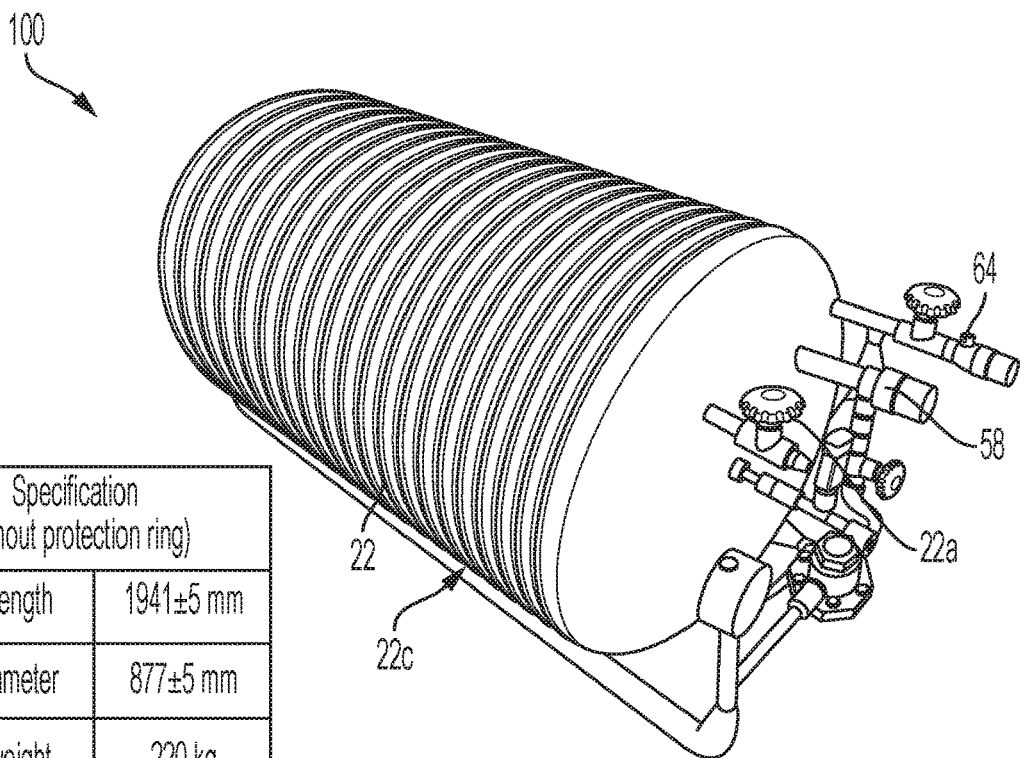
| Specification (without protection ring) | |
|---|---|
| Overall length | 1941±5 mm |
| Outer diameter | 877±5 mm |
| Empty weight | 220 kg |
| Inner tank material | SUS316L |
| Outer tank material | SUS304 |
| Insulation | High vacuum (~1mTorr) + MLI |
| Capacity | 400 L |
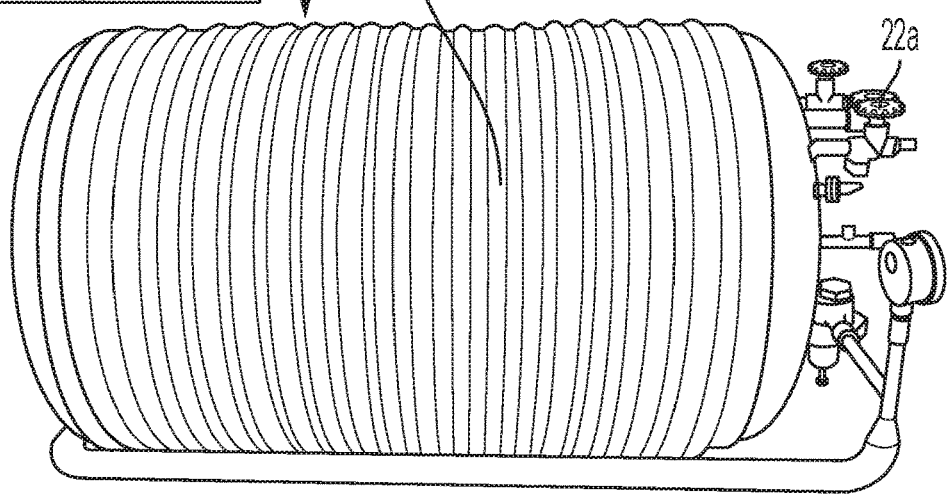
FIG. 19

INTEGRATED MULTIMODE THERMAL ENERGY TRANSFER SYSTEM, METHOD AND APPARATUS FOR CLEAN FUEL ELECTRIC MULTIROTOR AIRCRAFT

CROSS-REFERENCE TO RELATED APPLICATION(S)

This application claims priority to, and the benefit of, U.S. Provisional Application 62/852,651, filed May 24, 2019, for all subject matter common to both applications. The disclosure of said provisional application is hereby incorporated by reference in its entirety.

FIELD OF THE INVENTION

The present invention is directed to an integrated multimode thermal energy transfer system, method and apparatus for full-scale clean fuel electric-powered multirotor aircraft design, implementation and operation. It finds particular, although not exclusive, application to on-board fuel cell and/or motor or generator powered electric (low or no emission) multirotor aircraft, including Advanced Air Mobility (AAM) aircraft, where the fuel cell module or other source on-board source of power transforms fuel into electricity that is then used to operate multiple electric motors. By using the results of the measurements to inform computer monitoring, the methods and systems can use byproducts including thermal energy disparities and differentials related to both fuel supply systems and power generating systems to both add and remove heat from different aircraft zones to improve aircraft function and efficiency as well as pilot and passenger comfort. The multirotor aircraft may be operated in unmanned aerial vehicle (UAV) or drone mode following either remote commands or a pre-programmed route to its destination, or it may be operated in operator mode.

BACKGROUND

Although reduced scale multirotor aircraft (sometimes called multi-copters) are not new, they have been reduced scale models not intended for the rigors or requirements of carrying human passengers, and are mostly used either as toys, or for limited-duration surveillance or aerial photography missions with motion being controlled by radio-control remotes. Most if not all are battery powered. For example, US Patent Application 20120083945 relates specifically to a reduced scale multi-copter, but does not address the safety, structural, or redundancy features necessary for an FAA-certified passenger-carrying implementation, nor any of the systems required to implement a practical, passenger-carrying vehicle with fault-tolerance and state-variable analysis, nor any way of generating its own power from fuel carried on-board. The dynamics and integrity requirements of providing a full-scale aircraft capable of safely and reliably carrying human passengers and operating within US and foreign airspace are significantly different that those of previous reduced scale models.

A large volume of personal travel today occurs by air. For destinations of more than 500 miles, it has historically been the fastest travel mode and, in terms of injuries per passenger mile, the safest. However, only about 200 hub and spoke airports exist within the US, placing much of the population more than 30 minutes away from an airport. Yet there are over 5,300 small control-towered regional airports, and over 19,000 small airfields with limited or no control towers throughout the US, placing more than 97% of the population within 15 to 30 minutes of an airfield. As many have noted before, this is a vastly under-utilized capability.

In the 21st Century, the opportunity is available to apply advanced technologies of the evolving National Airspace System (NAS) to enable more-distributed, decentralized travel in the three-dimensional airspace, leaving behind many of the constraints of the existing hub-and-spoke airport system, and the congestion of the 2-dimensional interstate and commuter highway systems.

Many large cities and metropolitan areas are virtually gridlocked by commuter traffic, with major arteries already at or above capacity, and with housing and existing businesses posing serious obstacles to widening or further construction. NASA, in its 'Life After Airliners' series of presentations (see Life After Airliners VI, EAA AirVenture 2003, Oshkosh, Wis. Aug. 3, 2003, and Life After Airliners VII, EAA AirVenture 2004, Oshkosh, Wis. Jul. 30, 2004) and NASA's Dr. Bruce Holmes (see Small Aircraft Transportation System—A Vision for 21st Century Transportation Alternatives, Dr. Bruce J. Holmes, NASA Langley Research Center. 2002) make the case for a future of aviation that is based on the hierarchical integration of Personal Air Vehicles (PAV), operating in an on-demand, disaggregated, distributed, point-to-point and scalable manner, to provide short haul air mobility. Such a system would rely heavily on the 21St century integrated airspace, automation and technology rather than today's centralized, aggregated, hub-and-spoke system. The first, or lowest tier in this hierarchical vision are small, personal Air Mobility Vehicles or aircraft, allowing people to move efficiently and simply from point-to-any-point, without being restricted by ground transportation congestion or the availability of high-capability airports. Key requirements include vehicle automation, operations in non-radar-equipped airspace and at non-towered facilities, green technologies for propulsion, increased safety and reliability, and en-route procedures and systems for integrated operation within the National Airspace System (NAS) or foreign equivalents. Ultimate goals cited by NASA include an automated self-operated aircraft, and a non-hydrocarbon-powered aircraft for intra-urban transportation. NASA predicts that, in time, up to 45% of all future miles traveled will be in Personal Air Vehicles.

Generally, powered vehicles need to dissipate waste heat from whatever power system those vehicles use. Aircraft, automobiles, powered boats and other vehicles often use radiators to dissipate the waste heat of combustion. Similarly, whether vehicles use motors, batteries, fuel cells, or other means to propel, control, steer or monitor vehicle travel, these components generate excess heat that must be managed and dissipated from the system to prevent overheating and maintain proper operating temperatures. Often, heat is transferred away from components that generate excess heat using a fluid. One way to do this is airflow, either natural or induced via cooling fans, which move the air heated from the component into the cooler atmosphere. Although reduced scale multirotor aircraft (sometimes called multi-copters) are not new, they have been reduced scale models not intended for the rigors or requirements of carrying human passengers, and are mostly used either as toys, or for limited-duration surveillance or aerial photography missions with motion being controlled by radio-control remotes. As a result, these devices generally rely upon only unsophisticated heat management systems that include basic heat sinks or motor frames and housings with cast or molded fins that increase surface area to dissipate heat much the same way that computers and other common electronic devices do, without having even the radiators, fluids (often referred to as coolant), cooling fans, or monitoring devices for cooling systems that passenger carrying powered vehicles commonly provide. In the case of fuel cells, an additional more efficient method is available wherein the fuel is liquid hydrogen that is typically stored at −450+/− degrees F., thereby providing a significant negative temperature differential that can be used to absorb a significant amount of excess heat. Likewise, the waste heat generated during the production of power from the fuel cells themselves can be used to heat the aircraft cabin in cold weather, similar to how automobiles are heated using waste engine heat. Using both waste heat and a reservoir of cold fluid improves the overall efficiency of the system and the ability to adjust to a range of different environments and conditions, but it requires a more sophisticated system to implement thermodynamic principles in a variety of settings and conditions.

Generally, a heat sink transfers thermal energy from a higher temperature device to a lower temperature fluid medium. The fluid medium may be air, water, refrigerants or oil. In thermodynamics a heat sink is defined as a heat reservoir or thermal energy reservoir that can absorb a large amount of heat or thermal energy without significantly changing temperature. For example, the atmosphere or an ocean may serve as a heat sink. Conversely, a heat source is defined as a heat reservoir or thermal energy reservoir that can supply large amounts of energy without undergoing a significant change in its temperature. Practical heat sinks for electronic devices must have a temperature higher than the surroundings to transfer heat by convection, radiation, and conduction. The power supplies of electronics are not perfectly efficient, and are subject to electrical resistance, so extra heat is produced that may be detrimental to the function of the device. As such, a heat sink is often included in the design to disperse heat.

The principle of a heat sink operates according to Fourier's law of heat conduction, that when there is a temperature gradient in a body, heat will be transferred from the higher temperature region to the lower temperature region. The rate at which heat is transferred by conduction is proportional to the product of the temperature gradient and the cross-sectional area through which heat is transferred. Newton's law of cooling states, the rate of heat loss (or cooling) of an object—whether by conduction, convection, or radiation— is approximately proportional to the temperature difference ΔT between the body and its surroundings. Thus, heat sinks transfer heat or thermal energy from e.g. electronic devices producing excess heat to the periphery of the heat sink when in contact with a cooler surrounding environment, and then lose that excess heat to the surrounding environment, thereby cooling the electronic devices.

Conversely, heat pumps move thermal energy in the opposite direction of spontaneous heat transfer, by absorbing heat from a cold space and releasing it to a warmer one. A heat pump uses a small amount of external power to accomplish the work of transferring energy from the heat source to the heat sink. A heat sink is a passive heat exchanger that transfers the heat generated by an electronic or a mechanical device to a fluid medium, often air or a liquid coolant, where it is dissipated away from the device, thereby allowing regulation of the device's temperature at optimal levels. A heat pump is a machine or device that moves heat from a source location at a lower temperature to a heat sink location at a higher temperature using mechanical work or a high-temperature heat source. A heat pump may function as a "heater" if the objective is to warm the heat sink, or a "refrigerator" if the objective is to cool the heat source. In either case, the operating principles are identical. Heat is transferred from a cold place to a warm place. Using a collection of different subsystems, components, or zones, each operating at significantly different temperatures allows for establishing multiple different interchangeable relationships with different objects being heated as heat sinks or cooled as heat sources depending upon which other objects are in sufficient contact to perform heat transfer (by conduction, convection, or radiation, etc.). One way to interconnect objects in need of cooling with objects in need of heating when those objects cannot be physically joined is by using a heat exchanger and working fluids. A fluid heat recovery apparatus, commonly known as a heat exchanger, is a device that transfers heat between one or more mediums. The mediums transfer heat from one enclosed area to another enclosed area. Liquid heat transfer is the most common medium used in heat exchangers, with gas mediums also used within different applications. Fluids (liquids, gases and air) can be separated by an enclosed area or in direct contact in the heat exchanger. Fluids in this application are defined in accordance with conventional meanings as substances such as liquids or gases that are capable of flowing and can change shape when acted upon by a force. The flow of fluids can be directed from different sources to different destinations, allowing heat exchangers to perform heat transfer for a variety of objects remote from each other.

The dynamics and integrity requirements of providing a full-scale aircraft capable of safely and reliably carrying human passengers are significantly different that those of reduced scale models. Such a vehicle requires state-of-the-art electric motors, electronics and computer technology with high reliability, safety, simplicity, and redundant control features, with on-board capability to generate electrical power, coupled with advanced avionics and flight control techniques. Consuming additional weight, power, or space to provide conventional cooling or heating of subsystems, components and zone located in different positions aboard the aircraft presents several challenges including inefficient performance and consumption of resources, greater cost, greater weight, restrictions on vehicle configuration, and unwanted vehicle component complexity and redundancy.

SUMMARY

There is a need for an improved energy transfer system, method and apparatus for fluid heat recovery that leverages advantageous characteristics of heat exchangers in its design to improve efficiency and effectiveness in recovering heat from aircraft (including Advanced Air Mobility aircraft) electronic components and selectively transferring heat or thermal energy between different subsystems, components and zones to dynamically meet needs for heating or cooling in an aircraft while using existing hot or cold reservoirs instead of consuming additional resources to heat or cool objects to requisite or preferred temperatures. Further there is a need to simultaneously dissipate waste heat from power generating systems and prevent power and electrical systems from overheating, efficiently convert stored liquid hydrogen fuel to gaseous hydrogen fuel for supplying to fuel cells and other power generation components, and maintain occupants at comfortable temperatures, while limiting the number, mass, and size of systems used within an aircraft due to restrictions on the volume and mass of the vehicle required by flight parameters that must be adhered to in order to successfully maintain aircraft flight. The present invention is directed toward further solutions to address this need, in addition to having other desirable characteristics. Specifically, the present invention relates to integrated multimode thermal energy transfer system, method and apparatus for managing thermal energy in a full-scale vertical takeoff and landing manned or unmanned multirotor aircraft having a lightweight multirotor airframe fuselage containing a system to generate electricity from fuels such as hydrogen; an electric lift and propulsion system mounted to a lightweight multirotor airframe fuselage or other frame structure; counter-rotating pairs of AC or DC brushless electric motors each driving a propeller or rotor; an integrated avionics system for navigation; a redundant autopilot system to manage motors, maintain vehicle stability and control thermodynamic operating conditions; a tablet-computer-based mission planning and vehicle control system to provide the operator with the ability to pre-plan a route and have the system fly to the destination via autopilot or to directly control thrust, pitch, roll and yaw through movement of the tablet computer; and ADSB or ADSB-like capability (including Remote ID) to provide traffic and situational awareness, weather display and warnings. Remote ID, as utilized herein, refers to the ability of an unmanned aircraft system (UAS) in flight to provide identification information that can be received by other parties consistent with rules and protocols promulgated by the Federal Aviation Administration (FAA). The vehicle has no tail rotor, and lift is provided by pairs of small electric motors driving directly-connected pairs of counter-rotating propellers, also referred to as rotors. The use of counter-rotating propellers on each pair of motors cancels out the torque that would otherwise be generated by the rotational inertia. Control system and computer monitoring, including automatic computer monitoring by programmed single or redundant digital autopilot control units (autopilot computers), or motor management computers, controls each motor-controller and motor to produce pitch, bank, yaw and elevation, while simultaneously using on-board inertial sensors to maintain vehicle stability and restrict the flight regime that the pilot or route planning software can command, to protect the vehicle from inadvertent steep bank or pitch, or other potentially harmful acts that might lead to loss of control, while also simultaneously controlling cooling system and heating system parameters, valves and pumps while measuring, calculating, and adjusting temperature and heat transfer of aircraft components and zones, to protect motors, fuel cells, and other critical components from exceeding operating parameters and to provide a safe, comfortable environment for occupants during flight. By using the results of the measurements to inform computer monitoring and control, the methods and systems can use byproducts including thermal energy disparities and differentials related to both fuel supply systems and power generating systems to both add and remove heat from different aircraft zones to improve aircraft function and efficiency as well as pilot and passenger comfort. Sensed parameter values about vehicle state are used to detect when recommended vehicle operating parameters are about to be exceeded. By using the feedback from vehicle state measurements to inform motor control commands, and by voting among redundant autopilot computers, the methods and systems contribute to the operational simplicity, stability, reliability and safety of the vehicle. Power is provided by one or more on-board fuel cell modules for generating electrical voltage and current, electronics to monitor and control electrical generation and excess heat or thermal energy production, and motor controllers to control the commanded voltage and current to each motor and to measure its performance (which may include such metrics as resulting RPM, current, torque and temperature among others). Fuel cell modules, motors, motor controllers, batteries, circuit boards, and other electronics must have excess or waste heat removed or dissipated. The liquid hydrogen must be warmed through a heat exchanger in order to convert it to gaseous state, which is then supplied to the fuel cells. That heat exchanger, in turn, can help to cool the waste heat from the fuel cells, and to cool the cabin instead of air conditioning in warm weather.

This invention addresses part of the core design of a full-scale, clean-fueled, electric multirotor vehicle, particularly a full-scale multirotor aircraft, also referred to herein as a multirotor aircraft, or an Air Mobility Vehicle, or Advanced Air Mobility (AAM) aircraft, as one part of the On-Demand, Widely Distributed Point-to-Any Point $21^{st}$ Century Air Mobility system. For clarity, any reference to a multirotor aircraft herein, includes any or all of the above noted vehicles, including but not limited to AAM aircraft. Operation of the vehicle is simple and attractive to many operators when operating under visual flight rules (VFR) in Class E or Class G airspace as identified by the Federal Aviation Administration, thus in most commuter situations not requiring any radio interactions with air traffic control towers. In other cases, the vehicle may be operated in other airspace classes, in VFR and IFR (Instrument Flight Rules) and Part 135 (aircraft for hire) operations, in the US or the equivalent regulations of other countries including those with whom the US maintains a bilateral agreement governing aircraft certifications and operations.

In order to safely transport passengers, the system requires passenger-cabin comfort systems for heating and air conditioning. Yet every pound carried aloft in a vertical lift vehicle is precious, and so the system must maximize the use of all available waste heat and waste cold sources, to avoid carrying either extra energy, or extra fuel and compressors or heaters on each flight.

The present invention relates to a thermal energy transfer system for a full-scale vertical takeoff and landing multirotor aircraft having a lightweight airframe containing a system to generate electricity from fuels such as LPG, CNG, hydrogen, liquid hydrogen, or other common fuels, an electric lift and propulsion system mounted to a lightweight multirotor truss, frame or fuselage structure, counter-rotating pairs of AC or DC brushless electric motors each driving a propeller or rotor, an integrated avionics system for navigation, a redundant autopilot system to manage motors and maintain vehicle stability, a tablet-computer-based mission planning and vehicle control system to provide the operator with the ability to pre-plan a route and have the system fly to the destination via autopilot or to directly control thrust, pitch, roll and yaw through movement of the tablet computer or controls commonly referred to as "joysticks" or sidearm controllers, and ADSB or ADSB-like capability (including Remote ID) to provide traffic and situational awareness, weather display and collision avoidance warnings. Power is provided by one or more on-board motor-generators for generating electrical voltage and current, or an on-board fuel cell for generating electrical voltage and current, electronics to monitor and control electrical generation, and motor controllers to control the commanded voltage and current to each motor and to measure its performance (which may include such metrics as resulting RPM, current, torque and temperature among others). Thermal energy that is a by-product of generating power, or storing liquid fuel and converting it into gaseous state, is used to provide heating and cooling in the passenger area of the vehicle.

The vehicle has no tail rotor, and lift is provided by pairs of small electric motors each driving directly-connected counter-rotating propellers, also referred to as rotors. The use of counter-rotating propellers on each pair of motors cancels out the torque that would otherwise be generated by the rotational inertia. Automatic computer monitoring by a programmed redundant digital Autopilot Computer controls pitch, bank, yaw and elevation, while simultaneously using on-board inertial sensors to maintain vehicle stability and restrict the flight regime that the pilot or route planning software can command, to protect the vehicle from inadvertent steep bank or pitch, or other potentially harmful acts that might lead to loss of control. Sensed parameter values about vehicle state are used to detect when recommended vehicle operating parameters are about to be exceeded. By using the feedback from vehicle state measurements to inform motor control commands, and by voting among redundant autopilot computers, the methods and systems contribute to the operational simplicity, stability, reliability and safety of the vehicle. In the event operating parameters are exceeded or are exceeded past set acceptable limits or safety factors, the emergency systems may be engaged.

Among the many uses for this class of vehicle are the next generation of personal transportation including commuting, local travel, air taxi, and recreation where operators need not have the level of piloting skills necessary for more complex, traditional aircraft or helicopters. This evolution is referred to as Personal Air Vehicles (PAV) or Air Mobility Vehicles (AMV). The vehicle also has autonomous or unmanned application to aerial surveillance, security and reconnaissance, policing, and package or supplies delivery that will be of utility to law enforcement, border patrol, military surveillance, emergency relief aid (disaster recovery), and commercial users.

The vehicle is equipped with redundant Autopilot Computers to accept control inputs by the operator (using controls commonly referred to as "joysticks" or sidearm controllers, or using the tablet computer's motion to mimic throttle and joystick commands) and manage commands to the electric motor controllers, advanced avionics and GPS equipment to provide location, terrain and highway in the sky displays, and a simplified, game-like control system that allows even casual users to master the system after a brief demonstration flight. A tablet-computer provides mission planning and vehicle control system capabilities to give the operator the ability to pre-plan a route and have the system fly to the destination via autopilot, or manually control thrust, pitch, roll and yaw through movement of the tablet computer itself. Control inputs can alternatively be made using a throttle for vertical lift (propeller RPM or torque) control, and a joystick for pitch (nose up/down angle) and bank (angle to left or right) control, or a multi-axis joystick to combine elements of pitch, bank and thrust in one or more control elements, depending on user preferences. The autopilot or motor management computer measures control inputs by the operator or autopilot directions, translates this into commands to the controllers for the individual electric motors according to a known performance table or relevant calculation, then supervises motor reaction to said commands, and monitors vehicle state data (pitch, bank, yaw, pitch rate, bank rate, yaw rate, vertical acceleration, lateral acceleration, longitudinal acceleration, GPS speed, vertical speed air speed and other factors) to ensure operation of the vehicle remains within the desired envelope.

In accordance with example embodiments of the present invention, an integrated system for multimode thermal energy transfer comprises a fuel supply subsystem comprising a fuel tank in fluid communication with one or more fuel cell modules and configured to store and transport a fuel, a power generation subsystem comprising at least one radiator in fluid communication with the one or more fuel cell modules, configured to store and transport a coolant, a thermal energy interface subsystem comprising a heat exchanger configured with a plurality of fluid conduits, an internal temperature zone comprising heating, ventilation and air conditioning (HVAC) subsystems comprising ducts and a heating or air conditioning unit, an external temperature zone comprising one or more vents, one or more outlets, and one or more exhaust ports, and one or more temperature sensing devices or thermal energy sensing devices, configured to measure thermodynamic operating conditions. An autopilot control unit or computer unit comprises a computer processor configured to compute a temperature adjustment protocol comprising one or more priorities for energy transfer using one or more thermal references and an algorithm based on a comparison result of measured thermodynamic operating conditions, and configured to select and control, based on the temperature adjustment protocol, an amount and distribution of thermal energy transfer from one or more sources to one or more thermal energy destinations.

In accordance with aspects of the present invention, measuring thermodynamic operating conditions can comprise measuring a first temperature corresponding to one or more sources of thermal energy and assessing one or more additional temperatures corresponding to thermal references. The one or more thermal references can comprise one or more references selected from the group consisting of operating parameters, warning parameters, equipment settings, occupant control settings, alternative components, alternative zones, temperature sensors, and external reference information. The one or more sources are selected from the group consisting of the power generation subsystem, the internal temperature zone, the external temperature zone, and the fuel supply subsystem. The one or more thermal energy destinations are selected from the group consisting of the power generation subsystem, the internal temperature zone, the external temperature zone, and the fuel supply subsystem.

In accordance with aspects of the present invention, an autopilot control unit or a computer processor can be further configured to compute, select and control, based on the temperature adjustment protocol, an amount and distribution of thermal energy transfer including: from the one or more sources comprising the power generation subsystem, to the one or more thermal energy destinations comprising the internal temperature zone, using HVAC subsystems; from the one or more sources comprising the power generation subsystem, to the one or more thermal energy destinations comprising the external temperature zone, using at least the at least one radiator or the one or more exhaust ports; from the one or more sources comprising the power generation subsystem, to the one or more thermal energy destinations comprising the fuel supply subsystem, using the thermal energy interface subsystem comprising the heat exchanger or a vaporizer; from the one or more sources comprising the internal temperature zone, to the one or more thermal energy destinations comprising the fuel supply subsystem, using the HVAC subsystems and thereby reducing temperature in the internal temperature zone; from the one or more sources comprising the external temperature zone, to the one or more thermal energy destinations comprising the fuel supply subsystem, using one or more vents; and combinations thereof.

In accordance with aspects of the present invention, the fuel supply subsystem can further comprise the fuel tank in fluid communication with one or more fuel cells, configured to store and transport a fuel selected from the group consisting of gaseous hydrogen (GH2), liquid hydrogen (LH2), liquefied petroleum gas (LPG), wherein fuel supply subsystem further comprises fuel lines, refueling connections for charging, one or more vents, one or more valves, one or more pressure regulators, the vaporizer, unions and the heat exchanger, each in fluid communication with the fuel tank, and wherein the one or more temperature sensing devices or thermal safety sensors monitor temperatures and concentrations of gases in the fuel supply subsystem, and also comprise one or more pressure gauges, one or more level sensors, one or more vacuum gauges, and one or more temperature sensors. The fuel tank can further comprise a titanium, polymer, stainless steel or carbon fiber epoxy shell, a plastic, polymer, or stainless steel liner, a titanium, polymer, carbon-fiber or stainless steel inner tank, insulation material between both tanks, an expansion means to expand liquid to gaseous form, (optional) tank mounting provisions, plumbing provisions, drop protection, and provisions for maintaining a reduced pressure (partial or near-total vacuum) between inner and outer tanks, and is configured to use a working fluid of hydrogen as the fuel. The fuel tank further comprise a boss comprising 316L stainless steel, with a liner material comprising high-density polyethylene (HDPE), and the fuel tank is configured to use a working fluid of hydrogen at an operating pressure of 70 MPa, and a proof pressure of 105 Mpa, with a cylinder external diameter 530 mm, an external length of 2154 mm, a water volume of 244 L, and a weight of 186 kg.

In accordance with aspects of the present invention, the power generation subsystem can further comprise: one or more fuel cell modules supplying voltage and current to a plurality of motor controllers configured to control a plurality of motor and propeller assemblies; zero, one or more battery arrays; one or more circuit boards; one or more processors; one or more memory; one or more electronic components, electrical connections, electrical wires; and one or more diode or field-effect transistors (FET or IGBT or SiC) providing isolation between each electrical source and an electrical main bus.

In accordance with aspects of the present invention, the one or more fuel cell modules can further comprise air filters, blowers, airflow meters, fuel delivery assembly, recirculation pump, coolant pump, fuel cell controls, sensors, end plates, at least one gas diffusion layer, at least one membrane electrolyte assembly, at least one flowfield plate, coolant conduits, connections, a hydrogen inlet, a coolant inlet, a coolant outlet, one or more air-driven turbochargers or pumps or superchargers supplying air to the one or more fuel cell modules, and coolant conduits connected to and in fluid communication with the one or more fuel cell modules and transporting coolant. The one or more fuel cell modules can further comprise one or more hydrogen-powered fuel-cells, where each hydrogen-powered fuel-cell is fueled by gaseous hydrogen (GH2) extracted from liquid hydrogen (LH2) that has been warmed up to the gaseous state using a heat exchanger and wherein the one or more fuel cell modules combines hydrogen from the fuel tank with air to supply electrical voltage and current according to electrochemical processes known to one skilled in the art. A fuel tank can further comprise an inner tank and an outer tank, an insulating wrap, a vacuum between the inner tank and the outer tank, thereby creating an operating pressure of approximately 10 bars, or 140 psi. A battery subsystem can comprise a high-voltage battery array, battery monitoring and charging subsystem that are in fluid communication with coolant conduits transporting coolant.

In accordance with aspects of the present invention, the integrated system can be mounted and deployed within a full-scale, multirotor aircraft system sized, dimensioned, and configured for transporting one or more human occupants and/or a payload, that can in turn comprise: a multirotor airframe fuselage, having a structure supporting total vehicle weight together with the one or more human occupants and/or payload; a plurality of motor and propeller assemblies attached to the multirotor airframe fuselage, the plurality of motor and propeller assemblies each comprising a plurality of pairs of propeller blades, the plurality of motor and propeller assemblies being electrically connected to and controlled by a plurality of motor controllers and a power distribution monitoring and control subsystem for monitoring and controlling distribution of supplied electrical voltage and current to the plurality of motor controllers. The plurality of motor controllers can be commanded by one or more autopilot control units, where the one or more autopilot control units control electrical voltage and torque or current for each of the plurality of motor and propeller assemblies. The integrated system can include an avionics system. The power generation subsystem can be configured to supply electrical voltage and current, and can further comprise multiple high-current battery cells mounted within modular enclosures of the multirotor airframe fuselage that require periodic charging while not in flight, a battery management subsystem configured to monitor battery voltage, current, charge, and status of the multiple high-current battery cells; a recharging system compatible with automotive electric vehicle recharging stations, according to J1772 standards, wherein the multiple high-current battery cells are configured to recharge the multirotor aircraft's batteries at an origin, at a destination, or at roadside EV charging stations. The power generation subsystem can use a portion of the main supplied power of the multirotor aircraft system to power onboard avionics through a DC-to-DC converter or starter-alternator, thereby alleviating a need for separate charger and charge-ports for batteries powering the onboard avionics. The plurality of motor controllers can be high-voltage, high-current liquid-cooled controllers, or air-cooled controllers.

In accordance with aspects of the present invention, the thermal energy interface subsystem can comprise the heat exchanger or a vaporizer, configured to connect to a first fluid conduit in connection with and in fluid communication the fuel supply subsystem comprising the fuel, and a second conduit in connection with and in fluid communication with the internal temperature zone comprising the (HVAC) subsystems comprising ducts and an air conditioning unit or a cabin cooling subsystem comprising the coolant, wherein thermal energy is transferred from the coolant, across a conducting interface by conduction, and to the fuel, thereby warming the fuel and cooling the coolant, and wherein the one or more temperature sensing devices or thermal energy sensing devices further comprises a fuel temperature sensor and a coolant temperature sensor.

In accordance with aspects of the present invention, the system can further comprise an electrical power-system configured to supply electrical voltage and current to the plurality of motor and propeller assemblies being controlled by a plurality of motor controllers. It can include a power distribution monitoring and control subsystem for monitoring and controlling distribution of the supplied electrical voltage and current to the plurality of motor controllers and the avionics subsystem, wherein the plurality of motor controllers are commanded by one or more autopilot control units, where the one or more autopilot control units control electrical voltage and torque or current for each of the plurality of motor and propeller assemblies. It can include a mission planning computer comprising software, with wired or wireless (RF) connections to the one or more autopilot control units; and a wirelessly connected or wire-connected Automatic Dependent Surveillance-Broadcast (ADSB) unit providing the software with collision avoidance, traffic, Remote ID, emergency detection and weather information to and from the multirotor aircraft. The one or more autopilot control units can comprise a computer and input/output interfaces comprising at least one of interface selected from serial RS232, Controller Area Network (CAN), Ethernet, analog voltage inputs, analog voltage outputs, pulse-width-modulated outputs for motor control, an embedded or stand-alone air data computer, an embedded or stand-alone inertial measurement device, and one or more cross-communication channels or networks. A DC-DC converter or starter/alternator can be configured to down-shift at least a portion of a primary voltage of the multirotor aircraft system to a standard voltage comprising one or more of the group consisting of 12V, 24V, 28V, or other standard voltage for avionics and non-motor purposes, with a battery of corresponding voltage to provide local current storage. The system can include a means of combining pitch, roll, yaw, throttle, and other desired information onto a serial line, in such a way that multiple channels of command data pass to the one or more autopilot control units over the serial line, where control information is packaged in a plurality of frames that repeat at a periodic or aperiodic rate. The one or more autopilot control units can operate control algorithms generating commands to each of the plurality of motor controllers, managing and maintaining multirotor aircraft stability, and monitoring feedback. The integrated system can include an ADSB or Remote ID unit that can be operable to: receive broadcast data from nearby aircraft; transmit desired state information to the one or more autopilot control units to avoid collisions with the nearby aircraft; and the one or more autopilot control units determine an action to command to avoid the collisions with the nearby aircraft or initiate emergency procedures; broadcast position data of the multirotor aircraft system to the nearby aircraft to provide the nearby aircraft with the position information to avoid potential collisions; receive weather data and display the weather data on the avionics display system; and perform calculations for flight path optimization, collision avoidance, threat detection and emergency procedures based upon a state of the multirotor aircraft including thermodynamic operating conditions and thermal references, states of the nearby aircraft, safety of on-board passengers, and available flight path dynamics under the National Airspace System or equivalent systems in other countries; and use redundant attitude-based flight control, redundant computers, redundant motor control, and at least one voter to prevent deviation from the multirotor aircraft safety envelope. If the calculations indicate an uncorrectable state comprising one or more of a group consisting of the multirotor aircraft safety envelope is exceeded, operational parameters are exceeded, a loss of control is detected, a loss of stability is measured, the system has not maintained or cannot maintain the safety of occupants and the system cannot maintain flight-worthiness and function of the multirotor aircraft, then using avionics and electronics for automated control of the multirotor aircraft the system can perform emergency procedures comprising initiation of means to safely descend in the event of an emergency that comprise at least activation of the ballistic airframe parachute that can be deployed between plurality of motor and propeller assemblies and used to suspend aircraft and otherwise counter the force of gravity to slow descent back to ground without interfering with the plurality of motor and propeller assemblies or endangering occupants of the aircraft.

In accordance with aspects of the present invention, the one or more temperature sensing devices or thermal safety sensors can monitor temperatures and concentrations of gases in the fuel supply subsystem, and can further comprise the one or more fuel cell modules and a plurality of motor controllers, each configured to self-measure and report temperature and other parameters using a CAN bus to inform the autopilot control unit as to a valve, pump or combination thereof to enable to increase or decrease cooling using fluids wherein thermal energy is transferred from the coolant, and wherein heat exchangers warm LH2, and separate radiators dissipate waste heat, where both heat exchangers and radiators sources of cold and hot, thereby creating a temperature change in both the one or more sources and the one or more thermal energy destinations through the thermal energy transfer, for cabin environmental processes in the internal temperature zone using the HVAC subsystems comprising ducts and an air conditioning unit.

In accordance with aspects of the present invention, the integrated system can further comprise: a mission display system that displays to an operator information about a state of performance metrics of the power generation subsystem, the internal temperature zone, the external temperature zone, and the fuel supply subsystem; a dual display system comprising software operating on a touch-tablet computer or avionics display system; a wirelessly connected or wire-connected Automatic Dependent Surveillance-Broadcast (ADSB) unit, or Remote ID unit, providing the software with weather information to and data from the multirotor all-electric aircraft system; one or more autopilot control units comprising a computer and input/output interfaces comprising at least one of interface selected from serial RS232, Controller Area Network (CAN), Ethernet, analog voltage inputs, analog voltage outputs, pulse-width-modulated outputs for motor control, an embedded or stand-alone air data computer, an embedded or stand-alone inertial measurement device, and one or more cross-communication channels or networks; a DC-DC converter or starter/alternator configured to down-shift at least a portion of a primary voltage of the multirotor all-electric aircraft system to either 24V or 28V standards for avionics and non-motor purposes, with a 24V or 28V battery to provide local current storage; a mission controller tablet computer comprising the software operating on the touch-tablet computer or the avionics display system, with wired or wireless (RF) connections to the one or more autopilot control units, providing a variable voltage or potentiometer setting indicative of commanded thrust; the one or more autopilot control units operating control algorithms generating commands to each of the plurality of motor controllers, managing and maintaining vehicle stability, thermodynamic operating conditions and monitoring feedback.

In accordance with aspects of the present invention, the avionics display system for the multirotor aircraft system can comprise an interface to the ADSB or Remote ID unit, operable to: receive state information and weather data then display the state information and the weather data on the avionics display system; transmit desired state information to the one or more autopilot control units to manage thermodynamic operating conditions of the multirotor aircraft system. The one or more autopilot control units determine an action to command to execute thermal energy transfer between components of the multirotor aircraft system and perform calculations for flight path optimization and collision avoidance, based upon a state of the multirotor aircraft, thermodynamic operating conditions, and thermal references.

In accordance with aspects of the present invention, the HVAC subsystems can further comprise one or more cabin temperature sensors, ducts in fluid communication with one or more fans controlling distribution of a secondary working fluid, ducts in fluid communication with a heat exchanger related to liquid hydrogen or other cold stored fuel, and optionally at least one air conditioning unit comprising of a condenser, expansion valve, evaporator, compressor, conduits, in fluid communication with each other, and acting on the secondary working fluid external to the air conditioning unit.

In accordance with aspects of the present invention, the one or more autopilot or separate control units can comprise one or more redundant autopilot control units or computer control units that command the plurality of motor controllers and fluid control units for commands operating valves and pumps altering flows of fuel and coolant to different locations comprising the thermal energy destinations, and wherein the one or more redundant autopilot control units or computer control units communicate the voting process over a single- or redundant network.

In accordance with example embodiments of the present invention, a method for managing thermal energy in a multirotor aircraft comprises: measuring, using one or more temperature sensing devices or thermal energy sensing devices, thermodynamic operating conditions in a multirotor aircraft comprising: a first temperature corresponding to one or more sources of thermal energy, one or more additional temperatures corresponding to thermal references; comparing, using an autopilot control unit or a computer processor, at least the first temperature and the one or more additional temperatures corresponding to thermal references to calculate a comparison result; computing, using an autopilot control unit or a computer processor and an algorithm based on the comparison result, a temperature adjustment protocol comprising one or more priorities for energy transfer; selecting and controlling, based on the temperature adjustment protocol, an amount and distribution of thermal energy transfer from the one or more sources, wherein the distribution of thermal energy comprises one or more thermal energy destinations; and executing thermal energy transfer from the one or more sources to the one or more thermal energy destinations using an integrated system for multi-mode thermal energy transfer.

In accordance with aspects of the present invention, the one or more sources and the one or more thermal energy destinations can be each selected from the group consisting of a power generation subsystem, a fuel supply subsystem, a thermal energy interface, an internal temperature zone, and an external temperature zone.

In accordance with aspects of the present invention, the one or more thermal references can comprise one or more references selected from the group consisting of alternative components, alternative zones, operating parameters, warning parameters, equipment settings, occupant control settings and external reference information.

In accordance with aspects of the present invention, the power generation subsystem can comprise one or more components selected from the group consisting of: one or more fuel cell modules configured to supply electrical voltage and current configured to supply electrical voltage and current, one or more battery arrays, one or more motor controllers, one or more motors, one or more circuit boards, one or more processors and one or more electronic components.

In accordance with aspects of the present invention, the autopilot control unit computer processor can perform selecting and controlling, based on the temperature adjustment protocol, an amount and distribution of thermal energy transfer from the one or more sources including: from the one or more sources comprising the power generation subsystem, to the one or more thermal energy destinations comprising the internal temperature zone, using HVAC subsystems; from the one or more sources comprising the power generation subsystem, to the one or more thermal energy destinations comprising the external temperature zone, using at least the at least one radiator or the one or more exhaust ports; from the one or more sources comprising the power generation subsystem, to the one or more thermal energy destinations comprising the fuel supply subsystem, using the thermal energy interface subsystem comprising the heat exchanger or a vaporizer; from the one or more sources comprising the internal temperature zone, to the one or more thermal energy destinations comprising the fuel supply subsystem, using the HVAC subsystems and thereby reducing temperature in the internal temperature zone; from the one or more sources comprising the external temperature zone, to the one or more thermal energy destinations comprising the fuel supply subsystem, using one or more vents; and combinations thereof.

In accordance with aspects of the present invention, the executing thermal energy transfer from the power generation subsystem to the one or more thermal energy destinations can comprise, using a fluid in fluid communication with a component of the power generation subsystem to transport heat or thermal energy to a different location corresponding to a thermal energy destination, thereby reducing the temperature or excess thermal energy of the one or more sources.

In accordance with aspects of the present invention, the measuring, using one or more temperature sensing devices or thermal energy sensing devices, thermodynamic operating conditions in a multirotor aircraft comprising a first temperature corresponding to a source of thermal energy and one or more additional temperatures corresponding to thermal references can further comprise measuring one or more selected from the group consisting of a fuel temperature, a fuel tank temperature, a fuel cell temperature, a battery temperature, a motor controller temperature, a coolant temperature, a radiator temperature, a cabin temperature, and an outside-air temperature. The temperatures can be displayed for review using an interface to an ADSB or Remote ID unit for the avionics or other vehicle display system.

In accordance with aspects of the present invention, the computing, using an autopilot control unit or a computer processor and an algorithm based on the comparison result, a temperature adjustment protocol can comprise: determining whether the power generation subsystem has a higher temperature than the internal temperature zone set temperature, and determining whether the internal set temperature exceeds a set maximum temperature; determining whether the power generation subsystem has a higher temperature than an interface set temperature and determining whether the thermal energy interface subsystem temperature exceeds an interface maximum temperature; determining whether the power generation subsystem has a higher temperature than the external temperature zone; determining whether the external temperature zone has a higher temperature than the fuel supply subsystem; and determining a priority ranking of thermal destinations based on each determination.

In accordance with aspects of the present invention, the selecting and controlling, based on the temperature adjustment protocol, an amount and distribution of thermal energy transfer from the one or more sources further comprises ordering the one or more thermal energy destinations, selecting and controlling, based on the temperature adjustment protocol, an amount and distribution of thermal energy transfer from the one or more sources can further comprise: determining a difference between temperatures of the power generation subsystem and the internal temperature zone; determining a difference between temperatures of the power generation subsystem and the external temperature zone; determining a difference between temperatures of the power generation subsystem and the fuel supply subsystem; determining a difference between temperatures of the fuel supply subsystem and the internal temperature zone; determining a difference between temperatures of the external temperature zone and the fuel supply subsystem; and adjusting the amount and distribution based on each positive difference not exceeding a maximum to allocate proportionately to each of the one or more thermal destinations based on respective temperature difference.

In accordance with aspects of the present invention, the internal temperature zone further can comprise an internal temperature outlet corresponding to a cabin environment designed to contain one or more pilots or passengers and the HVAC subsystems that further comprise a cabin temperature sensor, ducts in fluid communication with one or more fans controlling distribution of a secondary working fluid, and at least one air conditioning unit comprising of a condenser, expansion valve, evaporator, compressor, conduits, in fluid communication with each other, and acting on the secondary working fluid external to the air conditioning unit.

In accordance with aspects of the present invention, the external temperature zone further can comprise an external temperature outlet, comprising an exhaust port or a vent.

In accordance with aspects of the present invention, the thermal interface of the thermal energy/temperature exchange subsystem further comprises one or more heat exchangers configured to transfer heat or thermal energy from the coolant supplied by coolant conduits in fluid communication with the one or more heat exchangers, across heat exchanger walls and heat exchanger surfaces, to the fuel supplied by fuel lines in fluid communication with the one or more heat exchangers, using thermodynamics including conduction, wherein the coolant and the fuel remain physically isolated from one another.

In accordance with aspects of the present invention, the executing thermal energy transfer from the one or more sources to the one or more thermal energy destinations further comprises diverting fluid flow of the fuel or the coolant using valves and pumps.

In accordance with aspects of the present invention, after executing thermal energy transfer from the one or more sources to the one or more thermal energy destinations, the method repeats measuring, using one or more temperature sensing devices or thermal energy sensing devices, thermodynamic operating conditions in a multirotor aircraft comprising a first temperature corresponding to a source of thermal energy, and one or more additional temperatures corresponding to thermal references, and then performs comparing, computing, selecting and controlling, and executing steps using post-transfer data for the one or more sources and the one or more thermal energy destinations to iteratively manage thermodynamic operating conditions in the multirotor aircraft.

BRIEF DESCRIPTION OF THE DRAWINGS

The invention description below refers to the accompanying drawings, of which:

FIG. 7 depicts side and top views of a multirotor aircraft with six rotors cantilevered from the frame of the multirotor aircraft in accordance with an embodiment of the present invention, indicating the location and compartments housing the fuel supply and power generation subsystems;

FIG. 8 depicts two views demonstrating the position and compartments housing the fuel supply and power generation subsystems; extending from the frame of the multirotor aircraft and spaces between the rotor diameters;

FIG. 11 depicts diagrams demonstrating alternative example positions of fuel supply and power generation subsystems within the multirotor aircraft;

FIG. 15 depicts example internal subcomponents of fuel cells within the multirotor aircraft;

FIG. 19 depicts example subcomponents of fuel tanks and fuel supply subsystem within the multirotor aircraft;

DETAILED DESCRIPTION

Figure 1A:
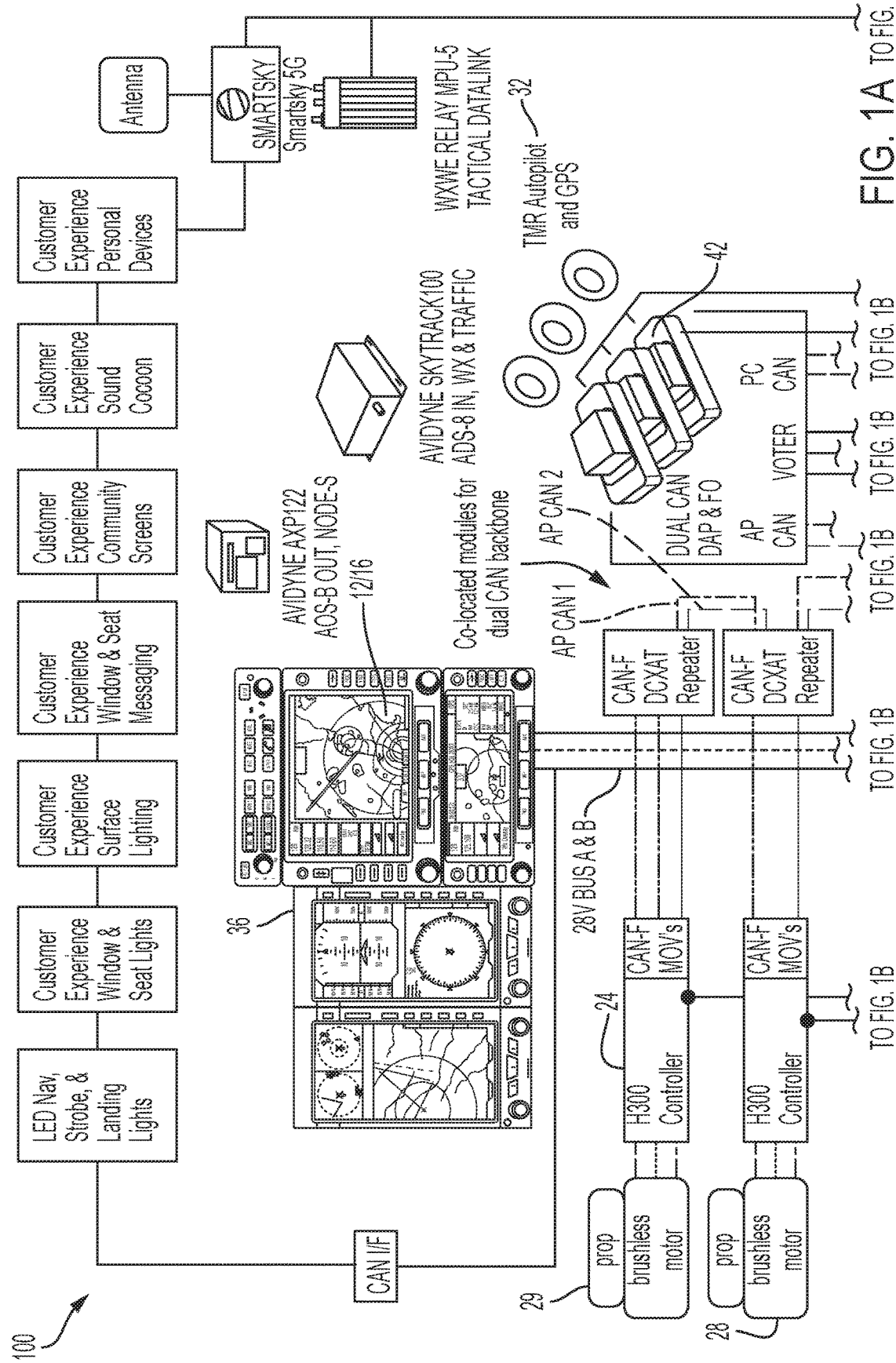
FIGS. 1A, 1B, 1C, and 1D depict a system block diagram for practicing the present invention, including logic controlling the integrated system for multimode thermal energy transfer and related components.

To provide an overall understanding, certain illustrative embodiments will now be described; however, it will be understood by one of skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods.

An illustrative embodiment of the present invention relates to an integrated system and related method for multimode thermal energy transfer for use in a multirotor aircraft. The integrated system and related method provide fluid heat recovery that leverages advantageous characteristics of heat exchangers to improve efficiency and effectiveness in recovering heat from higher enthalpy states (excess heat) including aircraft electronic components and selectively transferring heat or thermal energy between different subsystems, components and zones to warm portions of the aircraft, and also provides heat or thermal energy transfer using lower enthalpy states (lower temperature resources including e.g. a liquid hydrogen fuel tank) to cool portions of the aircraft, to dynamically meet needs for heating or cooling in an aircraft while using existing hot or cold reservoirs instead of consuming additional resources to heat or cool objects to requisite or preferred temperatures. The system and method raises or lowers temperatures based on heat transfer from the appropriately selected subsystems, components or zones, where there are several different sets of heat sources and thermal energy destinations that can be selected by the system and method to accomplish various temperature adjustments by heat transfer that captures waste energy rather than requiring input of additional energy to power heaters or air conditioners as required by conventional systems. The integrated system comprises at least: a fuel supply subsystem comprising a fuel tank in fluid communication with one or more fuel cell modules and configured to store and transport a fuel; a power generation subsystem comprising at least one radiator in fluid communication with the one or more fuel cell modules, configured to store and transport a coolant; a thermal energy interface subsystem comprising a heat exchanger configured with a plurality of fluid conduits; an internal temperature zone comprising heating, ventilation and air conditioning (HVAC) subsystems comprising ducts and an air conditioning unit; an external temperature zone comprising one or more vents, one or more outlets, and one or more exhaust ports; one or more temperature sensing devices or thermal energy sensing devices, configured to measure thermodynamic operating conditions; and an autopilot control unit comprising a computer processor configured to compute a temperature adjustment protocol comprising one or more priorities for energy transfer using one or more thermal references and an algorithm based on a comparison result of measured thermodynamic operating conditions, and configured to select and control, based on the temperature adjustment protocol, an amount and distribution of thermal energy transfer from one or more sources to one or more thermal energy destinations.

FIGS. 1-24, wherein like parts are designated by like reference numerals throughout, illustrate an example embodiment or embodiments of a method, apparatus, and system for fluid heat recovery comprising a fluid heat exchanger, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIGS. 1A, 1B, 1C and 1D depict in block diagram form one type of system 100 that may be employed to carry out the present invention. Here, as depicted in FIG. 1A, this one-to five-person personal aerial vehicle (PAV) or unmanned aerial vehicle (UAV) includes on-board equipment such as a primary flight displays 12, an Automatic Dependent Surveillance-B (ADSB) or Remote ID transmitter/receiver 14, a global-positioning system (GPS) receiver typically embedded within 12, a fuel gauge 16, an air data computer to calculate airspeed and vertical speed 38, mission control tablet computers 36 and mission planning software 34, and redundant flight computers (also referred to as autopilot computers 32), all of which monitor either the operation and position of the aircraft or monitor and control the engines and generator-sets and fuel systems and provide display presentations that represent various aspects of those systems' operation and the aircraft's state data, such as altitude, attitude, ground speed, position, local terrain, recommended flight path, weather data, remaining fuel and flying time, motor voltage and current status, intended destination, and other information necessary to a successful and safe flight. The engine and generator set may readily be replaced by a hydrogen-powered Fuel Cell subsystem to generate electricity, where the fuel cell subsystem combines stored hydrogen with compressed air to generate electricity with a byproduct of only water and heat, thereby forming an engine and generator set or fuel cell 18. The engine and generator set or fuel cell 18 can also include a fuel pump and cooling system 44 and an engine supercharger 46 to optimize the efficiency and/or performance of the engine and generator set or fuel cell 18. As would be appreciated by one skilled in the art, the engine and generator set may also be replaced by a battery subsystem, consisting of high-voltage battery array, battery monitoring and charger subsystem, though such a configuration would not be fuel cell based. This disclosure is meant to address both kinds of power generation systems as well as stored-energy battery systems. For purposes of illustration, the present description focuses on a fuel cell form of electricity generation.

Vehicle state (pitch, bank, airspeed, vertical speed and altitude) are commanded a) by the operator using either a1) physical motions and commands made using the mission control tablet computers 36 as an input device; a2) physical motions and commands made using the sidearm controllers; or a3) physical motions and commands transmitted across secure digital or tactical datalinks or radio channels from a Ground-Remote Pilot; or a4) pre-planned mission routes selected and pre-programmed using the mission control tablet computers 36 and mission-planning software 34 in support of autonomous mode, or b) in UAV mode using pre-planned mission routes selected and pre-programmed using the mission control tablet computers 36 and mission-planning software 34 and uploaded to the onboard autopilot system prior to launch. The mission control tablet computer 36 may transmit the designated route or position command set to autopilot computers 32 and voter 42 over a serial, radio-control or similar datalink, and if so, the autopilot may then utilize that designated route or position command set (e.g. a set of altitudes and positions to form a route that is to be traveled from origin to destination). Depending on the equipment and protocols involved in the example embodiment, a sequence of commands may be sent using a repeating series of servo control pulses carrying the designated command information, represented by pulse-widths varying between 1.0 to 2.0 milliseconds contained within a 'frame' of, for example, 10 to 30 milliseconds). Multiple 'channels' of command data may be included within each 'frame', with the only caveat being that each maximum pulse width must have a period of no output (typically zero volts or logic zero) before the next channel's pulse can begin. In this way, multiple channels of command information are multiplexed onto a single serial pulse stream within each frame. The parameters for each pulse within the frame are that it has a minimum pulse width, a maximum pulse width, and a periodic repetition rate. The motor's RPM is determined by the duration of the pulse that is applied to the control wire. Note that the motor's RPM is not determined by the duty cycle or repetition rate of the signal, but by the duration of the designated pulse. The autopilot might expect to see a pulse every 20 ms, although this can be shorter or longer, depending upon system requirements. The width of each channel's pulse within the frame will determine how fast the corresponding motor turns. For example, anything less than a 1.2 ms pulse may be pre-programmed as 'Motor OFF' or 0 RPM, and pulse widths ranging from 1.2 ms up to 2.0 ms will proportionately command the motor from 20% RPM to 100% RPM. Given the physical constraints of the motor being controlled, the exact correlation between pulse width and resultant motor RPM will be a function of each system's programming. In another embodiment, motor commands may be transmitted digitally from the autopilot to the motor controllers and status and/or feedback may be returned from the motor controllers to the autopilot using a digital databus such as Ethernet or CAN (Controller Area Network), one of many available digital databusses capable of being applied. A modem (modulator—demodulator) may be implicitly present within the datalink device pair, so that the user sends Ethernet or CAN commands, the modem transforms said data into a format suitable for reliable transmission and reception across one or more radio channels, and the mating modem transforms that format back into the original Ethernet or CAN commands at the receiving node, for use within the autopilot system. As understood by a person of ordinary skill in the art, many possible embodiments are available to implement wireless data links between a tablet or ground pilot station and the vehicle, just as many possible embodiments are available to transmit and receive data and commands among the autopilot, the motor controllers, and the fuel cells and support devices that form the on-board power generation and motor controlling system.

Figure 1B:
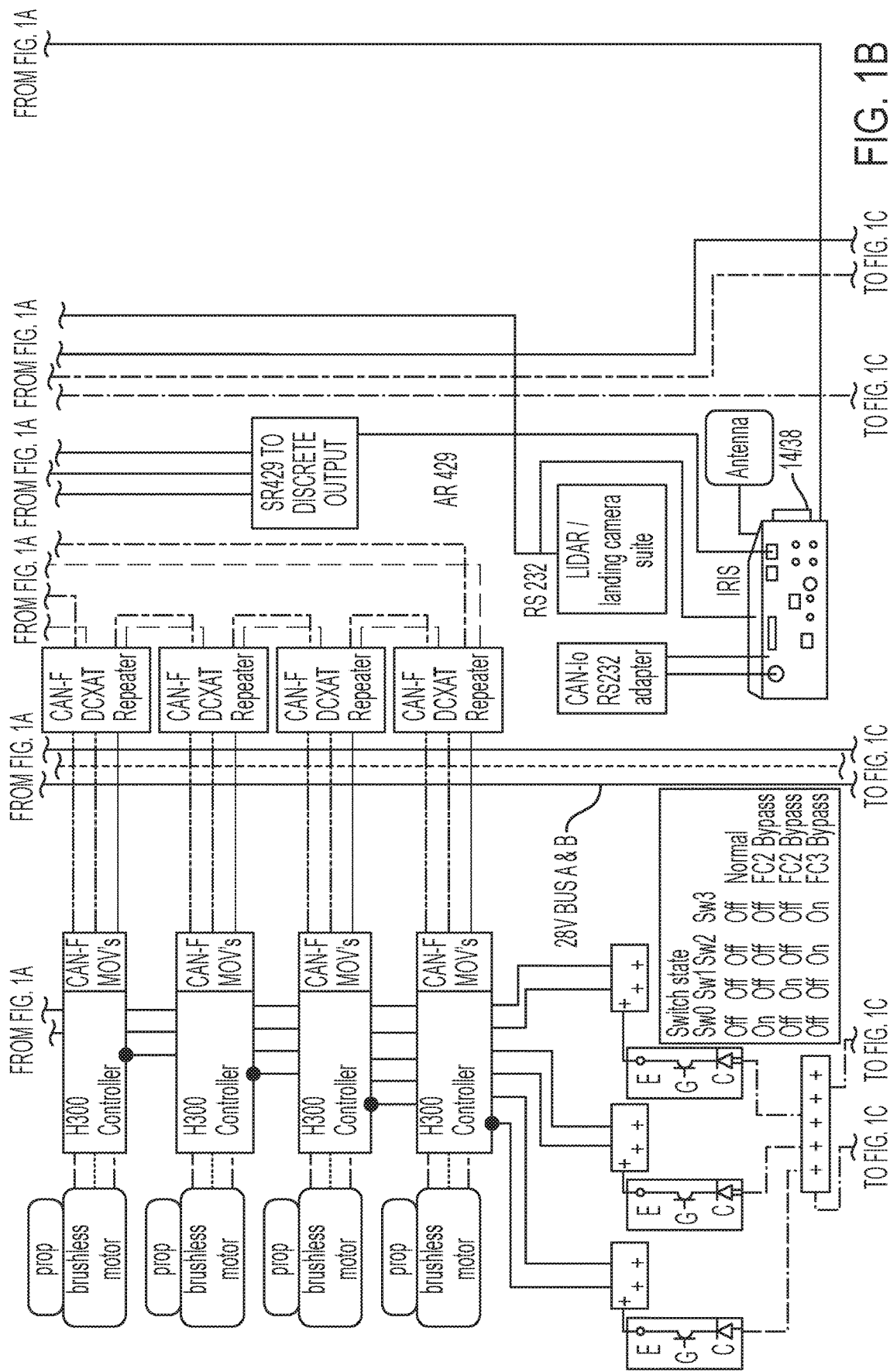

The receiver at each autopilot then uses software algorithms to translate the received channel pulses correlating to channel commands from the tablet computer or alternate control means (in this example the set of pulse-widths representing the control inputs such as pitch, bank and yaw and rpm) into the necessary outputs to control each of the multiple (in this example six) motor controllers 24, motors, and propellers 29 depicted in FIG. 1B to achieve the commanded vehicle motions. Commands may be transmitted by direct wire, or over a secure RF (wireless) signal between transmitter and receiver, and may use an RC format, or may use direct digital data in Ethernet, CAN or another suitable protocol. The autopilot is also responsible for measuring other vehicle state information, such as pitch, bank angle, yaw, accelerations, and for maintaining vehicle stability using its own internal sensors and available data.

The command interface between the autopilots and the multiple motor controllers 24 will vary from one equipment set to another, and might entail such signal options to each motor controller 24 as a variable DC voltage, a variable resistance, a CAN, Ethernet or other serial network command, an RS-232 or other serial data command, or a PWM (pulse-width modulated) serial pulse stream, or other interface standard obvious to one skilled in the art. Control algorithms operating within the autopilot computer 32 perform the necessary state analysis, comparisons, and generate resultant commands to the individual motor controllers 24 and monitor the resulting vehicle state and stability. A voting means 42 decides which two of three autopilot computers 32 are in agreement, and automatically performs the voting operation to connect the proper autopilot computer 32 outputs to the corresponding motor controllers 24. For a redundant system, triple-redundant is the most common means of voting among inputs to detect a possible failure, but other levels of redundancy are also possible, and are obvious to one skilled in the art.

Figure 1C:
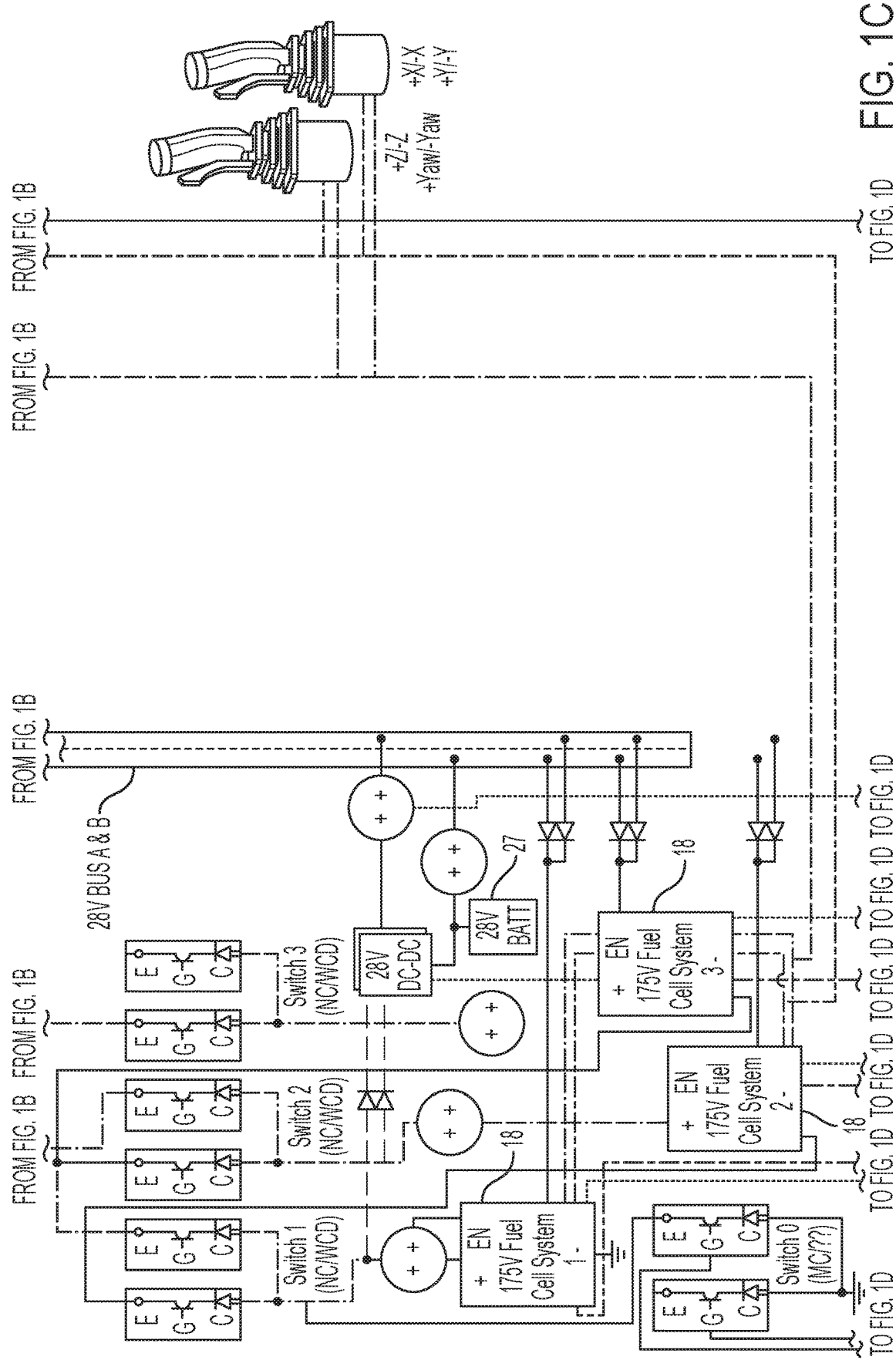

In a preferred control embodiment, and as depicted in FIG. 1C, the commanded vehicle motion and engine or motor rpm commands could also be embodied by a pair of joysticks and a throttle, similar to those used to control radio-controlled aircraft, or even by a pair of traditional sidearm controllers including a throttle, where the joysticks/sidearm controllers provide readings (which could be potentiometers, hall-effect sensors, or rotary-variable differential transformers (RVDT)) indicative of commanded motions which may then be translated into the appropriate message format and transmitted to the autopilot computers 32 by network commands or signals, and thereby used to control the multiple motor controllers, motors and propellers/rotors 29. The sidearm controller or joystick can also be embodied in a 'steering wheel' or control yoke capable of left-right and fore-aft motion, where the 2-axis joystick or control yoke provides two independent sets of single-or dual-redundant variable voltage or potentiometer settings indicative of pitch command (nose up or nose down) and bank command (left side up or left side down). Alternatively, instead of pitch and roll motions, the autopilot may also be capable of generating 'go left', 'go right' go forward' go backward', 'yaw left' or 'yaw right' commands, all while the autopilot is simultaneously maintaining the vehicle in a stable, level or approximately level state. This latter control means offers greater comfort for the passenger(s) since it is more similar to ground-based vehicle motions (such as an automobile) than an air vehicle such as a winged aircraft.

Motors of the multiple motors and propellers 29 in the preferred embodiment are brushless synchronous three-phase AC or DC motors, capable of operating as an aircraft motor, and that are either air-cooled or liquid cooled or both.

Throughout all of the system operation, controlling and operating the vehicle is performed with the necessary safety, reliability, performance and redundancy measures required to protect human life to accepted flight-worthiness standards.

Figure 2:
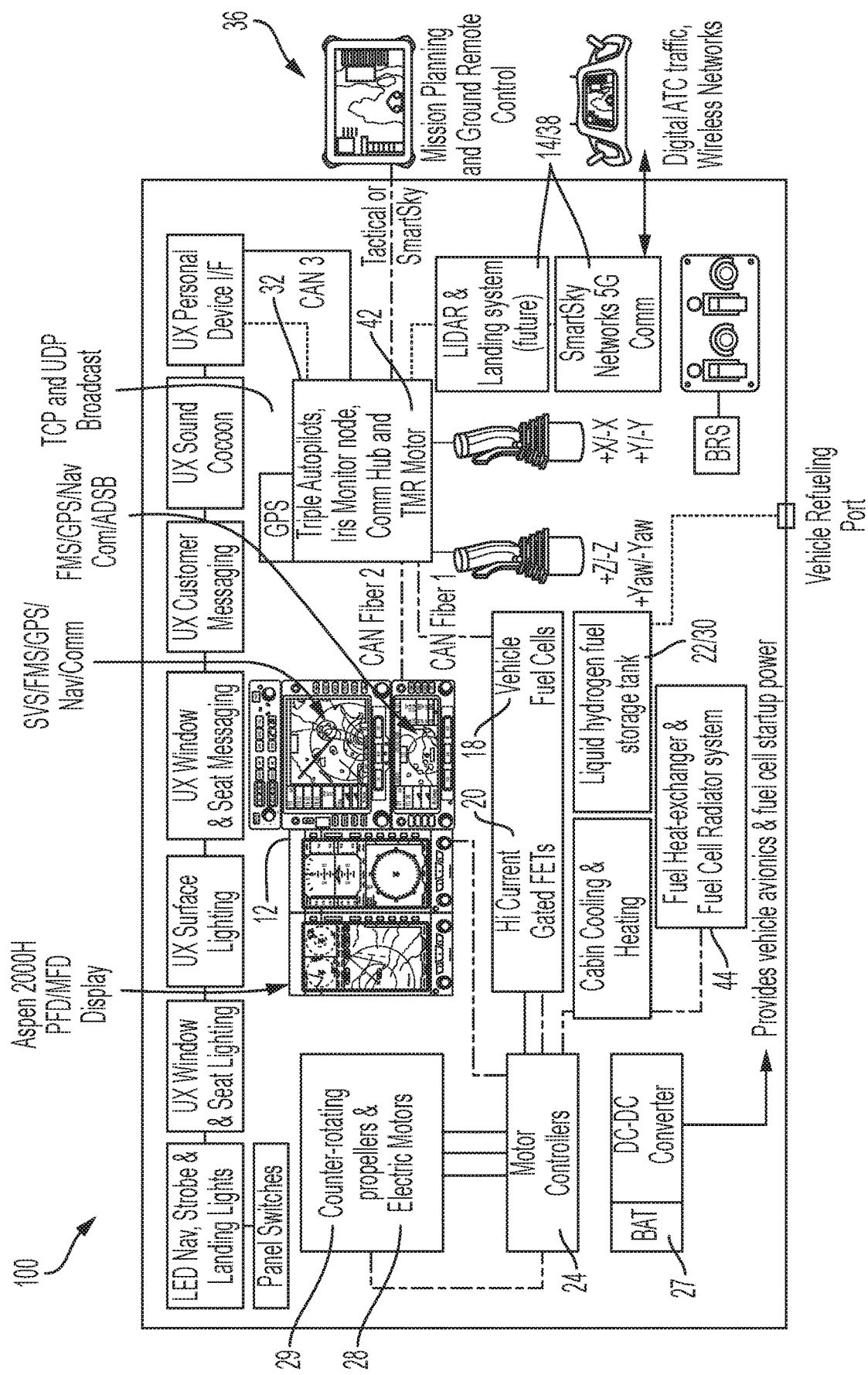
FIG. 2 depicts an example system diagram of electrical and systems connectivity for various control interface components of a system of the invention.
Figure 6:
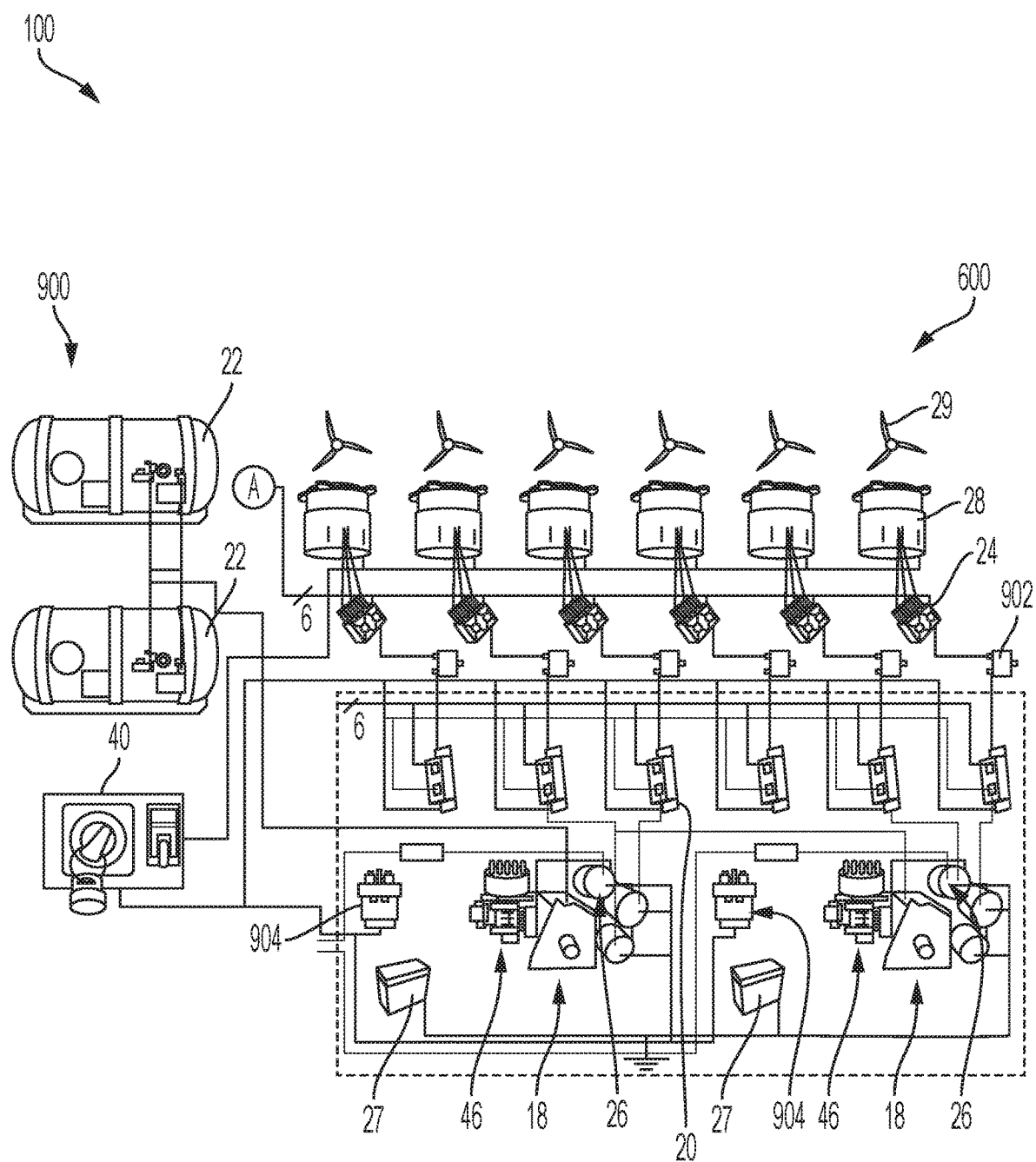
FIG. 6 depicts electrical and systems connectivity of various fuel supply, power generation, and motor control components of a system of the invention.

Electrical energy to operate the vehicle is derived from the engine-generator sets or fuel cells 18, which provide voltage and current to the motor controllers 24 through optional high-current diodes or Field Effect Transistors (FETs) 20 and circuit breakers 902 (shown in greater detail in FIGS. 2 and 6). High current contactors 904 or similar devices are engaged and disengaged under control of the vehicle key switch 40, similar to a car's ignition switch, which applies voltage to the starter/generator 26 to start the fuel cells 18 or engine-generators and produce electrical power. For example, the high current contactors 904 may be essentially large vacuum relays that are controlled by the vehicle key switch 40 and enable the current to flow to the starter/generator 26. In accordance with an example embodiment of the present invention, the starter/generator 26 also supplies power to the avionic systems of the aircraft. Once stable power is available, the motor controllers 24 each individually manage the necessary voltage and current to achieve the desired thrust by controlling the motor in either RPM mode or torque mode, to enable thrust to be produced by each motor and propeller/rotor combination 28. The number of motor controllers 24 and motor/propeller combinations 28 per vehicle may be as few as 4, and as many as 16 or more, depending upon vehicle architecture, desired payload (weight), fuel capacity, electric motor size, weight, and power, and vehicle structure. Advantageously, implementing a multirotor vehicle having a plurality of independent motor controllers 24 and motors, allows the use of smaller motors with lower current demands, such that fuel cells can produce the necessary voltage and current at a total weight for a functional aviation vehicle while achieving adequate flight durations, and allows the failure of one or more motors or motor controllers to be compensated for by the autopilot to allow continued safe flight and landing in the event of said failure.

Figure 1D:
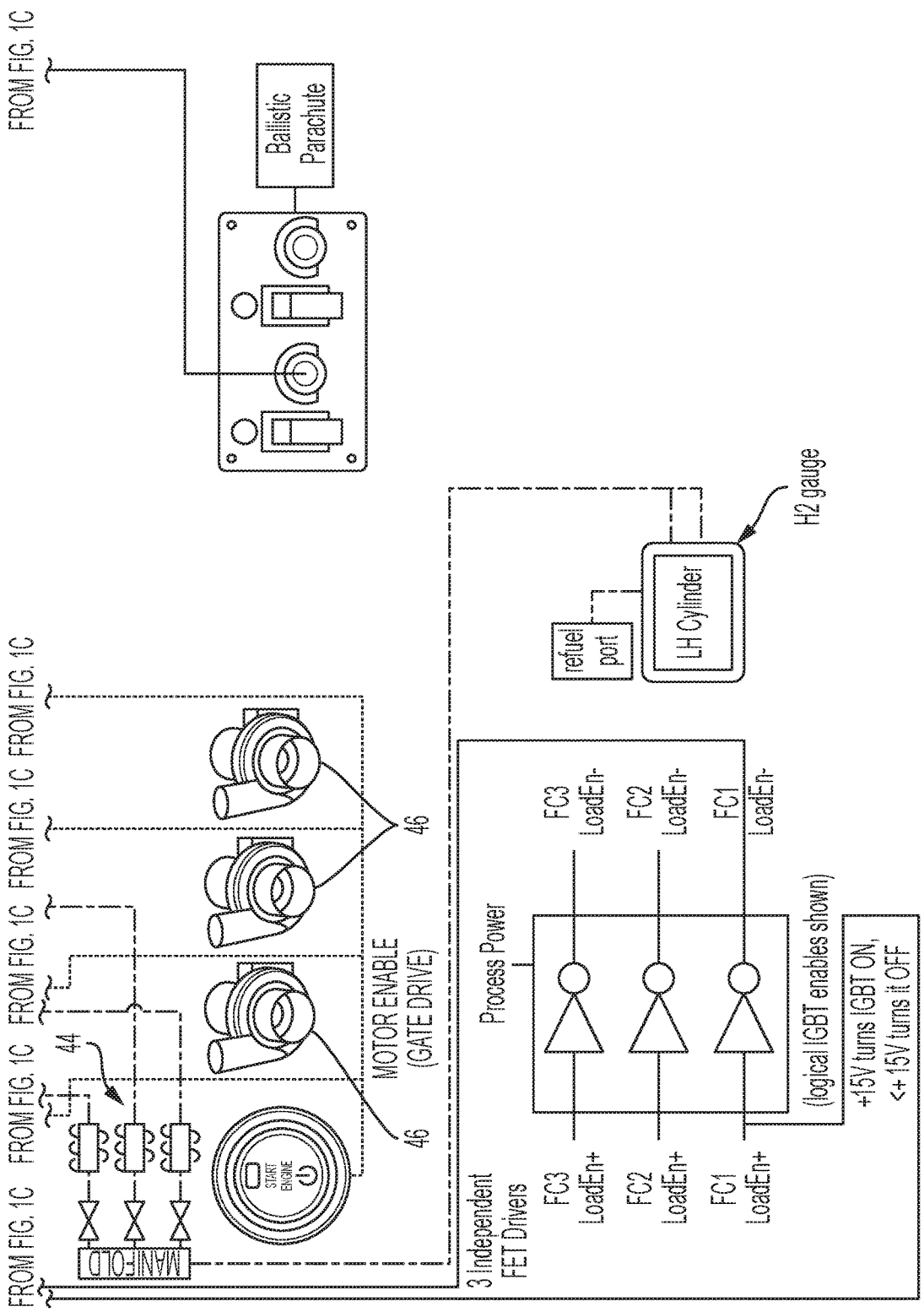

The engines and generator sets or fuel cells 18 are fed by on-board fuel storage 22. The ability to refuel the multirotor aircraft's tanks at the origin, at the destination, or at roadside refueling stations is fundamental to the vehicle's utility and acceptance by the commuting public. Advantageously, the ability to refuel the fuel storage tanks to replace the energy source for the motors reduces the downtime required by conventional all electric vehicles (e.g., battery operated vehicles), which must be recharged from an external electricity source, which may be a time-consuming process. Variations are included that will operate from Compressed Natural Gas (CNG), Liquid Petroleum Gas (LPG), AvGas (typical aviation fuel), and/or Hydrogen (for the fuel-cell versions) as depicted in FIG. 1D. As would be appreciated by one skilled in the art, the engine and generator sets can be powered by LPG, CNG, or AvGas fuel, or fuel cells 18 can be powered by hydrogen. Accordingly, the engine and generator sets or fuel cells 18 can create electricity from fuel to provide power to the motors on the multirotor aircraft.

Advantageously, the use of engine and generator sets or fuel cells 18 are more weight efficient than batteries and store a greater energy density than existing Li ion batteries, thereby reducing the work required by the motors to produce lift. Additionally, the use of hydrogen or liquid hydrogen fuel cells, LPG, CNG, or AvGas reduces the amount of work required by the motors due to the reduced weight as the fuel 30 is consumed.

Due to the nature of the all-electric multirotor vehicle, it is also possible to carry an on-board high-voltage battery and recharging subsystem in place of engine and generator sets or fuel cells 18, with an external receptacle to facilitate recharging the on-board batteries. In some instances, it may also be desirable to operate the vehicle at the end of an electrical and data tether, for long-duration unmanned airborne surveillance, security or other applications. In this situation, power would be replenished or provided via the tether cable, and control information could be provided either by onboard systems as described herein, or by bidirectional wired or broadband or wireless or RF networks operated by ground controllers.

Power to operate the vehicle's avionics 12, 14, 16, 32, 34, 36, 38 and support lighting is provided by either a) a low-voltage starter-generator 26 powered by the engine and generator sets or fuel cells 18 and providing power to avionics battery 27, or b) a DC to DC Converter providing energy to Avionics Battery 27. If the DC to DC Converter is used, it draws power from high-voltage produced by the engine and generator sets or fuel cells 18 and down-converts the higher voltage, typically 300V DC to 600 VDC in this embodiment, to either 12V, 24V or 28V or other voltage standards, any of which are voltages typically used in small aircraft systems. Navigation, Strobe and Landing lights draw power from 26 and 27, and provide necessary aircraft illumination for safety and operations at night under US and foreign airspace regulations. Suitable circuit breaker 902 and switch means are provided to control these ancillary lighting devices as part of the overall system. These lights are commonly implemented as Light Emitting Diode (LED) lights, and may be controlled either directly by one or more switches, or by a databus-controlled switch in response to a CAN or other digital databus command. If a CAN or databus command system is employed as shown in FIG. 1, then multiple 'user experience' or UX devices may also be employed, to provide enhanced user experience with such things as cabin lighting, seat lighting, window lighting, window messaging, sound cancellation or sound cocoon control, exterior surface lighting, exterior surface messaging or advertising, seat messaging, cabin-wide passenger instruction or in-flight messaging, passenger weight sensing, personal device (e.g. iPhone, tablet, iPad, (or Android or other device equivalents in the market or similar personal digital devices) connectivity and charging, and other integrated features as may be added within the cabin or vehicle.

Pairs of motors for the multiple motors and propellers 29 are commanded to operate at different RPM or torque settings (determined by whether the autopilot is controlling the motors in RPM or torque mode) to produce slightly differing amounts of thrust under autopilot control, thus imparting a pitch moment, or a bank moment, or a yaw moment, or a change in altitude, or a lateral movement, or a longitudinal movement, or simultaneously any combination of the above to the aircraft, using position feedback from the autopilot's 6-axis built-in or remote inertial sensors to maintain stable flight attitude. Sensor data is read by each autopilot to assess its physical motion and rate of motion, which is then compared to commanded motion in all three dimensions to assess what new motion commands are required.

Not all aircraft employ the same mix of avionics, instrumentation or controllers or motors, and some aircraft will include equipment different from this mix or in addition to this mix. Not shown for example are radios as may be desirable for communications or other small ancillary avionics customary in general aviation aircraft of this size. Whatever the mix is, though, some set of equipment accepts input commands from an operator, translates those input commands into differing thrust amounts from the pairs of counter-rotating motors and propellers 29, and thus produces pitch, bank, yaw, and vertical motion of the aircraft, or lateral and longitudinal as well as and vertical and yaw motion of the aircraft, using differing commands to produce differential thrust from the electric motors 28 operating propellers/rotors 29. When combined with avionics, instrumentation and display of the aircraft's current and intended location, the set of equipment enables the operator, whether inside the vehicle, on the ground via datalink, or operating autonomously through assignment of a pre-planned route, to easily and safely operate and guide the aircraft to its intended destination.

The autopilot computer 32 is embodied in a microprocessor-based circuit and includes the various interface circuits required to communicate with the aircraft's data busses, multi-channel servo or network controllers (inputs) 35 and 37, and motor controller (outputs) 24, and to take inertial and attitude measurements to maintain stability. This is further detailed in FIG. 2, which depicts a block diagram, detailing the key features of the redundant Motor Management Computer and voting in relation to the overall system. In addition, autopilot computer 32 may also be configured for automatic recording or reporting of aircraft position, aircraft state data, velocity, altitude, pitch angle, bank angle, thrust, location, and other parameters typical of capturing aircraft position and performance, for later analysis or playback. To accomplish these requirements, said autopilot contains an embedded air data computer (ADC) and embedded inertial measurement sensors, although these data could also be derived from small, separate stand-alone units. The autopilot may be operated as a single, dual, quad, or other controller, but for reliability and safety purposes, the preferred embodiment uses a triple redundant autopilot, where the units share information, decisions and intended commands in a co-operative relationship using one or more networks (two are preferred, for reliability and availability). In the event of a serious disagreement outside of allowable guard-bands, and assuming three units are present, a 2-out-of-3 vote determines the command to be implemented by the motor controllers 24, and the appropriate commands are automatically selected and transmitted to the motor controllers 24. The operator is not typically notified of the controller disagreement during flight, but the result will be logged so that the units may be scheduled for further diagnostics post-flight.

The mission control tablet computer 36 is typically a single or a dual redundant implementation, where each mission control tablet computer 36 contains identical hardware and software, and a screen button designating that unit as 'Primary' or 'Backup'. The primary unit is used in all cases unless it has failed, whereby either the operator (if present) must select the 'Backup' unit through a touch icon, or an automatic fail-over will select the Backup unit when the autopilots detect a failure of the Primary. When operating without a formal pre-programmed route, the mission control tablet computer 36 uses its internal motion sensors to assess the operator's intent and transmits the desired motion commands to the autopilot. When operating without a mission planning computer or tablet, the autopilots receive their commands from the connected pair of joysticks or sidearm controllers. In UAV mode, or in manned automatic mode, the mission planning software 34 will be used pre-flight to designate a route, destination, and altitude profile for the aircraft to fly, forming the flight plan for that flight. Flight plans, if entered into the Primary mission control tablet computer 36, are automatically sent to the corresponding autopilot, and the autopilots automatically cross-fill the flight plan details between themselves and the Backup mission control tablet computer 36, so that each autopilot computer 32 and mission control tablet computer 36 carries the same mission commands and intended route. In the event that the Primary tablet fails, the Backup tablet already contains the same flight details, and assumes control of the flight once selected either by operator action or automatic fail-over.

For motor control of the multiple motors and propellers 29, there are three phases that connect from each high-current controller to each motor for a synchronous AC or DC brushless motor. Reversing the position of any two of the 3 phases will cause the motor to run the opposite direction. There is alternately a software setting within the motor controller 24 that allows the same effect, but it is preferred to hard-wire it, since the designated motors running in the opposite direction must also have propellers with a reversed pitch (these are sometimes referred to as left-hand vs right-hand pitch, or puller (normal) vs pusher (reversed) pitch propellers, thereby forming the multiple motors and propellers 29. Operating the motors in counter-rotating pairs cancels out the rotational torque that would otherwise be trying to spin the vehicle.

In the illustrated embodiment, the operational analyses and control algorithms described herein are performed by the on-board autopilot computer 32, and flight path and other useful data are presented on the avionics displays 12. Various aspects of the invention can be practiced with a different division of labor; some or all of the position and control instructions can in principle be performed outside the aircraft, in ground-based equipment, by using a broadband or 802.11 Wi-Fi network or Radio Frequency (RF) data-link or tactical datalink between the aircraft and the ground-based equipment.

For the illustrative embodiment of FIG. 1A, the representation of the highway in the sky display may include, for example, wickets or goal-posts appearing to fade into the depth of the display screen, thereby signifying where the aircraft is intended to fly. Other combinations of display graphics and terrain representations, as well as audible signals may be used to convey this or other information and/or warnings to the operator in whatever manner is most effective. For example, combinations of graphical depictions or audible messages could be used to indicate that the aircraft is being asked to depart outside of certain predetermined "cruise" or "intended" conditions, while the Motor Management Computer makes adjustments so as not to violate those intended conditions. As will be seen below, operating the aircraft within "cruise" or "intended" conditions serves the purpose of protecting the aircraft and the operator from unintended deviations or departure from safe flight. The goal of the 'highway in the sky' presentation is to enable an operator to select their destination, and then use the tablet computer as an input device to drive or guide the vehicle along the prescribed path to the destination.

The combination of the avionics display system coupled with the ADSB or Remote ID capability enables the multirotor aircraft to receive broadcast data from other nearby aircraft, and to thereby allow the multirotor aircraft to avoid close encounters with other aircraft; to broadcast own-aircraft position data to avoid close encounters with other cooperating aircraft; to receive weather data for display to the pilot and for use by the avionics display system within the multirotor aircraft; to allow operation of the multirotor aircraft with little or no requirement to interact with or communicate with air traffic controllers; and to perform calculations for flight path optimization, based upon own-aircraft state, cooperating aircraft state, and available flight path dynamics under the National Airspace System, and thus achieve optimal or near-optimal flight path from origin to destination.

FIG. 2 depicts a production version system diagram of an example embodiment. Production systems may include motor and propeller combinations 28, propellers 29 primary flight displays 12, the Automatic Dependent Surveillance-B (ADSB) or Remote ID transmitter/receiver 14, autopilot computer 32, the mission control tablet computers 36 and mission-planning software 34. In each case, a mission control tablet computer or sidearm controllers 36 may transmit the designated route or position command set or the intended motion to be achieved to autopilot computers 32 and voter 42 motor controllers 24, and air data computer to calculate airspeed and vertical speed 38. In some embodiments, fuel storage 22, the avionics battery 27, the fuel pump and cooling system 44, the engine supercharger 46, and a starter/alternator may also be included, monitored, and controlled. Any engines and generator sets or fuel cells 18 are fed by on-board fuel 30 storage 22 and use the fuel to produce a source of power for the multirotor aircraft. These components are configured and integrated to work together with 4D Flight Management to auto generate and execute routes from minimal input so a user doesn't need expertise to define proper route. Full Envelope Protection has been developed and implemented so neither users nor environments can push the vehicle out of safe flight envelope and operating conditions. Envelope Protection offers a Safer System for protecting occupants, developed using wake vortex modeling, weather data, and precisely designed redundant algorithms incorporating the highest standards available for performance and safety. The goal is that there is nothing the vehicle, the human operator/supervisor/passenger, or the environment can do that would push the vehicle out of its safety envelope unless or until there is a failure in some aspect of the system. The motors 28 in the preferred embodiment are brushless synchronous three-phase AC or DC motors, capable of operating as an aircraft motor, and that are air-cooled, liquid cooled or both. Motors 28 and fuel cells 18 generate excess or waste heat from forces including electrical resistance and friction, and so this heat may be subject to management and thermal energy transfer. In one embodiment, the motors 28 are connected to a separate cooling loop or circuit from the fuel cells 18. In another embodiment, the motors 28 are connected to a shared cooling loop or circuit with the fuel cells 18.

The system 1000 implements pre-designed fault tolerance or graceful degradation that creates predictable behavior during anomalous conditions with respect to at least the following systems and components: 1) flight control hardware; 2) flight control software; 3) flight control testing; 4) motor control system; 5) motors; and 6) fuel cell power generation system.

Flight control hardware may comprise, for example, a redundant set of Pixhawk flight controllers with 32-bit ARM processors. The vehicle may be configured with multiple Pixhawk flight controllers, commonly at least three (3) Pixhawks disposed inside the vehicle for redundancy. Each Pixhawk comprises: three (3) Accelerometers, three (3) gyros, three (3) magnetometers, two (2) barometers, and at least one (1) GPS device, although the exact combinations and configurations of hardware and software devices may vary. Sensor voting algorithms internal to each Pixhawk select the best value from each sensor type and handle switchovers/sensor failures. Flight control software comprises at least one PID style algorithm that has been developed using: 1) CAD data; 2) FEA data; and 3) actual propeller/motor/motor controller/fuel cell performance data measurements.

An example embodiment is shown for the vehicle's 6 motors, with each motor controlled by a dedicated motor controller. Electrical operating characteristics/data for each motor are controlled and communicated to the voting system for analysis and decision making Communication to the motor controllers happens (in this embodiment) between autopilot and motor controller via CAN, a digital network protocol, with fiber optic transceivers inline to protect signal integrity. In this embodiment, the use of fiber optics, sometimes known as 'Fly By Light' increases vehicle reliability and reduces any vulnerability to ground differentials, voltage differentials, electromagnetic interference, lighting, and external sources of electromagnetic interference, such as TV or radio broadcast towers, airport radars, airborne radars, and similar potential disturbances. Other instances of networks and electrical or optical or wireless media are possible as well. Measured parameters related to motor performance include motor temperature, IGBT temperature, voltage, current, torque, and revolutions per minute (RPM). Values for these parameters in turn correlate to the thrust expected under given atmospheric, power and pitch conditions.

The fuel cell control system may have various numbers of fuel cells based on the particular use configuration, for example a set of three hydrogen fuel cells configured for fault-tolerance. Operation and control of the cells is enabled and managed using the CAN protocol, although numerous other databus and control techniques are possible and will be obvious to one skilled in the art. One or more flight control algorithms stored within the autopilot will control and monitor the power delivered by the fuel cells via CAN. The triple-modular redundant auto-pilot can detect the loss of any one fuel cell and reconfigure the remaining fuel cells using a form of cross connection, thus ensuring that the fuel cell system is capable of continuing to operate the aircraft to perform a safe descent and landing. When the operating parameters are exceeded past a significant extent or preset limit, or emergency conditions exist such that a safe landing is jeopardized, the integrated emergency procedures are activated, and the deployment of an inter-rotor ballistic airframe parachute will be triggered.

Figure 3:
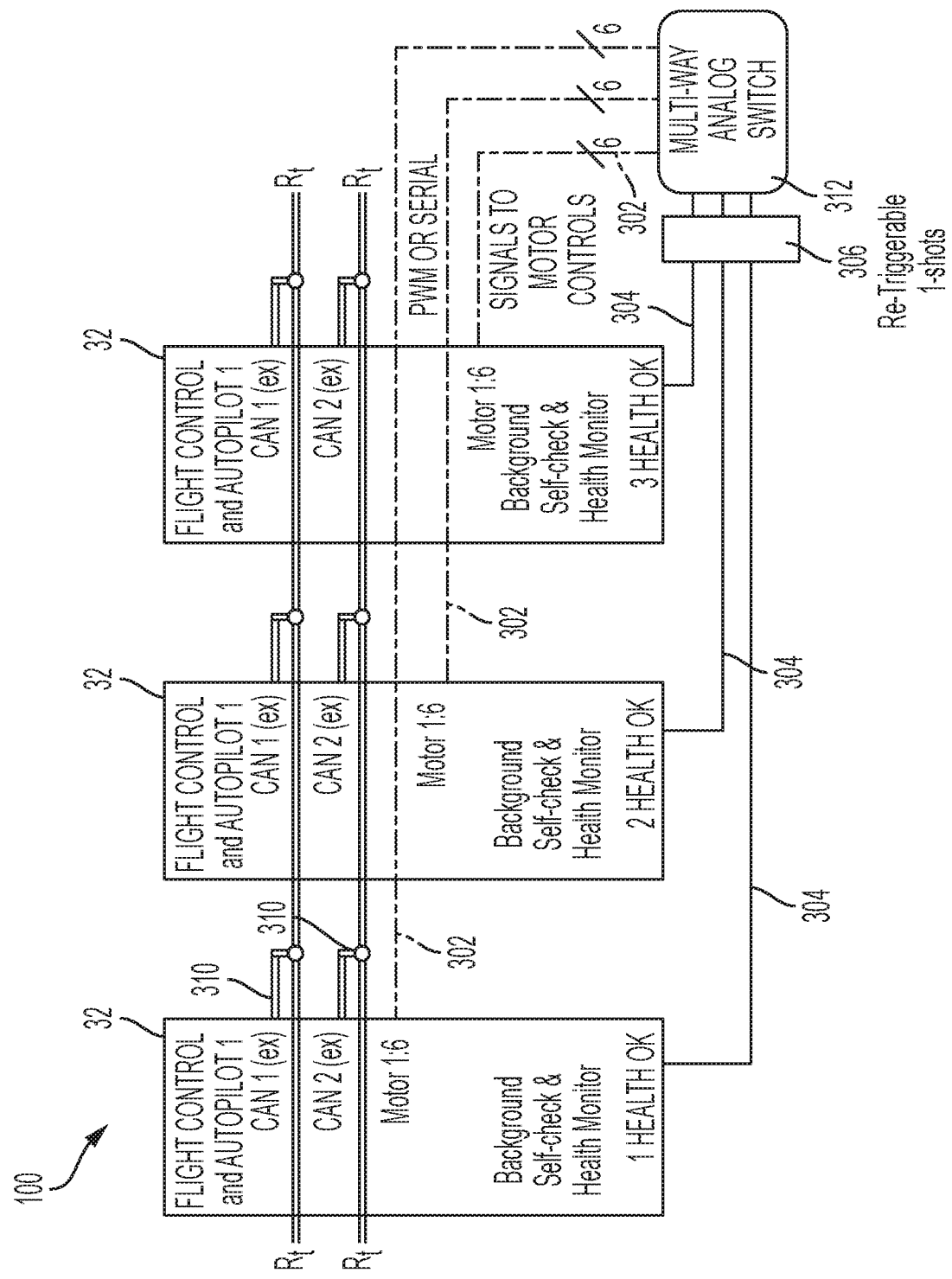
FIG. 3 depicts a more detailed block diagram, focused on the fault-tolerant, triple-redundant voting control and communications means.

FIG. 3 depicts a more detailed block diagram, showing the voting process that is implemented with the fault-tolerant, triple-redundant voting control and communications means to perform the qualitative decision process. Since there is no one concise 'right answer' in this real-time system, the autopilot computers 32 instead share flight plan data and the desired parameters for operating the flight by cross-filling the flight plan, and each measures its own state-space variables that define the current aircraft state, and the health of each Node. Each node independently produces a set of motor control outputs 314 (in serial PWM format in the described embodiment), and each node assesses its own internal health status. The results of the health-status assessment are then used to select which of the autopilots actually are in control of the motors of the multiple motors and propellers 29.

The voting process is guided by the following rules: 1) Each autopilot node (AP) 32 asserts "node ok" 304 when its internal health is good, at the start of each message. Messages occur each update period, and provide shared communications between AP's; 2) Each AP de-asserts "node ok" if it detects an internal failure, or its internal watchdog timer expires (indicating AP failure), or it fails background self-test; 3) Each AP's "node ok" signal must pulse at least once per time interval to retrigger a 1-shot 'watchdog' timer 306; 4) If the AP's health bit does not pulse, the watchdog times out and the AP is considered invalid; 5) Each AP connects to the other two AP's over a dual redundant, multi-transmitter bus 310. This may be a CAN network, or an RS-422/423 serial network, or an Ethernet network, or similar means of allowing multiple nodes to communicate; 6) The AP's determine which is the primary AP based on which is communicating with the cockpit primary tablet; 7) The primary AP receives flight plan data or flight commands from the primary tablet; 8) The AP's then crossfill flight plan data and waypoint data between themselves using the dual redundant network 310. This assures each autopilot (AP) knows the mission or command parameters as if it had received them from the tablet; 9) In the cockpit, the backup tablet receives a copy of the flight plan data or flight commands from its cross-filed AP; 10) Each AP then monitors aircraft state vs commanded state to ensure the primary AP is working, within an acceptable tolerance or guard-band range. Results are shared between AP's using the dual redundant network 310; 11) Motor output commands are issued using the PWM motor control serial signals 314, in this embodiment. Other embodiments have also been described but are not dealt with in detail here. Outputs from each AP pass through the voter 312 before being presented to each motor controller 24; 12) If an AP de-asserts its health bit or fails to retrigger its watchdog timer, the AP is considered invalid and the voter 312 automatically selects a different AP to control the flight based on the voting table; 13) The new AP assumes control of vehicle state and issues motor commands to the voter 312 as before; 14) Each AP maintains a health-status state table for its companion AP's. If an AP fails to communicate, it is logged as inoperative. The remaining AP's update their state table and will no longer accept or expect input from the failed or failing AP; 15) Qualitative analysis is also monitored by the AP's that are not presently in command; 16) Each AP maintains its own state table plus 2 other state tables and an allowable deviation table; 17) The network master issues a new frame to the other AP's at a periodic rate, and then publishes its latest state data; 18) Each AP must publish its results to the other AP's within a programmable delay after seeing the message frame, or be declared invalid; 19) If the message frame is not received after a programmable delay, node 2 assumes network master role and sends a message to node 1 to end its master role. Note that the redundant communication systems are provided in order to permit the system to survive a single fault with ne degradation of system operations or safety. More than a single fault initiates emergency system implementation, wherein based on the number of faults and fault type, the emergency deceleration and descent system may be engaged to release an inter-rotor ballistic parachute.

Figure 4:
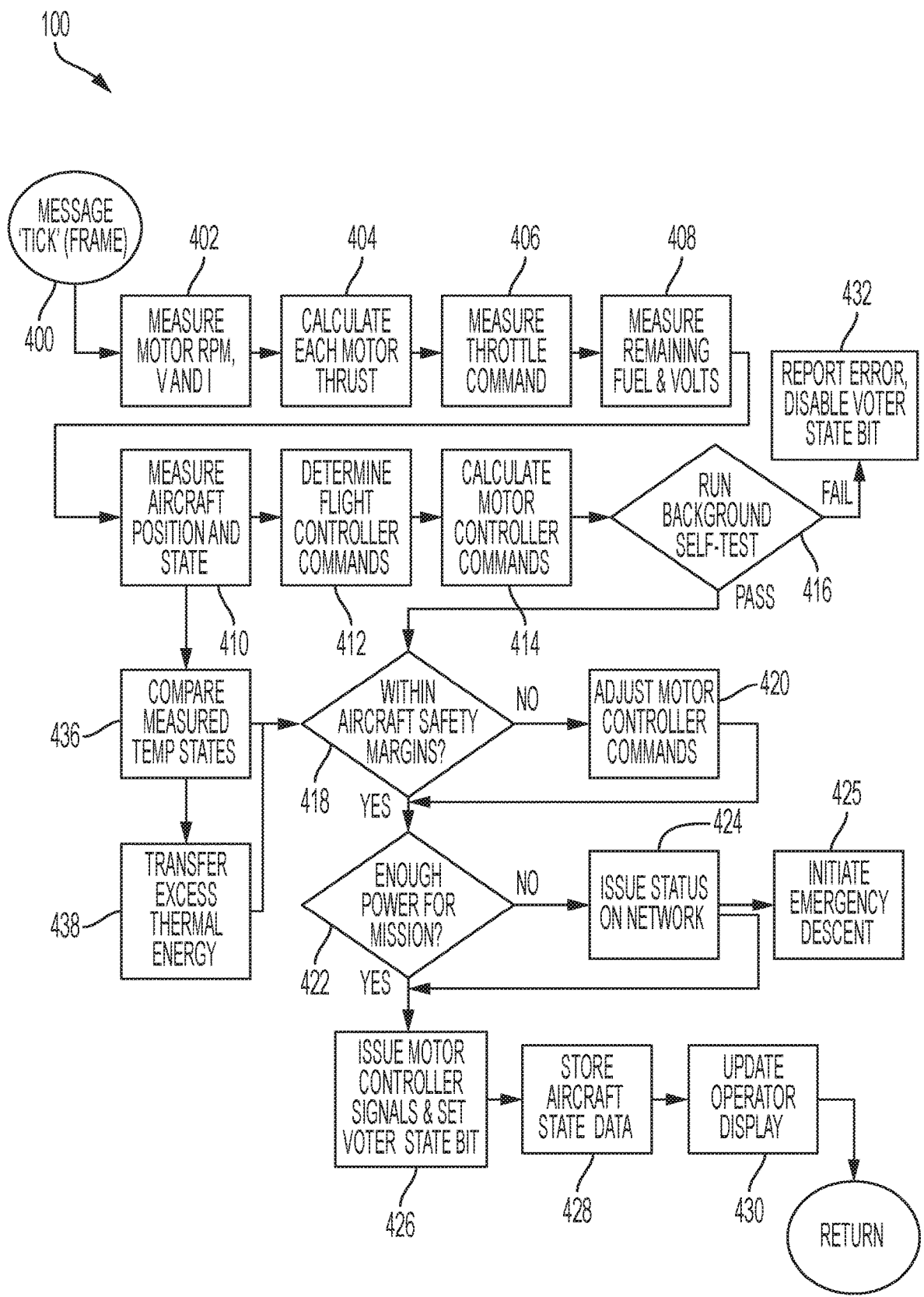
FIG. 4 depicts a flow chart that illustrates the present invention in accordance with one example embodiment.

Multi-way analog switch 312 monitors the state of 1.0K, 2.0K and 3.0K and uses those 3 signals to determine which serial signal set 302 to enable so that motor control messages 314 may pass between the controlling node and the motor controllers 24. This motor controller 24 serial bus is typified by a PWM pulse train in the preferred embodiment, although other serial communications may be used such as RS-232, CAN, or a similar communications means. In a preferred embodiment, the PWM pulse train is employed; with the width of the PWM pulse on each channel being used to designate the percent of RPM that the motor controller 24 should achieve. This enables the controlling node to issue commands to each motor controller 24 on the network. FIG. 4 provides additional detail on the voting and signal switching mechanism in one embodiment of the technique, and illustrates one way in which the multiple (typically one per motor plus one each for any other servo systems) command stream outputs from the three autopilot computers can be voted to produce a single set of multiple command streams, using the system's knowledge of each autopilot's internal health and status.

FIG. 4 depicts a flowchart that illustrates in simplified form a measurement-analysis-adjustment-control approach that some example embodiments of the invention may employ. The system enters the routine 400 periodically, at every "tick" of a periodic system frame as initiated by the controlling AP via an output message. The frequency at which this occurs is selected to be appropriate to the parameters being sensed and the flight dynamics of the vehicle, and in some cases the frequencies may be different for different measurements. For the sake of simplicity, though, the frequency is the same for all of them, and, for the sake of concreteness, we apply an oversampling frequency of forty times per second or every 25 milliseconds, more or less.

As block 402 in FIG. 4 indicates, the system first takes measurements of various sensor outputs indicative of each motor's performance of the multiple motors and propellers 29, including propeller RPM, motor voltage, motor current and (if available) temperature or similar thermodynamic operating conditions. In this system, such measurement data may be readily accessed through each motor controller's 24 serial data busses, and the illustrated embodiment selects among the various available measurement parameters that can be obtained in this manner.

With the motor data thus taken, the system performs various analyses, as at block 404, which may be used to calculate each motor's thrust and contribution to vehicle lift and attitude. Block 406 then measures the throttle command, by detecting where the tablet throttle command or throttle lever has been positioned by the operator and notes any change in commanded thrust from prior samples.

Block 408 measures the voltage, current drawn, and estimated remaining fuel 30. This data is then used as part of the analysis of remaining flight duration for the trip or mission underway and is made available to the operator.

As block 410 in FIG. 4 indicates, the autopilot computer 32 gathers a representative group of aircraft measurements from other embedded inertial sensors and (optionally) other onboard sensors including air data sensors, and GPS data derived by receiving data from embedded GPS receivers. Such measurements may include air speed, vertical speed, pressure altitude, GPS altitude, GPS latitude and GPS longitude, outside-air temperature (OAT), pitch angle, bank angle, yaw angle, pitch rate, bank rate, yaw rate, longitudinal acceleration, lateral acceleration, and vertical acceleration. For some of the parameters, there are predetermined limits with which the system compares the measured values. This data may be used to determine thermodynamic operating conditions and is made available to the operator. These may be limits on the values themselves and/or limits in the amount of change since the last reading or from some average of the past few readings. Limits may be related to thermal references derived from thermodynamics, components, settings, parameters, and operating conditions.

Block 412 then measures the tablet flight controller or sidearm controller command, by detecting where the tablet or sidearm units have been positioned by the operator in space and notes any change in commanded position from prior samples. If operating in pre-planned (UAV) mode, Block 412 assesses the next required step in the pre-planned mission previously loaded to the autopilot.

Block 414 then assimilates all of the vehicle state data and commanded data from the operator, and calculates the intended matrix of motor controller 24 adjustments necessary to accommodate the desired motions. Block 416 then executes the background health-status tests, and passes the command matrix on to block 418. If the background health-status test fails, Block 416 reports the error, and disables the voter 312 output state bit at Block 432. If the test itself cannot be run, the voter 312 output state bit(s) will cease to pulse, and the external watchdog will declare the failure of that controller, allowing another to take over through the external voter 312 action.

Block 418 in turn examines the intended matrix of commands, and assesses whether the intended actions are within the aircraft's safety margins. For example, if motor controller 3 is being commanded to output a certain current, is that current within the approved performance metrics for this aircraft. If not, block 420 makes adjustments to the matrix of motor controller 24 commands, and provides an indication to the Display to indicate that vehicle performance has been adjusted or constrained.

Similarly, Block 422 examines the intended matrix of commands, and assesses whether the electrical system and fuel tank contain sufficient power to accomplish the mission with margins and without compromising the overall success of the mission. For example, if all motor controllers 24 are being commanded to output a higher current to increase altitude, is that current available and can this be done without compromising the overall success of the mission. If not, block 424 makes adjustments to the matrix of motor controller 24 commands, and provides an indication to the Display to indicate that vehicle performance has been adjusted or constrained.

Block 424 then issues network messages to indicate its actions and status to the other autopilot nodes.

If actions of the nodes are detected to not be capable of correcting a status of a number of nodes sufficient to prevent the aircraft from exceeding safe flight envelope parameters or maintaining flight stability, Block 425 then issues the commands to the motor controllers 24 initiate emergency procedures that may include emergency descent or inter-rotor ballistic airframe or aircraft parachute deployment, and monitors their responses for correctness.

Otherwise, Block 426 then issues the commands to the motor controllers 24, and monitors their responses for correctness.

Block 428 then captures all of the available aircraft performance and state data, and determines whether it is time to store an update sample to a non-volatile data storage device, typically a flash memory device or other form of permanent data storage. Typically samples are stored once per second, so the system need not perform the storage operation at every 100 millisecond sample opportunity.

Block 430 then provides any necessary updates to the operator Display, and returns to await the next tick, when the entire sequence is repeated.

Block 436 assimilates all of the vehicle state data, particularly thermodynamic operating conditions in the form of measured temperature states or measured thermal energy states retrieved from various temperature sensors and thermal energy sensors and commanded data from the operator, then calculates the adjustments necessary to improve management of thermal energy within the aircraft 1000. Block 438 executes the transfer of thermal energy between different vehicle systems to efficiently manage waste heat and maintain vehicle operating conditions, and vehicle state data is updated reflecting the resulting adjusted thermodynamic operating conditions. Block 418 in turn examines the intended matrix of commands, and assesses whether the intended actions are within the aircraft's 1000 safety margins. If not, block 420 makes adjustments to the commands Progressing back through the steps, Block 430 then provides any necessary updates to the operator Display, and returns to await the next tick, when the entire sequence is repeated.

When the flight is complete, the operator or his maintenance mechanic can then tap into the recorded data and display it or play it back in a variety of presentation formats. One approach would be for the onboard display apparatus to take the form of computers so programmed as to acquire the recorded data, determine the styles of display appropriate to the various parameters, provide the user a list of views among which to select for reviewing or playing back (simulating) the data, and displaying the data in accordance with those views. However, although the illustrated embodiment does not rely on ground apparatus to provide the display, this could also be accomplished by an off-board or ground display or remote server system. The system does so by utilizing a so-called client-server approach where the on-board apparatus (data server) prepares and provides web pages; the ground display apparatus requires only a standard web-browser client to provide the desired user interface.

Figure 5:
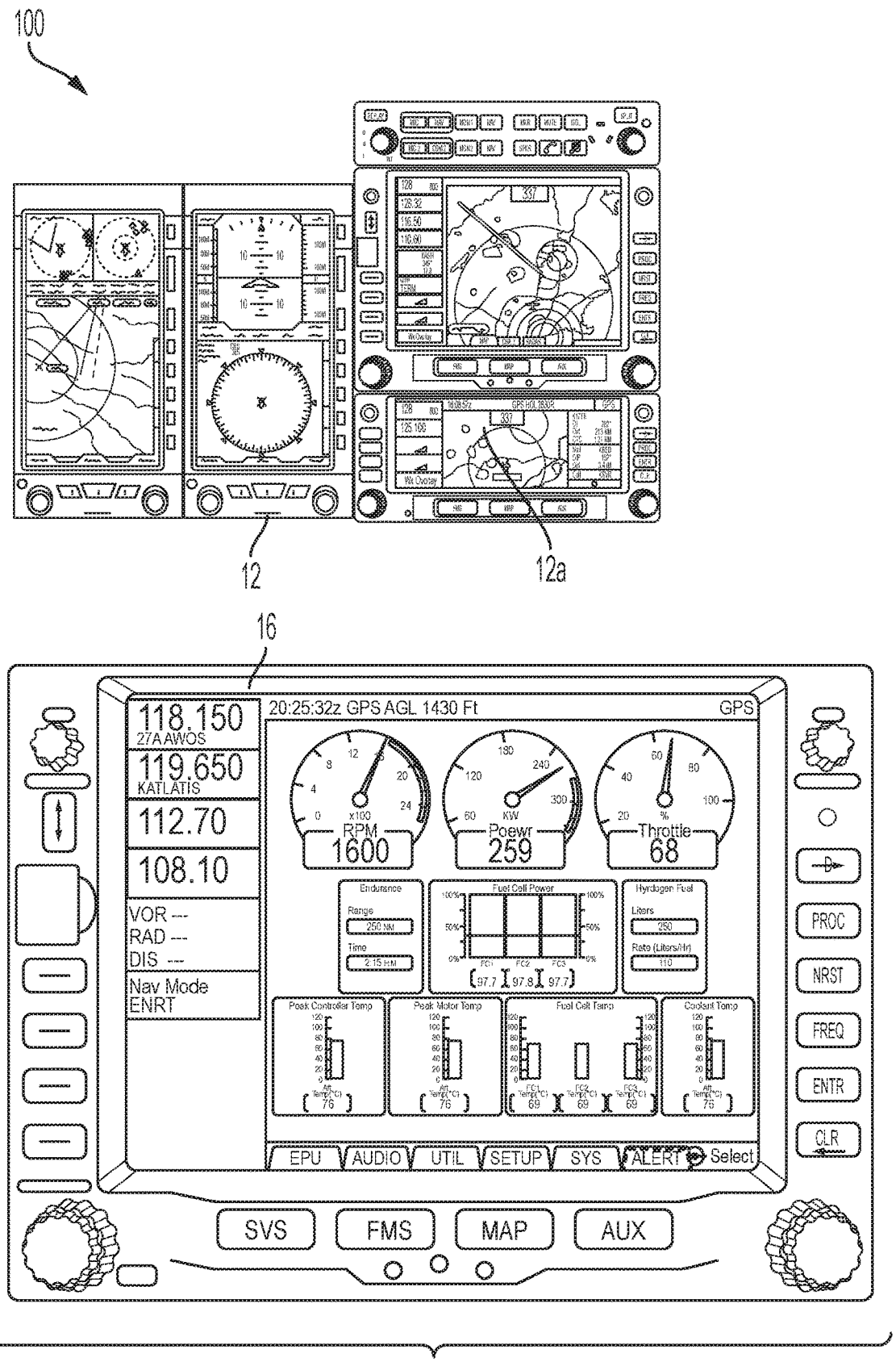
FIG. 5 depicts an example of control panels, gauges and sensor output for the multirotor aircraft.

FIG. 5 depicts an example of one arrangement of standard avionics used to monitor and display the current and projected course information, and to engage in navigation, communication, and other standard functions. Mission control tablet computers or sidearm controllers or joysticks are used to control the intended path of the vehicle, with each joystick controlling at least two axes of motion. Which joystick controls which function is a matter of choice and software implementation. One example preference would be for the left joystick to control vertical motion (altitude) and rotation about the relevant axis (yaw), with the right joystick then controlling longitudinal (forward and back) travel, and lateral (left and right) travel. Other choices and configurations are possible, and the vehicle may also be controlled to mimic pitch, bank and yaw of a traditional aircraft's motion. Each joystick or sidearm controller includes a small, redundant user input device (referred to as the castle-hat controller from the shape of its fingertip control button) that can be used in the event of a failure of the primary joystick. In the case of a joystick failure, the castle-hat controller exactly mimics the programmed behavior of the larger joystick, and generates exactly the same set of commands, using CAN in a typical embodiment), to the autopilot as the joystick would have, were it still operating.

FIG. 5 depicts one kind of display presentation 12 that can be provided to show weather data (in the bottom half) and highway in the sky data (in the top half). Also shown are the vehicle's GPS airspeed (upper left vertical bar) and GPS altitude (upper right vertical bar). Magnetic heading, bank and pitch are also displayed 12, to present the operator with a comprehensive, 3-dimensional representation of where the aircraft is, how it is being operated, and where it is headed. Other screens 16 can be selected from a touch-sensitive row of buttons along the lower portion of the screen. Display presentation 12a is similar, but has added 'wickets' to guide the pilot along the flight path. The lower half of the screen illustrates nearby landing sites that can readily be reached by the vehicle with the amount of power on board. In an example embodiment directed to near implementation, FIG. 1-2 show the use of available TSO'd (i.e. FAA approved) avionics units, adapted to this vehicle and mission. Subject to approval by FAA or international authorities, a simpler form of avionics (known as Simplified Vehicle Operations or SVO) may be introduced, where said display is notionally a software package installed and operating on a 'tablet' or simplified computer and display, similar to an Apple iPad®. The use of two identical units running identical display software allows the user to configure several different display presentations, and yet still have full capability in the event that one display should fail during a flight. This enhances the vehicle's overall safety and reliability.

FIG. 6 and FIGS. 1-2 depict electrical connectivity of components and systems related to example embodiment control interface components of the invention, including the primary flight displays 12, the Automatic Dependent Surveillance-B (ADSB) or Remote ID transmitter/receiver 14, the air data computer to calculate airspeed and vertical speed 38, mission control tablet computers or sidearm controllers (aka joysticks) 36, and redundant autopilot computers 32, the controllers for navigation/strobe, landing lights, and for interior lighting. As would be appreciated by one skilled in the art, the controller and control naystrobes/tailstrobe lights, landing lights, and interior lights, respectively. Continuing with FIG. 6, the control interface components also include the redundant flight computers (e.g., autopilot computers 32) coupled via controllers to the eight motor controllers 24. In accordance with an example embodiment of the present invention, the mission control tablet computers 36 can communicate a route or position command set to the autopilot computers 32 using a serial datalinks or the joysticks 36 can be used by the operator to indicate the intended motion to be performed. The autopilot computers 32 can pass one or more motor commands based on the route or position command set to the voter 42, as control signals. As would be appreciated by one skilled in the art, the autopilot computers 32 may communicate over a redundant communication network 818 during the voting process. Thereafter, the voter 42 can determine which signals to transmit to the motor controllers 24 based on the voting process, as discussed herein.

In regard to stored or acquired flight data records, in addition to providing a browser-based communications mode, the on-board recording system also enables stored data from one or more flights to be read in other ways. For example, the on-board storage may also be examined and/or downloaded using a web server interface or transmitted to a ground station using tactical datalinks, commercial telecom (i.e. 4G, 5G or similar), WiFi, or Satellite (SatCom) services such as Iridium. Typically, but not necessarily, the on-board storage contains the data in a comma-delimited or other simple file format easily read by employing standard techniques.

The memory device within the flight data recording unit typically has enough capacity to store data for thousands of hours—possibly, the aircraft's entire service history—so maintenance personnel may be able to employ a ground-based display to show data not only for the most recent flight but also for some selection of previous data, such as the most-recent five flights, the previous ten flight hours, all data since the last overhaul, the last two hundred hours, or the entire service history, together with indications highlighting any anomalies.

The present invention's approach to multirotor vehicle operation and control, coupled with its onboard equipment for measuring, analyzing, displaying and predicting motor and controller items that can be adjusted, and for calculating whether the commanded motion is safe and within the vehicle's capabilities, can significantly enhance the safety and utility of this novel aircraft design, and reduce the probability of a novice operator attempting to operate outside of the vehicle's normal operational limits. It therefore constitutes a significant advance in the art. Similarly, the ability of the vehicle to operate with redundant motor capacity, redundant fuel cell capability, and to be operated by a triple-redundant autopilot and the use of 'Fly By Light' techniques originated by the inventor, significantly enhances the safety and utility of this novel aircraft design, and protects the operator or payload from possibly catastrophic occurrences due to a system failure, motor failure, fuel cell failure, or external EMI or lightning interference. The design is such that any single failure of a motor, controller, or autopilot or tablet is or sidearm controller managed and circumvented, to ensure the safe continued operation and landing of the vehicle.

FIG. 6 also depicts electrical and systems connectivity of various motor control components of a system of the invention, as well as an example fuel system 900 for the multirotor aircraft. The electrical connectivity includes six motor and propeller assemblies 28 (of a corresponding plurality of motors and propellers 29) and the electrical components needed to supply the motor and propeller combinations with power. A high current contactor 904 is engaged and disengaged under control of the vehicle key switch 40, which applies voltage to the starter/generator 26 to start the engine and generator sets or fuel cells 18. In accordance with an example embodiment of the present invention, after ignition, the engine and generator sets or fuel cells 18 (e.g., one or more hydrogen-powered fuel-cells or hydrocarbon-fueled motors) create the electricity to power the six motor and propeller assemblies 28 (of multiple motors and propellers 29). A power distribution and circuit breaker 902 subsystem autonomously monitors and controls distribution of the generated electrical voltage and current from the engine and generator sets or fuel cells 18 to the plurality of motor controllers 24. As would be appreciated by one skilled in the art, the circuit breaker 902 is designed to protect each of the motor controllers 24 from damage resulting from an overload or short circuit. Additionally, the electrical connectivity and fuel system 900 includes diodes or FETs 20, providing isolation between each electrical source and an electrical main bus and the engine and generator sets or fuel cells 18. The diodes or FETs 20 are also part of the fail-safe circuitry, in that they diode-OR the current from the two sources together into the electrical main bus. For example, if one of the pair of the engine and generator sets or fuel cells 18 fails, the diodes or FETs 20 allow the current provided by the now sole remaining current source to be equally shared and distributed to all motor controllers 24. Such events would clearly constitute a system failure, and the autopilot computers 32 would react accordingly to land the aircraft safely as soon as possible. Advantageously, the diodes or PETs 20 keep the system from losing half its motors by sharing the remaining current. Additionally, the diodes or FETs 20 are also individually enabled, so in the event that one motor fails or is degraded, the appropriate motor and propeller combinations 28 (of multiple motors and propellers 29—e.g. the counter-rotating pair) would be disabled. For example, the diodes or FETs 20 would disable the enable current for the appropriate motor and propeller combinations 28 (of multiple motors and propellers 29) to switch off that pair and avoid imbalanced thrust. In accordance with an example embodiment of the present invention, the six motor and propeller combinations 28 (of multiple motors and propellers 29) each include a motor and a propeller and are connected to the motor controllers 24, that control the independent movement of the six motors of the six motor and propeller combinations. As would be appreciated by one skilled in the art, the electrical connectivity and fuel system 900 may be implemented using 6, 8, 10, 12, 14, 16, or more independent motor controllers 24 and the motor and propeller assemblies 28 (of a plurality of motors and propellers 29).

Continuing with FIG. 6, the electrical connectivity and fuel supply subsystem 900 also depicts the redundant battery module system as well as components of the DC charging system. The electrical connectivity and fuel supply subsystem 900 includes the fuel storage 22, the avionics battery 27, the fuel pump and cooling system 44, the engine supercharger 46, and a starter/alternator. The engines and generator sets or fuel cells 18 are fed by on-board fuel 30 storage 22 and use the fuel to produce a source of power for the motor and propeller combinations 28. As would be appreciated by one skilled in the art, the engine and generator sets or fuel cells 18 can include one or more hydrogen-powered fuel-cells or hydrocarbon-fueled motors and each engine can be fueled by compressed natural gas (CNG), liquefied petroleum gas (LPG), or aviation standard fuel 30 (avgas) and each fuel cell is powered by liquid hydrogen, hydrogen or other suitable gaseous fuel 30, multiple motors and propellers 29.

FIGS. 2 and 6 together depict the integrated system 100 that includes a mission display system that displays to an operator information about a state of performance metrics of the power generation subsystem 600, the internal temperature zone 52, the external temperature zone 54, and the fuel supply subsystem 900; a dual display system comprising software operating on a touch-tablet computer or avionics display system comprising the software operating on the touch-tablet computer or the avionics display system, with wired or wireless (RF) connections to the one or more autopilot control units, providing detailed monitoring, control, and feedback related to the power generation subsystem 600, the internal temperature zone 52, the external temperature zone 54, and the fuel supply subsystem 900.

FIG. 7 depicts an example aircraft 1000 in accordance with an embodiment of the present invention including elongate support arms 1008 and an aircraft body 1020, and FIG. 8 shows another view of the aircraft 1000 shown in FIG. 7. In accordance with an example embodiment of the present invention, the multiple electric motors 28 are supported by the elongate support arms 1008, and when the aircraft 1000 is elevated, the elongate support arms 1008 support (in suspension) the aircraft 1000 itself. FIG. 7 depicts side and top views of a multirotor aircraft 1000 with six rotors (propellers 29) cantilevered from the frame of the multirotor aircraft 1020 in accordance with an embodiment of the present invention, indicating the location of the airframe fuselage 1020, attached to which are the elongate support arms 1008 that support the plurality of motor 28 and propeller 29 assemblies wherein the propellers 29 are clearly shown.

FIG. 8 depicts two views demonstrating the position of the array of propellers 29 extending from the frame of the multirotor aircraft airframe fuselage 1020 and elongates support arms 1008 with an approximately annular configuration.

Figure 9:
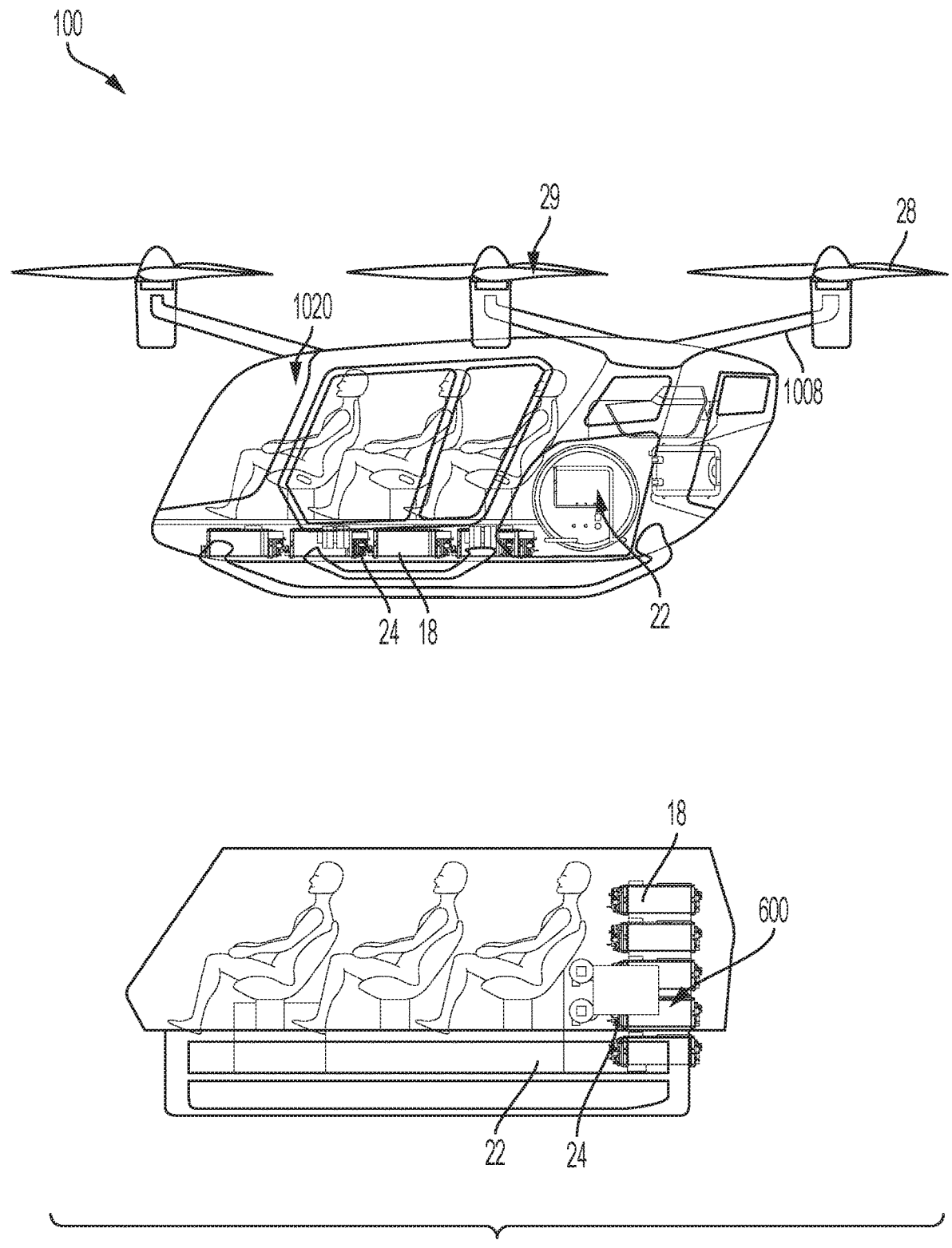
FIG. 9 depicts profile diagrams of the multirotor aircraft demonstrating example positions of fuel and power generation subsystems within the multirotor aircraft.

FIG. 9 depicts profile diagrams of the example multirotor aircraft 1000 demonstrating example positions of fuel supply 900 and power generation subsystems 600 within the multirotor aircraft 1000. The measuring of thermodynamic operating conditions comprises measuring a first temperature corresponding to one or more sources of thermal energy and assessing one or more additional temperatures corresponding to thermal references, and wherein the one or more thermal references comprise one or more references selected from the group consisting of operating parameters, warning parameters, equipment settings, occupant control settings, alternative components, alternative zones, temperature sensors, and external reference information. The one or more sources are selected from the group consisting of the power generation subsystem 600, the internal temperature zone 52, the external temperature zone 54, and the fuel supply subsystem 900. The one or more thermal energy destinations are selected from the group consisting of the power generation subsystem 600, the internal temperature zone 52, the external temperature zone 54, and the fuel supply subsystem 900. In one embodiment, the fuel cell control system comprises 6 motors 28 and 3 fuel cell modules 18; 1 fuel cell for each 2 motor 28 pair. The fuel cell modules 18 are triple-modular redundant auto-pilot with monitor, Level A analysis of source code, and at least one cross-over switch in case of one fuel cell failure.

Figure 10:
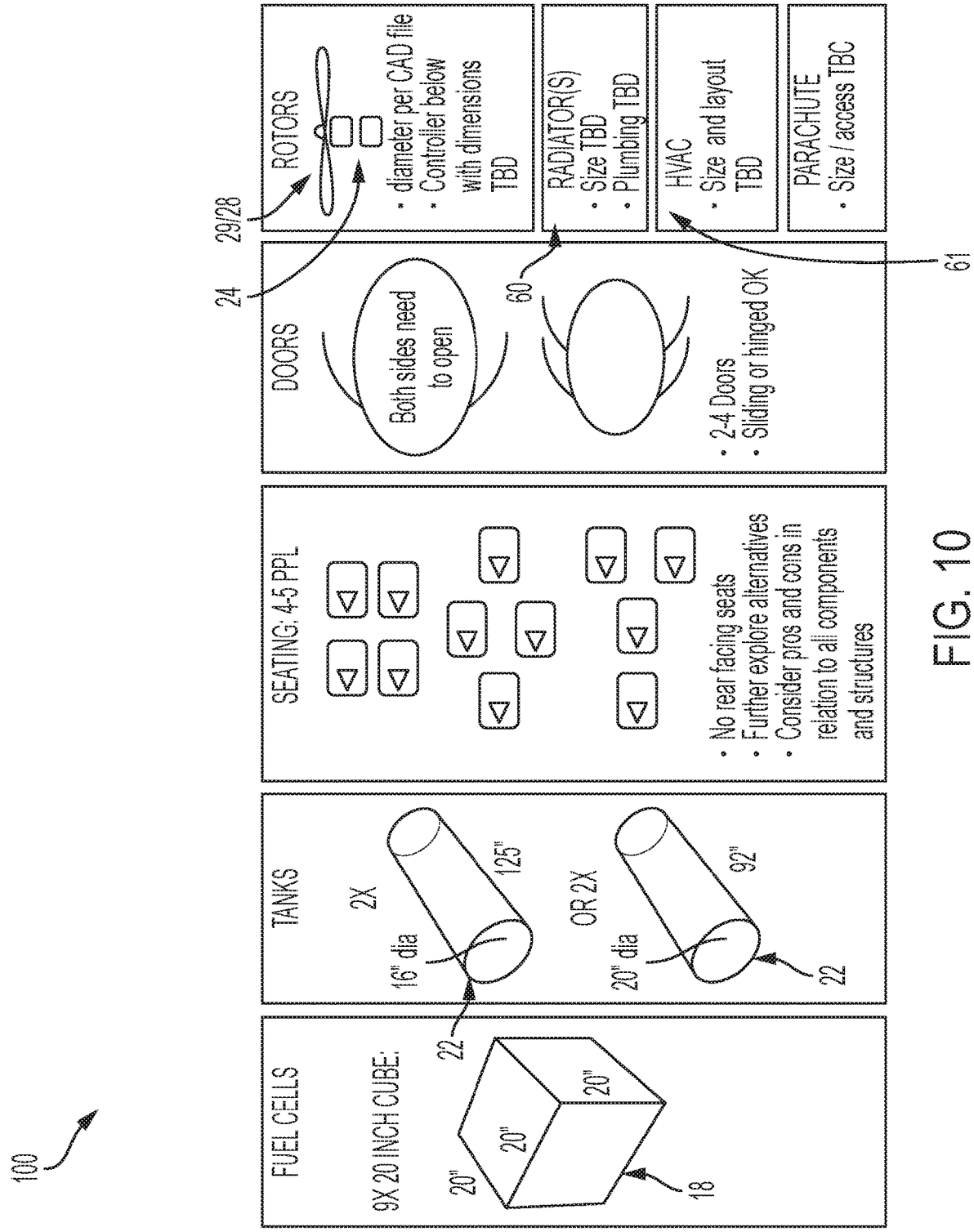
FIG. 10 depicts example space requirements for components of the fuel and power generation subsystems of the multirotor aircraft.

FIG. 10 depicts example space requirements for components of the fuel supply and power generation subsystems 600 of the multirotor aircraft 1000. FIG. 11 depicts diagrams demonstrating alternative example positions of fuel supply and power generation subsystem 600*s* within the multirotor aircraft 1000.

Figure 12:
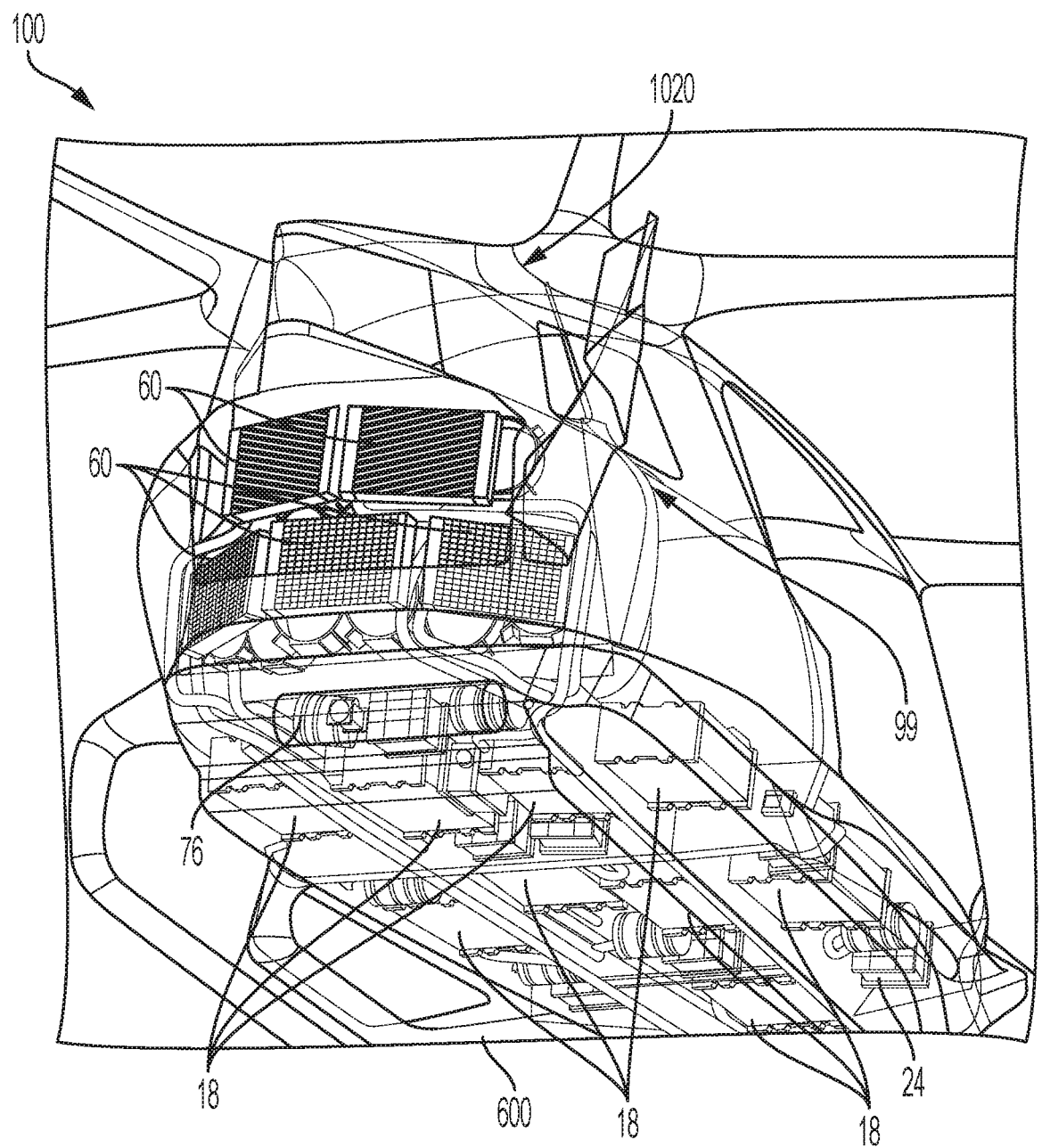
FIG. 12 depicts example diagrams of the configuration of power generation subsystem heat transfer and exchange components within the multirotor aircraft.

FIG. 12 depicts an example diagram of the configuration of power generation subsystem 600 heat transfer and heat exchange components within the multirotor aircraft 1000. In some embodiments, fuel tank 22, the avionics battery 27, the fuel pump 74 and cooling system 44, supercharger 46, and radiators 60 may also be included, monitored, and controlled. Any fuel cell modules 18 are fed by on-board fuel tank 22 and use the fuel 30 to produce a source of power for the multirotor aircraft 1000. These components are configured and integrated to work together with 4D Flight Management.

Power generation subsystem 600 may have various numbers of fuel cells based on the particular use configuration, for example a set of hydrogen fuel cells. Operation and control of the cells is enabled via CAN protocol or a similar databus or network or wireless or other communications means. Flight control algorithm will modulate and monitor the power delivered by fuel cells via CAN.

Figure 13:
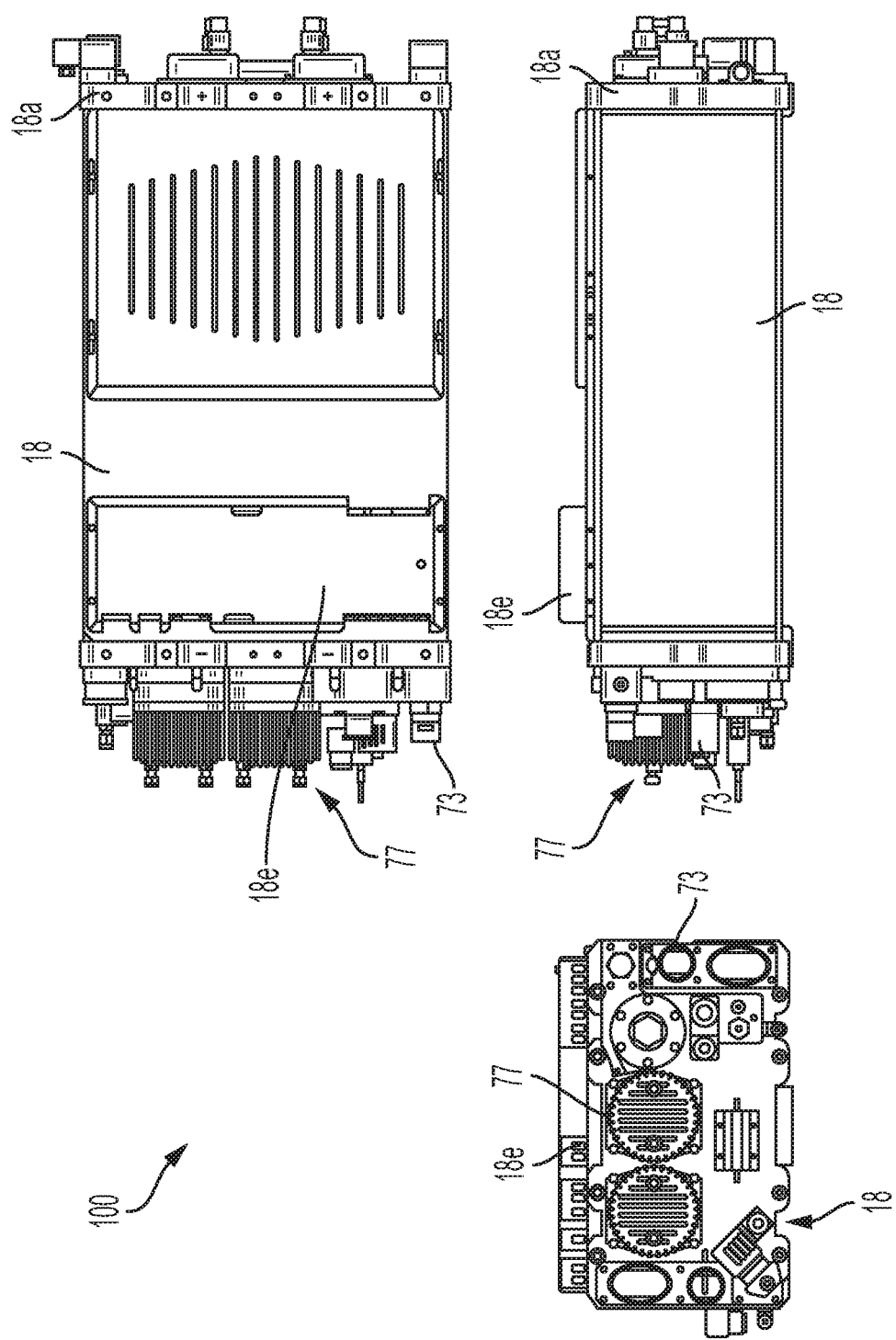
FIG. 13 depicts example configurations of fuel cells within the multirotor aircraft.
Figure 14:
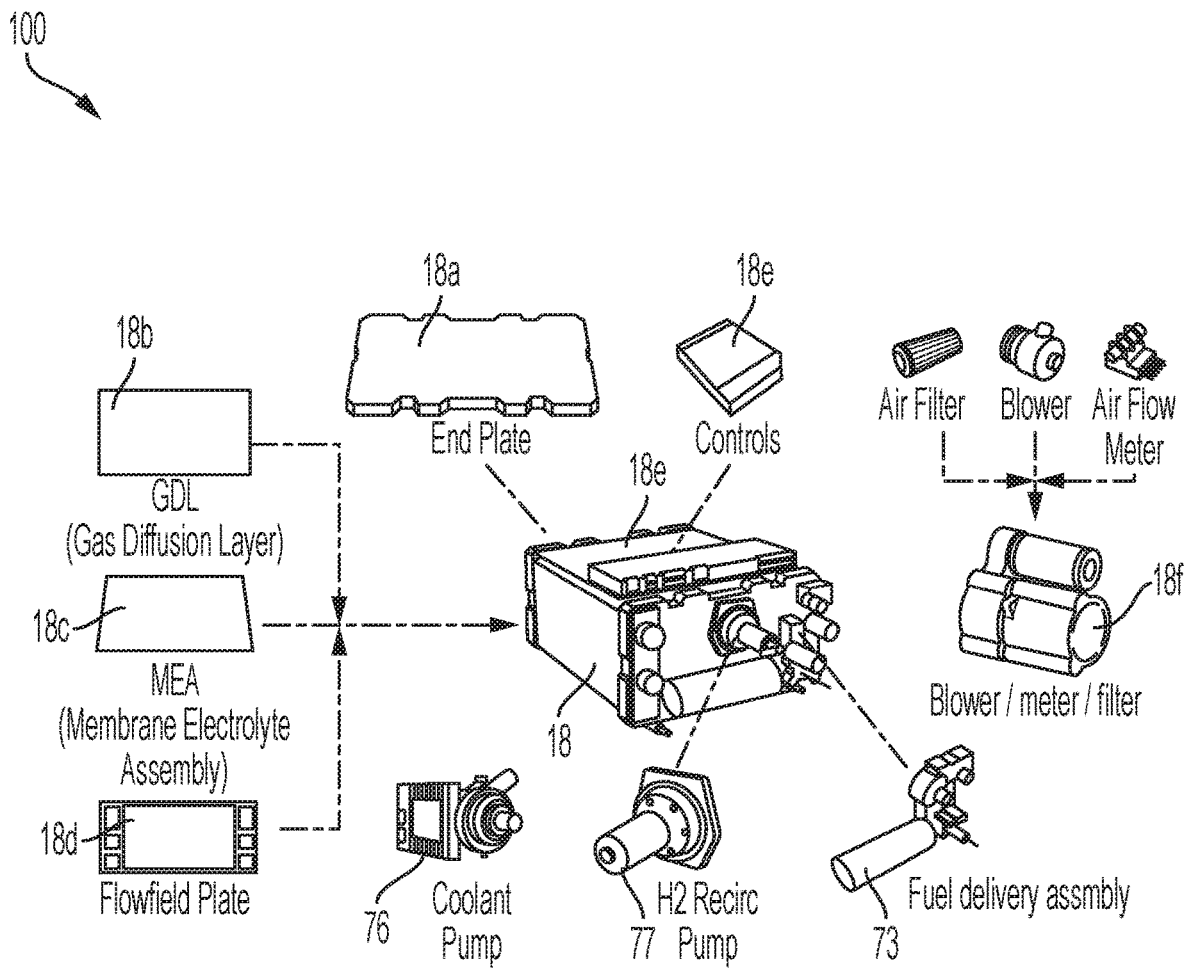
FIG. 14 depicts example subcomponents of fuel cells within the multirotor aircraft.

FIGS. 13, 14 and 15 depict example subcomponents of fuel cell modules 18 within the multirotor aircraft 1000. The one or more fuel cell modules 18 comprise an air filter 18*f*, blower 18*f*, airflow meter 18*f*, fuel delivery assembly 73, recirculation pump 77, coolant pump 76, fuel cell controls 18*e*, sensors, end plate 18*a*, at least one gas diffusion layer 18*b*, at least one membrane electrolyte assembly 18*c*, at least one flowfield plate 18*d*, coolant conduits 84, connections, a hydrogen inlet 82, a coolant inlet 78, a coolant outlet 79, one or more air-driven turbochargers 46 supplying air to the one or more fuel cell modules 18, and coolant conduits 84 connected to and in fluid communication with the one or more fuel cell modules 18 and transporting coolant 31. The one or more fuel cell modules 18 may further comprise one or more hydrogen-powered fuel-cells, where each hydrogen-powered fuel-cell is fueled by gaseous hydrogen (GH2) or liquid hydrogen (LH2) stored at LH2 temperatures and wherein the one or more fuel cell modules 18 combines hydrogen from the fuel tank 22 with oxygen in the air to supply electrical voltage and current. Fuel cell vessels and piping are designed to the ASME Code and DOT Codes for the pressure and temperatures involved.

In one embodiment, an aviation fuel cell module 18 comprises a multi-function stack end plate that is configured for reduced part count, comprising an integrated manifold, an integrated wiring harnesses, integrated electronics and controls, wherein the stack end plate eliminates certain piping and fittings and allows easier part inspection and replacement, yielding improved reliability, significant mass, volume and noise reduction, and reduction in double wall protection. The integrated electronics and controls may operate as temperature sensors or thermal energy sensors for the fuel cell modules 18, and may also be integrated into the heat transfer infrastructure architecture of the fuel cell modules 18 such that the excess heat generated by operation may also be transferred away from the electronics and controls to promote more efficient operation and reduce overheating. The aviation fuel cell module 18 may be further configured of aerospace lightweight metallic fuel cell components, with a stack optimized for: reduced weight; increased volumetric power density; extreme vibration tolerance; improved performance and fuel efficiency; increased durability; and combinations thereof. In an example embodiment, a fuel cell module 18 may produce 120 kW of power, in a configuration with dimensions of 72×12×24 inches (L×H×W) and a mass of less than 120 kg, with a design life greater than 10,000 hours. The operation orientation of each module accommodates roll, pitch, and yaw, as well as reduction in double wall protection and shock & vibration system tolerance. FIG. 15 further depicts example subcomponents inside the fuel cell modules 18 demonstrating the configuration of hydrogen flow field plates and oxygen flow field plates 18*d*, anode and cathode volumes on each side of the proton exchange membrane of the membrane electrolyte assembly 18*c* with backing layers and catalysts, as well as resulting hydrogen, oxygen, and coolant flow vectors.

Figure 16:
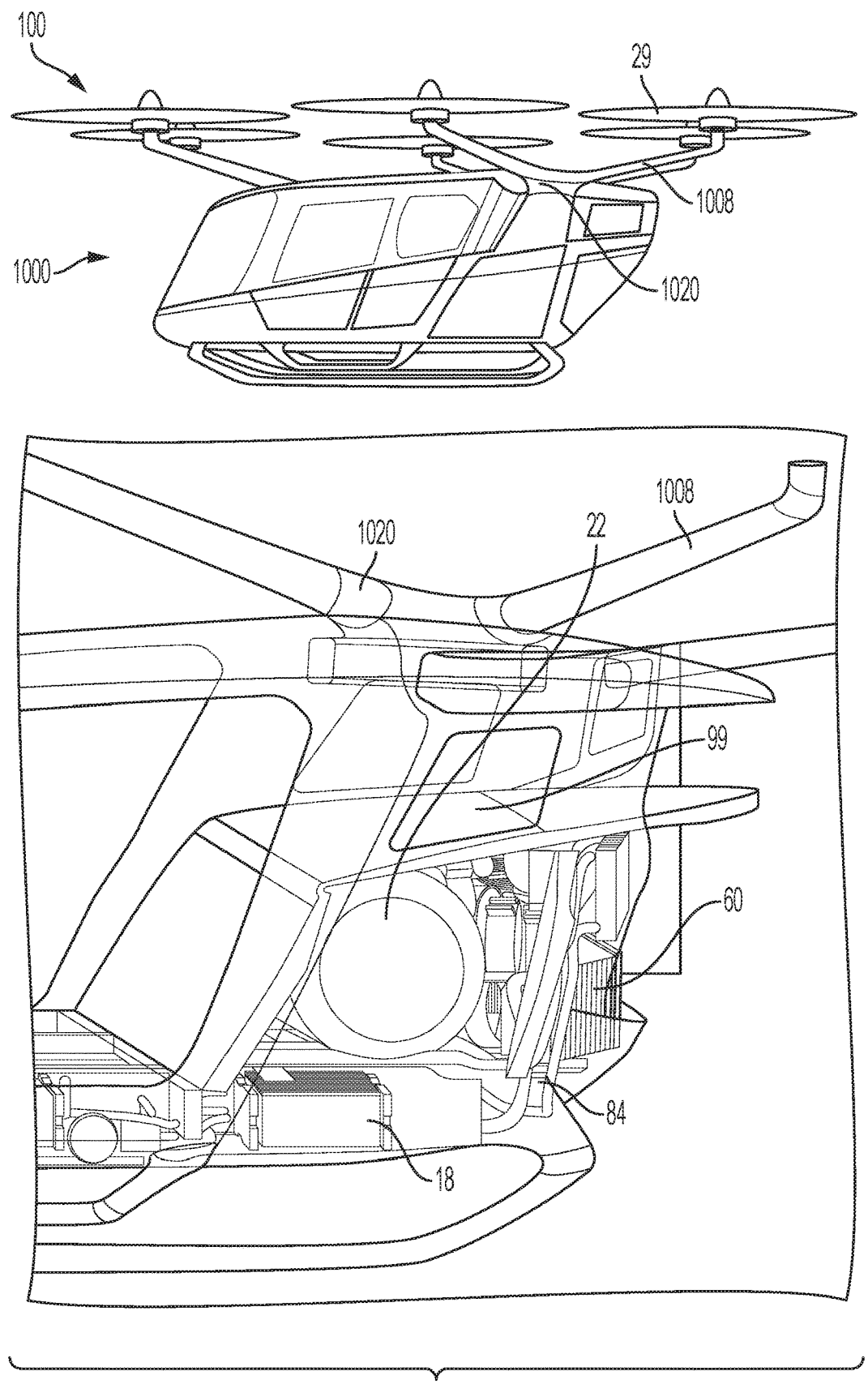
FIG. 16 depicts an example profile diagram of the fuel supply system components within the multirotor aircraft.
Figure 17:
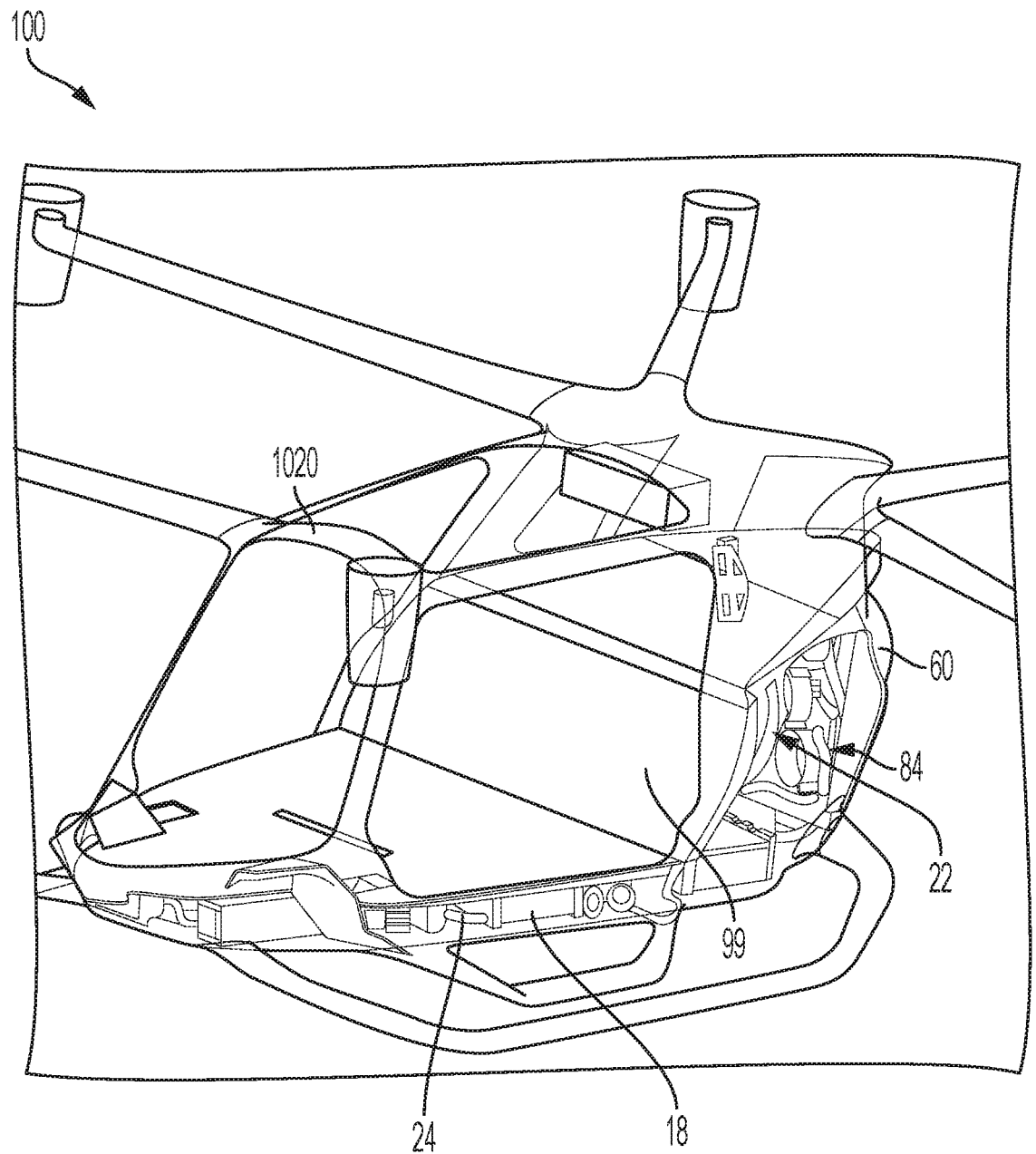
FIG. 17 depicts an example diagram of the multirotor aircraft demonstrating example positions of the cabin, HVAC, fuel supply and power systems within the multirotor aircraft.
Figure 18:
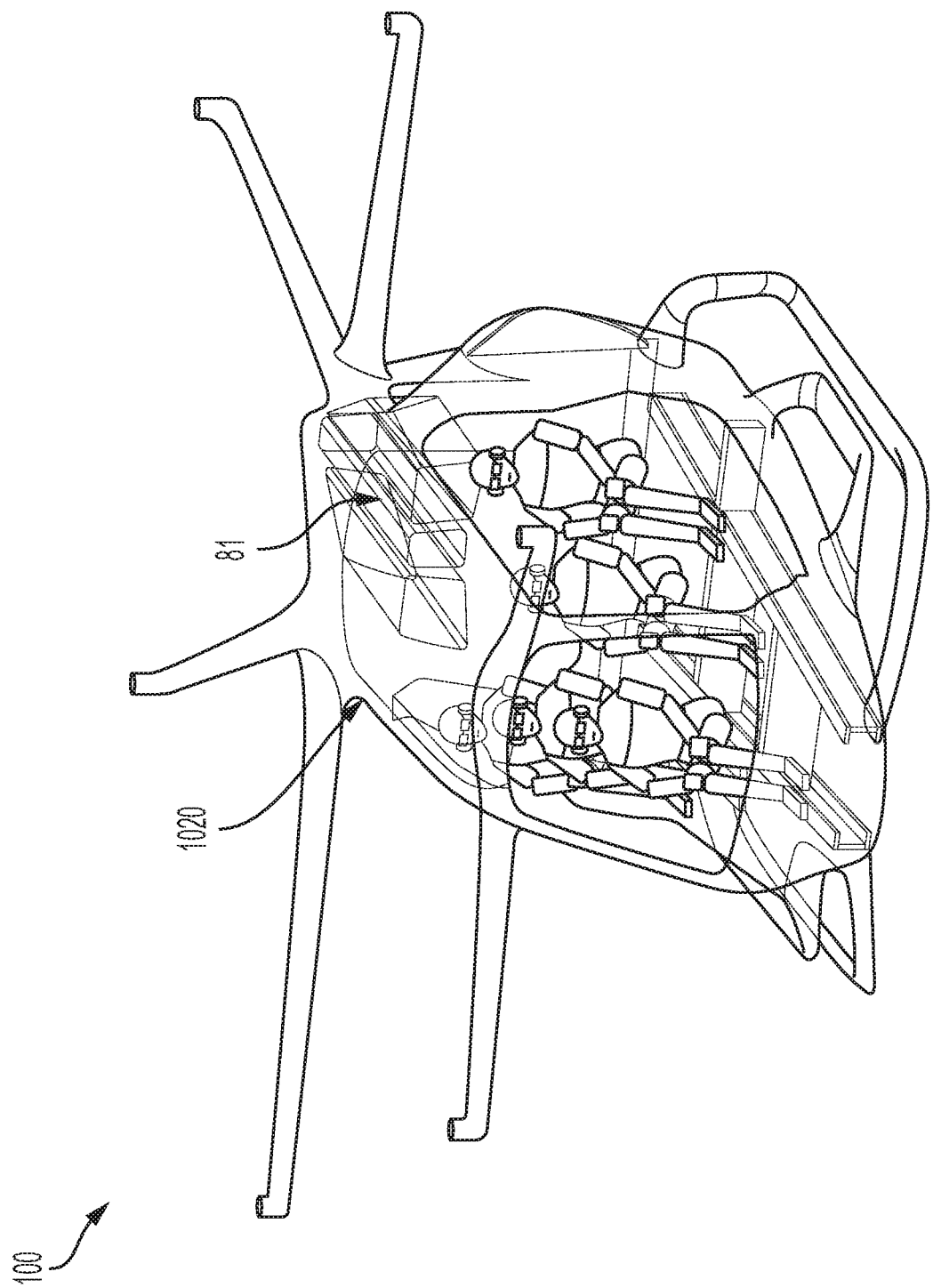
FIG. 18 depicts a diagram of the multirotor aircraft demonstrating example positions of components of HVAC subsystems within the multirotor aircraft and in relation to occupants.
Figure 20:
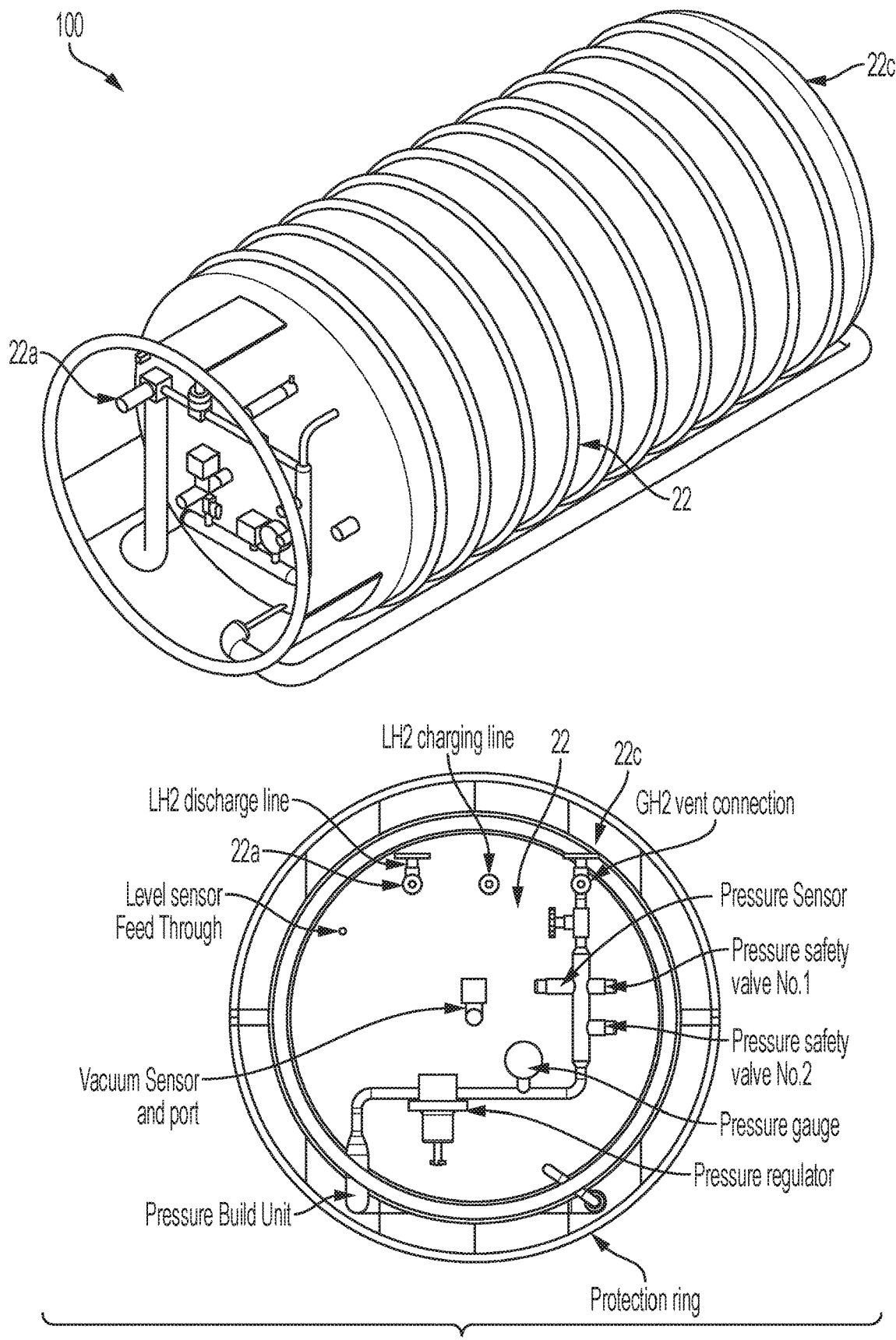
FIG. 20 depicts example subcomponents of fuel tanks and fuel supply subsystem within the multirotor aircraft.

FIG. 16 depicts an example profile diagram of the fuel supply subsystem 900 components within the multirotor aircraft 1000 in relation to the power generation subsystem 600 components positioned on opposite the opposite side of the fire wall 99 from the internal temperature zone 52 comprising the cabin environment housing pilots and passengers. FIG. 17 depicts an additional example diagram of the multirotor aircraft 1000 demonstrating example positions of the cabin, HVAC subsystems 61, fuel supply subsystem 900 and power generation subsystems 600 separated by the fire wall 99 while being mounted within airframe fuselage 1020 of the multirotor aircraft 1000. The fire wall 99 between fuel tank 22 and passenger cabin is designed to meet requirements per FAR Part 27.1191. FIG. 18 depicts a diagram of the multirotor aircraft 1000 demonstrating example positions of components of HVAC subsystems 61 within the multirotor aircraft 1000 and in relation to pilots, passengers or occupants. The HVAC subsystems 61 further comprise a cabin temperature sensor, ducts 81 in fluid communication with one or more fans 68 controlling distribution of a secondary working fluid, and at least one air conditioning unit 62 comprising of a condenser, expansion valve 88, evaporator, compressor, conduits, in fluid communication with each other, and acting on the secondary working fluid external to the air conditioning unit 62.

Figure 21A:
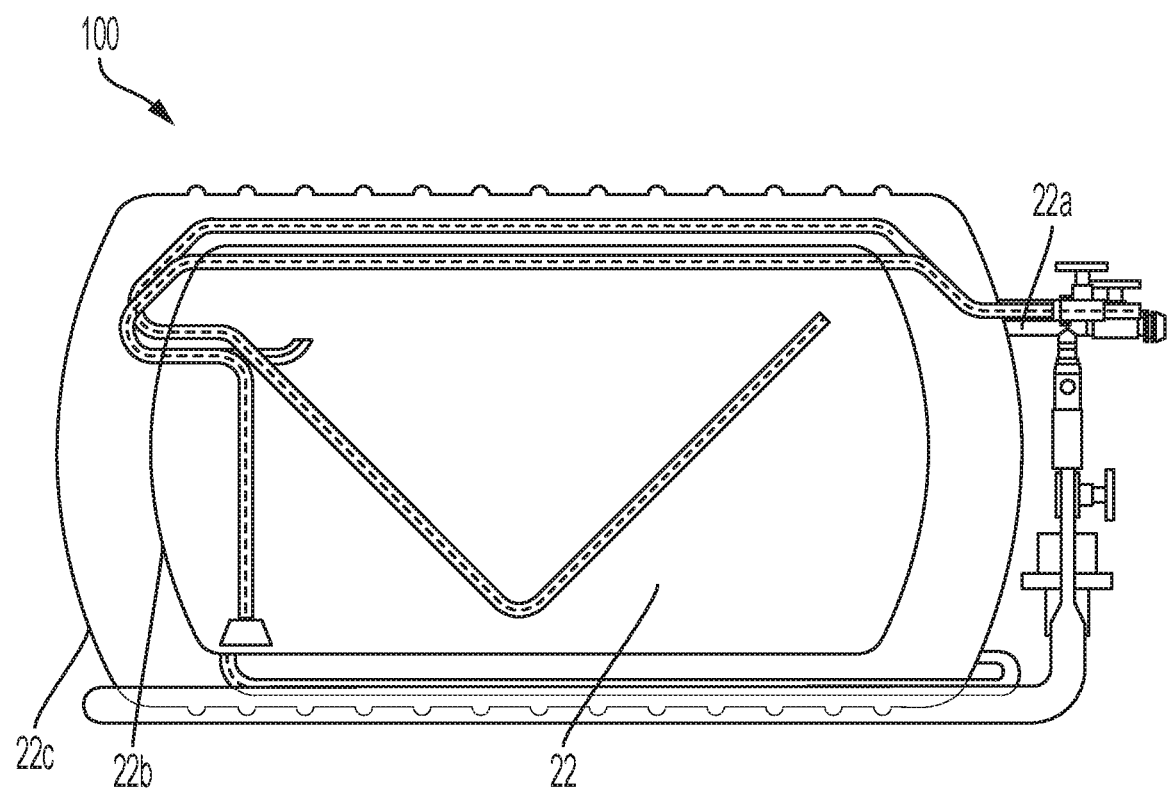
FIG. 21a depicts an example embodiment of subcomponents of fuel tanks and fuel supply subsystem within the multirotor aircraft.
Figure 21B:
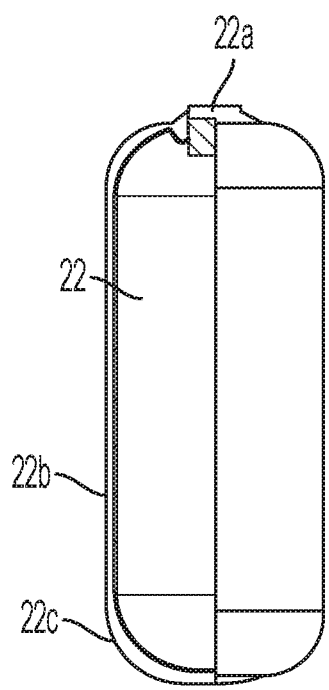
FIG. 21b depicts an example embodiment of subcomponents of fuel tanks and fuel supply subsystem within the multirotor aircraft.

FIGS. 19, 20, 21*a*, and 21*b* depict example subcomponents of fuel tanks 22 and fuel supply subsystem 900 within the multirotor aircraft 1000, wherein the fuel tank 22 further comprises a titanium, polymer, stainless steel or carbon fiber epoxy shell or a stainless steel or other robust shell 22*c*, a plastic or metallic liner 22*b*, a metal interface, crash/drop protection, and is configured to use a working fluid of hydrogen as the fuel 30 with fuel lines 85, vessels and piping 85 designed to the ASME Code and DOT Codes for the pressure and temperatures involved. Generally, in a thermodynamic system, the working fluid is a liquid or gas that absorbs or transmits energy, or actuates a machine or heat engine. In this invention, working fluids may include: fuel in liquid or gaseous state, coolant 31, pressurized or hot air. The fuel tank 22 is designed to include venting 64 from the component/mechanical compartment to the external temperature zone 54, and installed with a design that provides for 50 ft drop without rupture of the tank. The head side of the fuel tank 22 comprises multiple valves 88 and instruments 22*a* for operation of the fuel tank 22. In one embodiment the head side of the fuel tank 22 comprises mating part A including an LH2 refueling port (Female part of a fuel transfer coupling 58); mating part B including a ⅜"B(VENT 64), ¼"(PT), 1/4"(PG&PC), feed through, vacuum port, vacuum gauge, spare port, ¼"sensor (Liquid detection); and mating part C 22*a* including at least one 1 inch union 86 (to interface with heat exchangers 57) as well as ½"safety valves 88. Liquid hydrogen storage subsystems and fuel tanks 22 may employ at least one a fuel transfer coupling 58 for charging; 1 bar Vent 64 for charging; self-pressure build up unit; at least two safety relief valves 88; GH2 heating components; vessels and piping that routed to a heat exchanger 57 or are otherwise in contact with fluid conduits for fuel cell coolant 31 water. The fuel tank 22 may also include a level sensor (High Capacitance) and meet regulatory requirements. FIG. 21*a* and FIG. 21*b* further depict two different example embodiments of titanium, polymer, or carbon fiber epoxy shell or a stainless steel shell 22*c* material used to encapsulate the components of the fuel tank 22 to provide drop and crash protection. In another embodiment an LH2 fuel tank 22 may comprise an inner tank 22*b*, an insulating wrap, a vacuum between inner and outer tank, and a much lower operating pressure, typically approximately 10 bars, or 140 psi (where GH2 typically runs at a much higher pressure). The fuel tanks 22 may also be equipped with at least one protection ring to provide further drop and crash protection for connectors, regulators and similar components. In an example embodiment, the fuel supply subsystem 900 further comprises an LH2 charging line 58 used to fill the fuel tank 22 with liquid hydrogen (LH2) to the stated amount and safely store it, where pressure sensors, pressure safety valves, pressure gauges, pressure regulators, and one or more pressure build units, monitor, regulate, and adjust the fuel tank 22 environment to maintain the fuel at the proper temperature and state to efficiently fuel the power generation subsystem 600 (with example fuel cells 18) that is supplied using an LH2 discharge line 22*a*, wherein the fuel is adjusted by additional means comprising the one or more heat exchangers 57. To maintain continuity of delivery of fuel during displacement, as well as managing fuel safety, volatile gases may be passed through a vaporizer 72 and one or more GH2 vent connections to be vented to the exterior environment. Additional components include at least one vacuum sensor and port, and a level sensor feed through. the fuel supply subsystem 900 further comprises various components including, but not limited to, pressure transmitters, level sensors, coolant circulation pumps, and pressure regulators solenoid valves, used to monitor, direct, reroute, and adjust the flow of coolant through the coolant conduits in the proper manner to supply the power generation subsystem 600 (with example fuel cells 18). In one embodiment, the fuel may be served by separate coolant (e.g. in fluid communication with heat exchangers 57) from the power generation subsystem 600 (with example fuel cells 18), and in another embodiment, the fuel supply subsystem 900 shares a cooling loop or circuit comprising coolant conduits transporting coolant with the power generation subsystem 600 (with example fuel cells 18), and in an additional embodiment, the fuel supply subsystem 900 may include fuel lines that serve as coolant conduits for various components including the power generation subsystem 600 (with example fuel cells 18), either via thermal conductive contact or indirect contact by e.g. the one or more heat exchangers 57.

Figure 22:
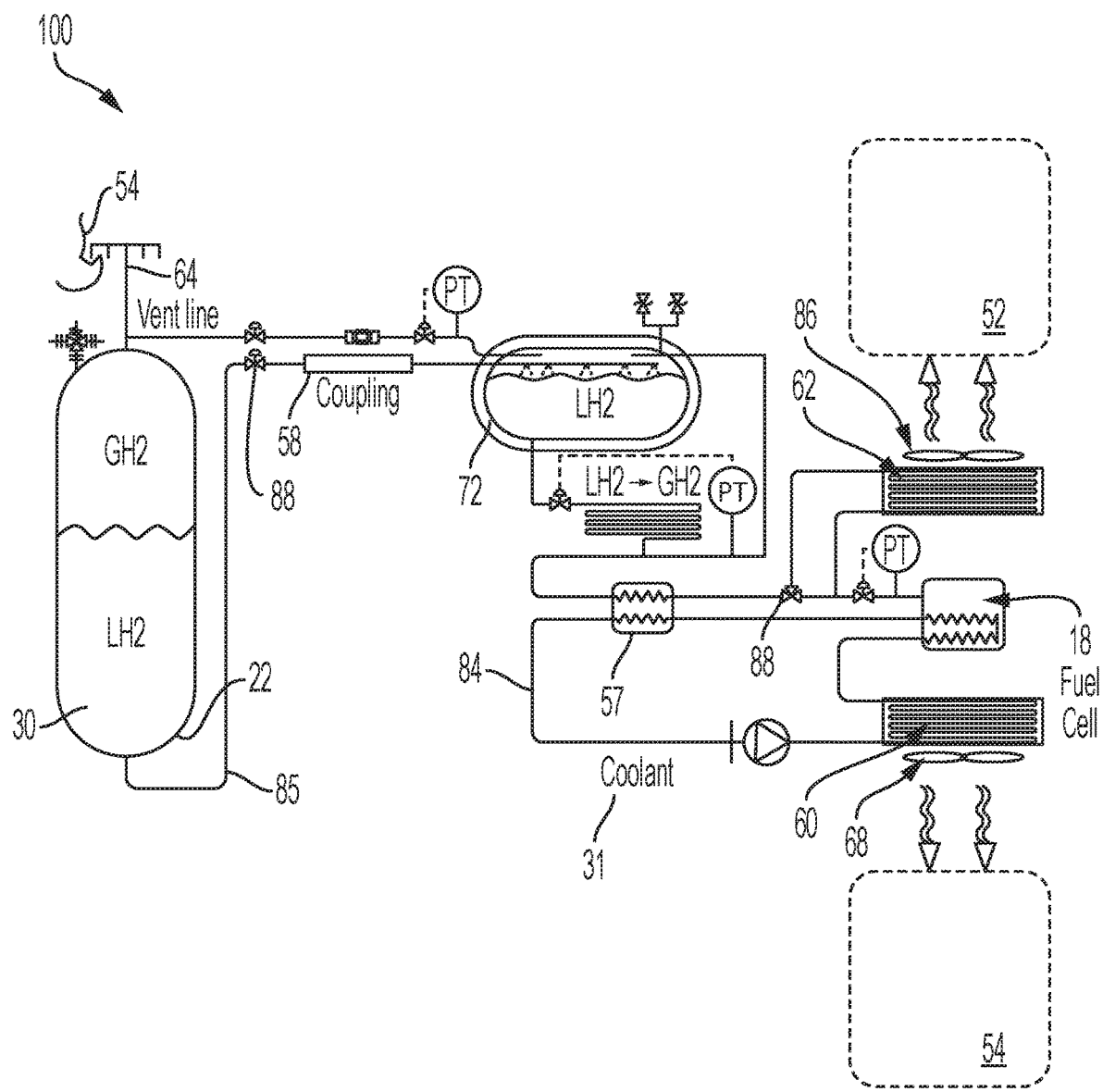
FIG. 22 depicts an example diagram of the fuel tank, fuel cell, radiator, heat exchanger and air conditioning components.

FIG. 22 depicts an example diagram of the fuel supply subsystem 900 including the fuel tank 22, fuel cell, radiator 60, heat exchanger 57 and air conditioning components, along with the most basic components of the power generation subsystem 600. The integrated system 100 fuel supply subsystem 900 further comprises the fuel tank 22 in fluid communication with one or more fuel cells, configured to store and transport a fuel selected from the group consisting of gaseous hydrogen (GH2), liquid hydrogen (LH2), liquefied petroleum gas (LPG), wherein fuel supply subsystem 900 further comprises fuel lines, at least one fuel supply coupling, 58 refueling connections for charging, one or more vents 64, one or more valves 88, one or more pressure regulators, the vaporizer 72, unions 86 and the heat exchanger 57, each in fluid communication with the fuel tank 22, and wherein the one or more temperature sensing devices or thermal safety sensors monitor temperatures and concentrations of gases in the fuel supply subsystem 900, and also comprise one or more pressure gauges, one or more level sensors, one or more vacuum gauges, and one or more temperature sensors. The autopilot control unit or a computer processor are further configured to operate components of the subsystems and compute, select and control, based on the temperature adjustment protocol, an amount and distribution of thermal energy transfer including: from the one or more sources comprising the power generation subsystem 600, to the one or more thermal energy destinations comprising the internal temperature zone 52, using HVAC subsystems 61; from the one or more sources comprising the power generation subsystem 600, to the one or more thermal energy destinations comprising the external temperature zone 54, using at least the at least one radiator 60 or the one or more exhaust ports 66; from the one or more sources comprising the power generation subsystem 600, to the one or more thermal energy destinations comprising the fuel supply subsystem 900, using the thermal energy interface subsystem 56 comprising the heat exchanger 57 or a vaporizer 72; from the one or more sources comprising the internal temperature zone 52, to the one or more thermal energy destinations comprising the fuel supply subsystem 900, using the HVAC subsystems 61 and thereby reducing temperature in the internal temperature zone 52; from the one or more sources comprising the external temperature zone 54, to the one or more thermal energy destinations comprising the fuel supply subsystem 900, using one or more vents 64; and combinations thereof. FIG. 18 depicts the LH2 400L fuel tank 22 together with pressure build up unit, LH2 Alt Port, refueling port, pressure gauge w/switch contact, pressure trans/level/vacuum gauge/pressure regulator, Vaporizer 72 for converting LH2 to GH2 and mating part A: LH2 refueling port (female fuel transfer coupling 58); mating part B; ⅜" B (Vent 64); mating part C 1" union 86 (interface w/heat exchanger 57). Also depicted are the at least one radiator 60, coolant outlet, example fuel cell module 18, coolant inlet 78, air flow sensing and regulation, and coolant (cooling water circulation) pump 76. The thermal energy interface subsystem 56 depicted in FIG. 18 comprising the heat exchanger 57 or a vaporizer 72, configured to connect to a first fluid conduit in connection with and in fluid communication the fuel supply subsystem 900 comprising the fuel 30, and a second conduit in connection with and in fluid communication with the power generation subsystem 600 comprising the coolant 31, wherein thermal energy is transferred from the coolant 31, across a conducting interface by conduction, and to the fuel 30, thereby warming the fuel 30 and cooling the coolant 31, and wherein the one or more temperature sensing devices or thermal energy sensing devices further comprises a fuel temperature sensor and a coolant temperature sensor.

Figure 23:
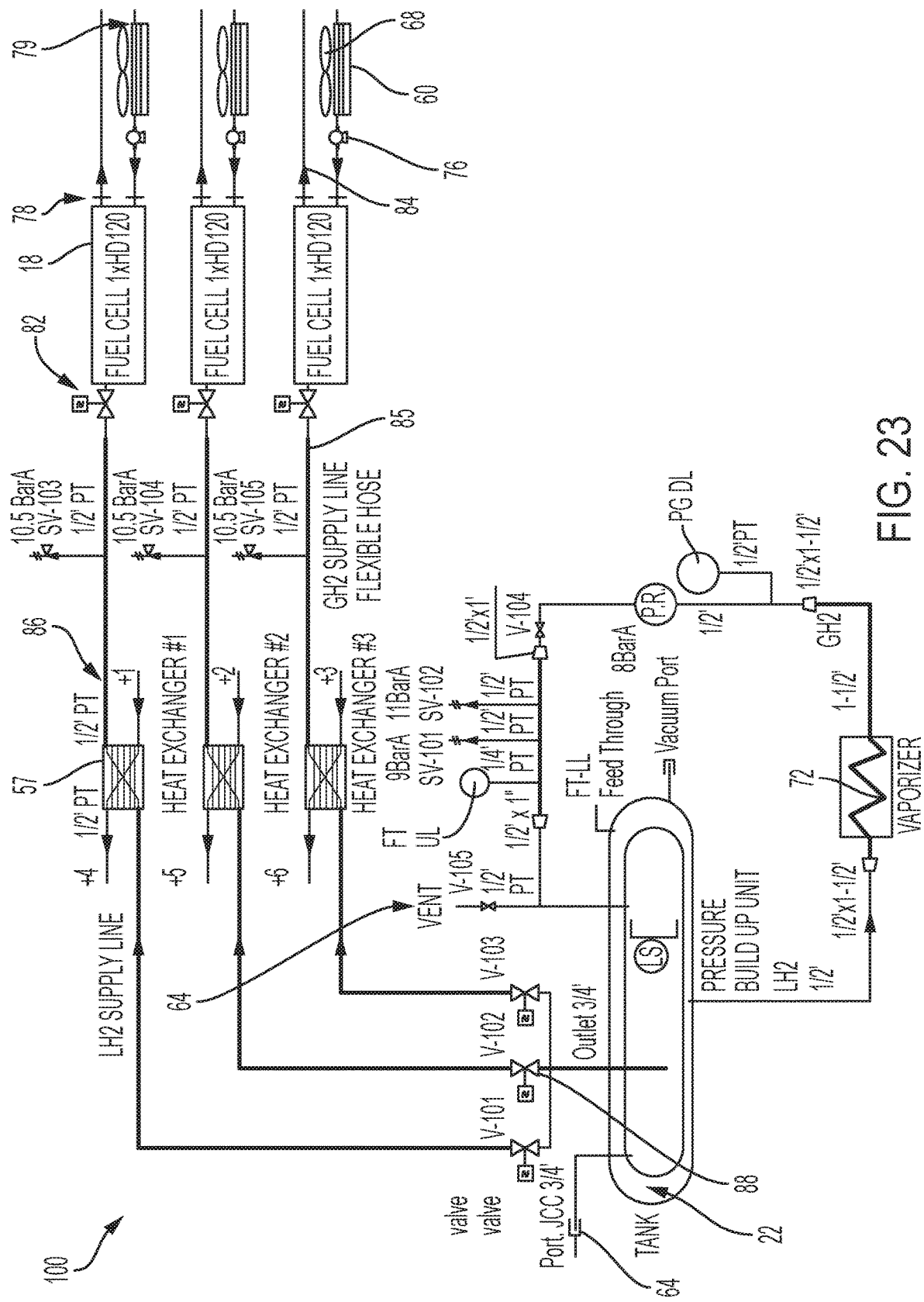
FIG. 23 depicts an example diagram of the fuel tank, fuel cell, radiator, heat exchanger and air conditioning components and interrelated conduits for heat transfer among components.

FIG. 23 depicts an example diagram of the fuel tank 22, fuel cell, radiator 60, heat exchanger 57 and air conditioning components and interrelated conduits for heat transfer among components. In one embodiment, the cooling system comprises five (5) heat exchangers 57 configured for fuel cell modules 18, motors 28, motor controllers 24, and electronics cooling by heat transfer. Heat exchangers 57 each comprise tubes, unions 86 (LH2 Tank side), vacuum ports/feed through and vents 64. The vaporizer 72 may be interconnected by conduits 85, pipes 85 or tubes 85 to a heat exchanger 57, or may function as a heat exchanger 57 itself by contacting coolant conduits 84. In one embodiment, the heat exchangers 57 may further comprise lightweight aluminum heat exchangers 57. The invention uses compact fluid heat exchangers 57 that transfer energy/heat from one fluid to another more efficiently by implementing different principles related to thermal conductivity, thermodynamics and fluid dynamics. This fluid heat exchanger 57 uses the warm and/or hot fluid normally flowing inside a coolant conduit 84 and fuel lines 85. Heat energy is transferred by convection from the fluid (coolant 31) in the coolant conduit 84 as it flows through the system, wherein the moving fluid contacts the inner wall of the fluid conduit/coolant conduit 84 with a surface of a different temperature and the motion of molecules establishes a heat transfer per unit surface through convection. Then in thermal conduction heat spontaneously flows from a hotter to a colder body and so heat energy is transferred from the warmer fluid conduit/coolant conduit 84 to the cooler fuel flow tubes 85/fuel conduits 85/fuel lines 85 over the areas of physical contact between the two components within the heat exchanger 57 body. Heat energy is then transferred by convection again from the inner wall of the inflow tubes 85/fuel conduits 85/fuel lines 85 to fluid in the fuel line 85 flowing by contacting the surface area of the inner wall of the fuel flow tubes 85/fuel conduits 85/fuel lines 85. Heat exchangers 57 may be of three standard flow classifications including: parallel-flow (two mediums enter the heat exchanger 57 at the same end and travel parallel to one another and flow in the same direction); counter-flow (two mediums enter the heat exchanger 57 at opposite ends and flow in different directions); and cross-flow (two mediums travel perpendicular to one another through the heat exchanger 57). Heat exchangers 57 may be shell and tube, plate, fin, spiral and combinations of said types. A shell and tube heat exchanger 57 contains a shell or large pressure vessel with a bundle of tubes inside it. One fluid flows through the shell surrounding the tubes and another fluid flows through the tubes to transfer heat between the two fluids. A plate heat exchanger 57 contains metal plates that have a larger surface area to spread the fluids over a wider area for faster heat transfer between the two fluids. A fin heat exchanger 57 uses multiple layers of corrugated material to transfer heat between fluids. A spiral heat exchanger 57 is a coiled or helical tube design that is parallel to each other with two fluids flowing in a counter current flow. The heat exchanger 57 body, tubes, pipes, lines and conduits may include a first conductive material that may be comprised of one of copper, stainless steel, and alloys and combinations thereof, and the second conductive material that also may be comprised of copper, stainless steel, and alloys and combinations thereof. The first open end a fluid heat exchanger 57 may be connected to, and in fluid communication with, a coolant conduit 84, that empties into, or is otherwise connected to the first end of the fluid heat exchanger 57, using any known method of connecting pipes, including but not limited to pipe fittings 86 or threading and connections 86 such as brazing, welding or soldering. The second open end is connected to, and in fluid communication with, a second coolant conduit 84 that transports fluids (coolant 31) to other subsystems including the power generation subsystem 600 (and e.g. fuel cell modules 18, battery cells 27, or controllers therein), the external temperature zone 54, and in particular, the radiator 60, using any known method of connecting pipes. The third open end of the fluid heat exchanger 57 may be connected to, and in fluid communication with, inflow tubes 85/fuel conduits 85/fuel lines 85. The fourth open end of the fluid heat exchanger 57, which may be the other open end of a fluid inflow tube, is connected to, and in fluid communication with, inflow tubes 85/fuel conduits 85/fuel lines 85, using any known method of connecting pipes, such that the fluid heat exchanger 57 may replace a section of fluid conduits, coolant conduits 84, pipes, fuel lines 85 flowing into or out of the fuel supply subsystem 900, power generation subsystem 600, internal temperature zone 52, or external temperature zone 54, recapturing heat from fluids flowing through the exchanger and transferring that heat to incoming fluids flowing through the exchanger.

Figure 24:
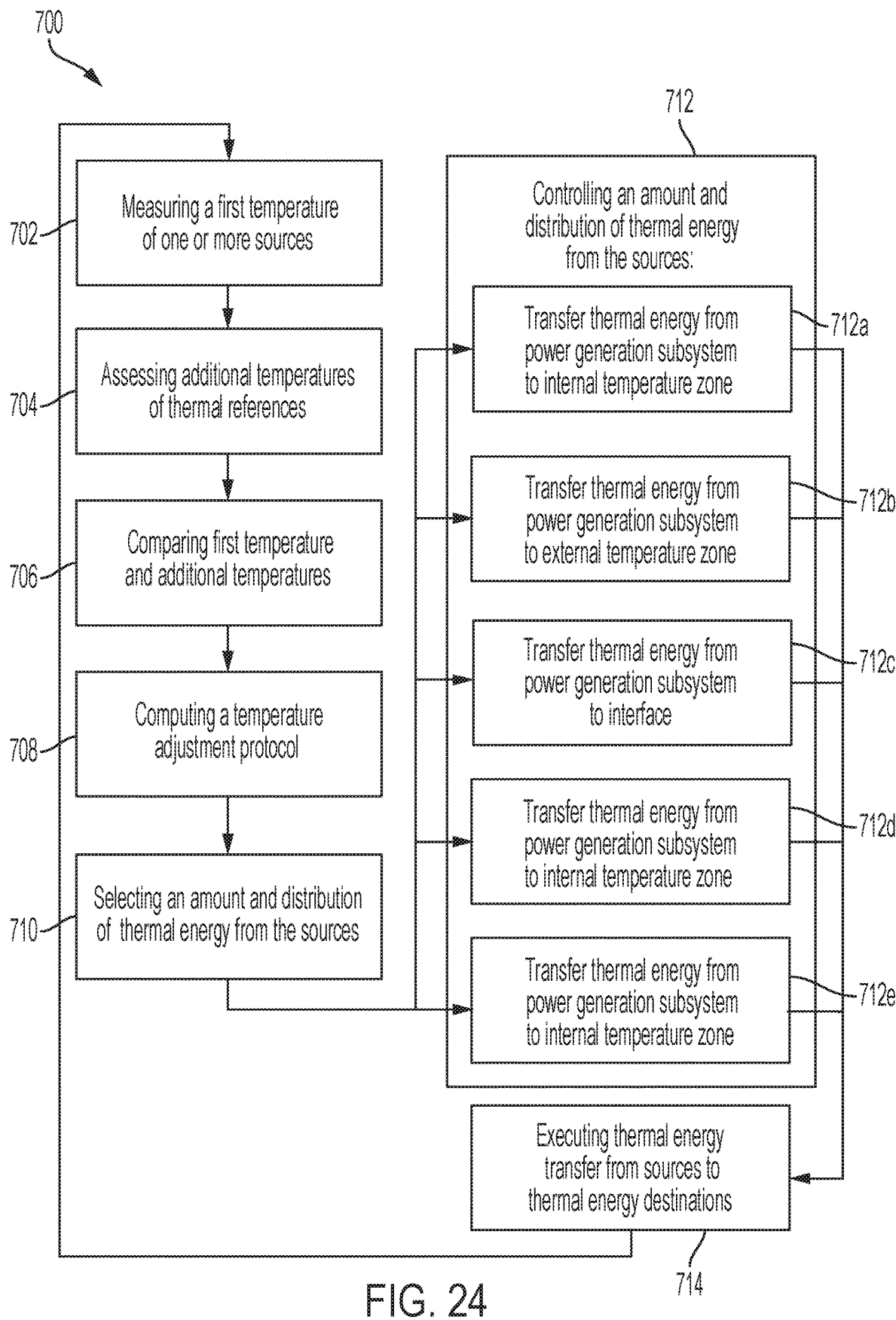
FIG. 24 depicts a flow chart that illustrates the present invention in accordance with one example embodiment.

FIG. 24 depicts a flow chart that illustrates the present invention in accordance with one example embodiment of a method 700 for managing thermal energy in a multirotor aircraft 1000. The method 700 comprises: measuring, using one or more temperature sensing devices or thermal energy sensing devices, thermodynamic operating conditions in a multirotor aircraft 1000 that in turn comprise at Step 702 a first temperature corresponding to one or more sources of thermal energy, and Step 704 one or more additional temperatures corresponding to thermal references. The method steps further comprise at Step 706 comparing, using an autopilot control unit or a computer processor, at least the first temperature and the one or more additional temperatures corresponding to thermal references to calculate a comparison result. At Step 708 the method computes, using an autopilot control unit or a computer processor and an algorithm based on the comparison result, a temperature adjustment protocol comprising one or more priorities for energy transfer. Temperature adjustment protocol priorities may be predefined according to specifications or may be dynamically calculated and adjusted based on present operating conditions. The control unit or processor performs, at Step 710 selecting and Step 712 controlling, based on the temperature adjustment protocol, an amount and distribution of thermal energy transfer from the one or more sources, wherein the distribution of thermal energy comprises one or more thermal energy destinations; and at Step 714 executes thermal energy transfer from the one or more sources to the one or more thermal energy destinations using an integrated system 100 for multimode thermal energy transfer. The one or more sources and the one or more thermal energy destinations may each selected from the group consisting of a power generation subsystem 600, a fuel supply subsystem 900, a thermal energy interface, an internal temperature zone 52, and an external temperature zone 54. For example, in one instance the internal temperature zone 52 may serve as a source, but in another instance may serve as one of a plurality of thermal energy destinations. Additionally, the one or more thermal references comprise one or more references selected from the group consisting of alternative components, alternative zones, operating parameters, warning parameters, equipment settings, occupant control settings and external reference information. For example, a thermal reference may be a maximum coolant temperature or a fuel cell maximum safe operating temperature as specified by a manufacturer. Thermal references and other parameters may not be limited to specific subsystems but may extend to individual components of subsystems, for example the operating temperatures of individual fuel cells 18, fuel cell modules 18, or motor controllers 24. Similarly, the integrated system 100 may target specific or individual components as sources or thermal energy destinations, which may serve to correct or resolve specific issues or malfunctions. The power generation subsystem 600 comprises one or more components selected from the group consisting of: one or more fuel cell modules 18 configured to supply electrical voltage and current configured to supply electrical voltage and current, one or more battery cells 27, one or more motor controllers 24, one or more motors 28, one or more circuit boards, one or more processors and one or more electronic components. All of these components may be treated together as the source, or they may be measured and incorporated into a heat transfer relationship or protocol individually (as seen in FIG. 5 wherein the temperatures are displayed for review using an interface to an ADSB or Remote ID unit with respect to individual fuel cells). The autopilot control unit computer processor performs selecting and controlling, of entire subsystems or individual components thereof, an amount and distribution of thermal energy transfer based on the temperature adjustment protocol, which may provide ranks, orders or timing for transferring heat or thermal energy, proportions, percentages or ratios for transferring heat or thermal energy, dependencies for transferring heat or thermal energy, or combinations thereof. The amount and distribution of thermal energy transfer from the one or more sources may include: at Step 712a from the one or more sources comprising the power generation subsystem 600, to the one or more thermal energy destinations comprising the internal temperature zone 52, using HVAC subsystems 61; at Step 712b from the one or more sources comprising the power generation subsystem 600, to the one or more thermal energy destinations comprising the external temperature zone 54, using at least the at least one radiator 60 or the one or more exhaust ports 66; at Step 712c from the one or more sources comprising the power generation subsystem 600, to the one or more thermal energy destinations comprising the fuel supply subsystem 900, using the thermal energy interface subsystem 56 comprising the heat exchanger 57 or a vaporizer 72;

at Step 712d from the one or more sources comprising the internal temperature zone 52, to the one or more thermal energy destinations comprising the fuel supply subsystem 900, using the HVAC subsystems 61 and thereby reducing temperature in the internal temperature zone 52; at Step 712e from the one or more sources comprising the external temperature zone 54, to the one or more thermal energy destinations comprising the fuel supply subsystem 900, using one or more vents 64; and combinations thereof.

The executing thermal energy transfer from the power generation subsystem 600 to the one or more thermal energy destinations, using the autopilot control units computer processors, may comprise using a fluid in fluid communication with a component of the power generation subsystem 600 to transport heat or thermal energy to a different location corresponding to a thermal energy destination, thereby reducing the temperature or excess thermal energy of the one or more sources. To accomplish this the processor selects a source and thermal energy destination pair, and retrieves stored routing data for the pair, then activates, actuates, or adjusts the appropriate valves 88, regulators, conduits, and components to send a working fluid through the aircraft 1000 directing the flow of fluid from the source to the one or more thermal energy destinations. In some instances, the fluid transfer may not be needed due to proximity, where physical contact between source and thermal energy destination can be initiated or adjusted directly to perform thermal energy transfer. For example, if the temperature adjustment protocol indicates a fuel cell module 18 requires dissipation and transfer of waste heat, the processor may select the fuel supply subsystem 900 as a thermal energy destination, and the processor will actuate the coolant pump 76 and appropriate valves 88 in fluid communication with the coolant conduits 84 connected to and in fluid communication with that fuel cell module 18, so that coolant 31 is moved from the fuel cell module 18, through the coolant conduits 84 and piping 84 along a route that leads to a heat exchanger 57, and in turn similarly actuates pumps and valves 88 in the fuel lines 85, such that coolant 31 and fuel 30 flow through separate conduits of the processor activated heat exchanger 57 simultaneously and heat or thermal energy is transferred from the hotter coolant 31, across the conduits, walls and body of the heat exchanger 57, and into the colder fuel 30, thereby reducing the temperature of the fuel cell module 18 source and increasing the temperature of the fuel 30, or more generally the fuel supply subsystem 900. The executing thermal energy transfer from the one or more sources to the one or more thermal energy destinations may further comprise diverting fluid flow of the fuel 30 or the coolant 31 using valves 88 and coolant pumps 76, wherein the coolant 31 may comprise water and additives (such as anti-freeze). As the processors continue to measure the fuel cell module 18, processors may divert flow to other thermal energy destinations or reduce flow to the heat exchanger 57 or stop flow to the heat exchanger 57 and redirect the flow to a different thermal energy destination. Multiple processors may work together to perform different functions to accomplish energy transfer tasks. The integrated system 100 iteratively or continuously measures the components, zones and subsystems to constantly adjust energy transfer and temperature performance of the aircraft 1000 to meet design and operating condition parameters. Measuring, using one or more temperature sensing devices or thermal energy sensing devices, thermodynamic operating conditions in a multirotor aircraft 1000 comprising a first temperature corresponding to a source of thermal energy and one or more additional temperatures corresponding to thermal references further comprise measuring one or more selected from the group consisting of a fuel temperature, a fuel tank temperature, fuel cell or fuel cell module temperatures, battery temperatures, motor controller temperatures, a coolant temperature or peak controller temperature, motor temperatures, or peak motor temperature or aggregated motor temperature, radiator 60 temperatures, a cabin temperature, and an outside-air temperature.

The temperature adjustment protocols may be computed by the example method 700 and integrated system 100 using autopilot control units or computer processor and an algorithm based on the comparison result. Such a temperature adjustment protocol may comprise: determining whether the power generation subsystem 600 has a higher temperature than the internal temperature zone 52 set temperature, and determining whether the internal set temperature exceeds a set maximum temperature; determining whether the power generation subsystem 600 has a higher temperature than an interface set temperature and determining whether the thermal energy interface subsystem 56 temperature exceeds an interface maximum temperature; determining whether the power generation subsystem 600 has a higher temperature than the external temperature zone 54; determining whether the external temperature zone 54 has a higher temperature than the fuel supply subsystem 900; and determining a priority ranking of thermal destinations based on each determination. The selecting and controlling, based on the temperature adjustment protocol, of an amount and distribution of thermal energy transfer from the one or more sources further comprises ordering the one or more thermal energy destinations, selecting and controlling, based on the temperature adjustment protocol, an amount and distribution of thermal energy transfer from the one or more sources further comprises: determining a difference between temperatures of the power generation subsystem 600 and the internal temperature zone 52; determining a difference between temperatures of the power generation subsystem 600 and the external temperature zone 54; determining a difference between temperatures of the power generation subsystem 600 and the fuel supply subsystem 900; determining a difference between temperatures of the fuel supply subsystem 900 and the internal temperature zone 52; determining a difference between temperatures of the external temperature zone 54 and the fuel supply subsystem 900; and adjusting the amount and distribution based on each positive absolute value difference between source and destination, not exceeding a maximum, to allocate proportionately to each of the one or more thermal destinations based on respective temperature difference. The processor interrogates the system to determine the answer to a series of questions that determine subsequent calculations, computations, priorities, protocols, and allocations. For example, is power generation subsystem 600 hotter than internal temperature zone 52 set temperature? Is internal temperature zone 52 above set maximum temp? Is power generation subsystem 600 hotter than interface set temp? Is power generation subsystem 600 hotter than interface max temp? Is internal temperature zone 52 hotter than external temperature zone 54? Is power generation subsystem 600 hotter than external temperature zone 54? Is internal temperature zone 52 hotter than fuel supply subsystem 900? Is internal temperature zone 52 cooler than set minimum? Is external temperature zone 54 hotter than fuel supply subsystem 900? For example, if the temperature difference between the exterior temperature zone and power generation subsystem 600 is negligible, but the temperature difference between the power generation subsystem 600 and the fuel supply subsystem 900 remains large, then transfer from the pair of the power generation subsystem 600 source to the fuel supply subsystem 900 thermal energy destination will receive higher priority than the pair of power generation subsystem 600 and external temperature zone 54, based on the relative or absolute differences in source-destination relationships.

Considering the components of potential sources and destinations, the internal temperature zone 52 may further comprise an internal temperature outlet corresponding to a cabin environment designed to contain one or more pilots or passengers and the HVAC subsystems 61 that further comprise a cabin temperature sensor, ducts 81 in fluid communication with one or more fans 68 controlling distribution of a secondary working fluid, and at least one air conditioning unit 62 comprising a condenser, evaporator, expansion valve 88, capillary tube, compressor or work-extracting device such as a turbine, conduits, in fluid communication with each other, and acting on the secondary working fluid (air) external to the air conditioning unit 62. In this way, the aircraft 1000 cabin or subzone temperatures may be adjusted by passengers such that when cabin temperature exceeds operating temperature the internal temperature zone 52 may serve as a source and the fuel supply subsystem 900 may serve as a thermal energy destination, to execute a heat transfer that uses an air conditioning unit 62 and fan 68 to lower cabin temperature and increase fuel or fuel supply subsystem 900 temperature, thereby efficiently adjusting multiple subsystems for improved performance without consuming additional energy. Using stored low enthalpy states of liquid hydrogen fuel 30 that is warmed to convert it to gas for use in the fuel cell modules 18 to cool waste heat from the fuel cell modules 18 and also the cabin in summer/warm months is more efficient than using separate air conditioning. Likewise, the waste heat from fuel cells can be used to heat the cabin in winter/cold months without needing to add devices or consume additional resources on heating units. Similarly, the external temperature zone 54 may further comprise an external temperature outlet, comprising an exhaust port 66 or a vent 64 that may be linked to one or more radiators 60 and one or more fans 68. A processor may set the exterior temperature zone as a thermal energy destination for a fuel cell module 18 source, but if the radiator 60 or coolant temperature begins to exceed normal or safe operating limit temperatures, the processor may then readjust the temperature distribution protocol and priorities, actuating additional coolant 31 flow to a heat exchanger 57 to add the fuel supply subsystem 900 as an additional thermal energy destination, thereby reducing the cooling load required of the radiator 60 and further reducing the temperature of the fuel cell module 18 source to bring that source to an improved operating temperature.

The thermal interface of the thermal energy/temperature exchange subsystem is important for interconnecting multiple subsystems and components located far apart on the aircraft 1000 and facilitating the use of working fluids to transport heat and thermal energy for transfer to various destinations. The thermal interface further comprises one or more heat exchangers 57 configured to transfer heat or thermal energy from the coolant 31 supplied by coolant conduits 84 in fluid communication with the one or more heat exchangers 57, across heat exchanger 57 walls and heat exchanger 57 surfaces, to the fuel 30 supplied by fuel lines 85 in fluid communication with the one or more heat exchangers 57, using thermodynamics including conduction, wherein the coolant 31 and the fuel 30 remain physically isolated from one another.

After executing thermal energy transfer from the one or more sources to the one or more thermal energy destinations, the example method repeats measuring, using one or more temperature sensing devices or thermal energy sensing devices, thermodynamic operating conditions in a multirotor aircraft 1000 comprising a first temperature corresponding to a source of thermal energy, and one or more additional temperatures corresponding to thermal references, and then performs comparing, computing, selecting and controlling, and executing steps using post-transfer data for the one or more sources and the one or more thermal energy destinations to iteratively manage thermodynamic operating conditions in the multirotor aircraft 1000.

The methods 700 and systems 100 described herein are not limited to a particular aircraft 1000 or hardware or software configuration, and may find applicability in many aircraft or operating environments. For example, the algorithms described herein can be implemented in hardware or software, or a combination thereof. The methods and systems can be implemented in one or more computer programs, where a computer program can be understood to include one or more processor executable instructions. The computer program(s) can execute on one or more programmable processors and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: a mission control tablet computer 36, mission planning software 34 program, throttle pedal, sidearm controller, yoke or control wheel, or other motion-indicating device capable of being accessed by a processor, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

The methods 700 and systems 100 described herein are not limited to a particular aircraft or hardware or software configuration, and may find applicability in many aircraft or operating environments. For example, the algorithms described herein can be implemented in hardware or software, or a combination of hardware and software. The methods and systems can be implemented in one or more computer programs, where a computer program can be understood to include one or more processor executable instructions. The computer program(s) can execute on one or more programmable processors and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: a mission control tablet computer 36, mission planning software 34 program, throttle pedal, sidearm controller, yoke or control wheel, or other motion-indicating device capable of being accessed by a processor as provided herein, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

As provided herein, the processor(s) can thus in some embodiments be embedded in three identical devices that can be operated independently in a networked or communicating environment, where the network can include, for example, a Local Area Network (LAN) such as Ethernet, or serial networks such as RS232 or CAN. The network(s) can be wired, wireless RF, or broadband, or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices to perform the necessary algorithms and determine the appropriate vehicle commands, and if implemented in three units, the three units can vote among themselves to arrive at a 2 out of 3 consensus for the actions to be taken. As would be appreciated by one skilled in the art, the voting can also be carried out using another number of units (e.g., one two, three, four, five, six, etc.). For example, the voting can use other system-state information to break any ties that may occur when an even number of units disagree, thus having the system arrive at a consensus that provides an acceptable level of safety for operations.

The device(s) or computer systems that integrate with the processor(s) for displaying presentations can include, for example, a personal computer with display, a workstation (e.g., Sun, HP), a personal digital assistant (PDA) or tablet such as an iPad, or another device capable of communicating with a processor(s) that can operate as provided herein. Accordingly, the devices provided herein are not exhaustive and are provided for illustration and not limitation.

References to "a processor" or "the processor" can be understood to include one or more processors that can communicate in a stand-alone and/or a distributed environment(s), and thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. References to a network, unless provided otherwise, can include one or more networks, intranets and/or the internet.

Although the methods and systems have been described relative to specific embodiments thereof, they are not so limited. For example, the methods and systems may be applied to a variety of multirotor vehicles having 6, 8, 10, 12, 14, 16, or more independent motor controllers 24 and motors 28, thus providing differing amounts of lift and thus payload and operational capabilities. The system may be operated under an operator's control, or it may be operated via network or datalink from the ground. The vehicle may be operated solely with the onboard battery cell 27 storage capacity, or it may have its capacity augmented by an onboard motor-generator or other recharging source, or it may even be operated at the end of a tether or umbilical cable for the purposes of providing energy to the craft. Many modifications and variations may become apparent in light of the above teachings and many additional changes in the details, materials, and arrangement of parts, herein described and illustrated, may be made by those skilled in the art.

What is claimed is:

1. An integrated system for multimode thermal energy transfer, the system comprising:
    a fuel supply subsystem comprising a fuel tank in fluid communication with one or more fuel cell modules and configured to store and transport a fuel;
    a thermal energy interface subsystem comprising a heat exchanger configured with a plurality of fluid conduits;
    a plurality of thermal energy reservoirs each configured to function as one of one or more sources or one of one or more thermal energy destinations, comprising:
        a power generation subsystem comprising at least one radiator in fluid communication with the one or more fuel cell modules, configured to store and transport a coolant;
        an internal temperature zone comprising heating, ventilation and air conditioning (HVAC) subsystems comprising ducts and a heating and air conditioning unit;
        an external temperature zone comprising one or more vents, one or more outlets, and one or more exhaust ports; and
        one or more temperature sensing devices or thermal energy sensing devices, configured to measure thermodynamic operating conditions; and
    at least two redundant autopilot control units that command a plurality of motor controllers and fluid control units with commands operating valves and pumps altering flows of fuel and coolant to different locations comprising the thermal energy destinations, wherein the at least two redundant autopilot control units communicate a voting process over a redundant network, each autopilot control unit comprising a computer processor configured to compute a temperature adjustment protocol comprising one or more priorities for energy transfer using one or more thermal references and an algorithm based on a comparison result of measured thermodynamic operating conditions, and configured to select and control, based on the temperature adjustment protocol, an amount and distribution of thermal energy transfer from the one or more sources designated by the at least two autopilot control units to the one or more thermal energy destinations designated by the autopilot control unit, thereby creating a temperature change in both the one or more sources and the one or more thermal energy destinations through the thermal energy transfer.

2. The integrated system of claim 1, wherein measuring thermodynamic operating conditions comprises measuring a first temperature corresponding to one or more sources of thermal energy and assessing one or more additional temperatures corresponding to thermal references, and wherein the one or more thermal references comprise one or more references selected from the group consisting of operating parameters, warning parameters, equipment settings, occupant control settings, alternative components, alternative zones, temperature sensors, and external reference information.

3. The integrated system of claim 1, wherein the one or more sources are selected from the group consisting of the power generation subsystem, the internal temperature zone, the external temperature zone, and the fuel supply subsystem.

4. The integrated system of claim 1, wherein the one or more thermal energy destinations are selected from the group consisting of the power generation subsystem, the internal temperature zone, the external temperature zone, and the fuel supply subsystem.

5. The integrated system of claim 1, wherein the autopilot control unit or a computer processor are further configured to compute, select and control, based on the temperature adjustment protocol, an amount and distribution of thermal energy transfer including:
   from the one or more sources comprising the power generation subsystem, to the one or more thermal energy destinations comprising the internal temperature zone, using HVAC subsystems;
   from the one or more sources comprising the power generation subsystem, to the one or more thermal energy destinations comprising the external temperature zone, using at least the at least one radiator or the one or more exhaust ports;
   from the one or more sources comprising the power generation subsystem, to the one or more thermal energy destinations comprising the fuel supply subsystem, using the thermal energy interface subsystem comprising the heat exchanger or a vaporizer;
   from the one or more sources comprising the internal temperature zone, to the one or more thermal energy destinations comprising the fuel supply subsystem, using the HVAC subsystems and thereby reducing temperature in the internal temperature zone;
   from the one or more sources comprising the external temperature zone, to the one or more thermal energy destinations comprising the fuel supply subsystem, using one or more vents; and
   combinations thereof.

6. The integrated system of claim 1, wherein the fuel supply subsystem further comprises the fuel tank in fluid communication with one or more fuel cells, configured to store and transport a fuel selected from the group consisting of gaseous hydrogen (GH2), liquid hydrogen (LH2), liquefied petroleum gas (LPG), wherein fuel supply subsystem further comprises fuel lines, refueling connections for charging, one or more vents, one or more valves, one or more pressure regulators, vaporizer, unions and the heat exchanger, each in fluid communication with the fuel tank, and wherein the one or more temperature sensing devices or thermal safety sensors monitor temperatures and concentrations of gases in the fuel supply subsystem, and also comprise one or more pressure gauges, one or more level sensors, one or more vacuum gauges, and one or more temperature sensors.

7. The integrated system of claim 1, wherein the fuel tank further comprises a titanium, polymer, stainless steel or carbon fiber epoxy shell, a plastic, polymer, or stainless steel liner, a titanium, polymer, carbon-fiber or stainless steel inner tank, insulation material between both tanks, an expansion means to expand liquid to gaseous form, optional tank mounting provisions, plumbing provisions, drop protection, and provisions for maintaining a reduced pressure partial or near-total vacuum between inner and outer tanks, and is configured to use a working fluid of hydrogen as the fuel.

8. The integrated system of claim 7, wherein the fuel tank further comprises a boss comprising 316L stainless steel, with a liner material comprising high-density polyethylene (HDPE), and the fuel tank is configured to use a working fluid of hydrogen at an operating pressure of 70 MPa, and a proof pressure of 105 Mpa, with a cylinder external diameter of 530 mm, an external length of 2154 mm, a water volume of 244 L, and a weight of 186 kg.

9. The integrated system of claim 1, wherein the power generation subsystem further comprises:
   one or more fuel cell modules supplying voltage and current to a plurality of motor controllers configured to control a plurality of motor and propeller assemblies;
   zero, one or more battery arrays;
   one or more circuit boards;
   one or more processors;
   one or more memory;
   one or more electronic components, electrical connections, electrical wires; and
   one or more diode or field-effect transistors (FET, IGBT or SiC) providing isolation between each electrical source and an electrical main bus.

10. The integrated system of claim 9, wherein the plurality of motor controllers are high-voltage, high-current air-cooled or liquid-cooled controllers.

11. The integrated system of claim 1, wherein the one or more fuel cell modules further comprise air filters, blowers, airflow meters, a fuel delivery assembly, a recirculation pump, a coolant pump, fuel cell controls, sensors, an end plate, at least one gas diffusion layer, at least one membrane electrolyte assembly, at least one flowfield plate, coolant conduits, connections, a hydrogen inlet, a coolant inlet, a coolant outlet, one or more air-driven turbochargers or superchargers supplying air to the one or more fuel cell modules, and coolant conduits connected to and in fluid communication with the one or more fuel cell modules and transporting coolant.

12. The integrated system of claim 1, wherein the one or more fuel cell modules further comprises one or more hydrogen-powered fuel-cells, where each hydrogen-powered fuel-cell is fueled by gaseous hydrogen (GH2) extracted from liquid hydrogen (LH2) stored at LH2 temperatures and wherein the one or more fuel cell modules combines hydrogen from the fuel tank with oxygen in the air to supply electrical voltage and current.

13. The integrated system of claim 12, wherein the fuel tank further comprises an inner tank and an outer tank, an insulating wrap, a vacuum between the inner tank and the outer tank, thereby creating an operating pressure of approximately 10 bar, or 140 psi.

14. The integrated system of claim 1, wherein using the thermal energy interface subsystem comprising the heat exchanger or a vaporizer, configured to connect to a first fluid conduit in connection with and in fluid communication the fuel supply subsystem comprising the fuel, and a second conduit in connection with and in fluid communication with the internal temperature zone comprising the (HVAC) subsystems comprising ducts and an air conditioning unit or a cabin cooling subsystem comprising the coolant, wherein thermal energy is transferred from the coolant, across a conducting interface by conduction, and to the fuel, thereby warming the fuel and cooling the coolant, and wherein the one or more temperature sensing devices or thermal energy sensing devices further comprises a fuel temperature sensor and a coolant temperature sensor.

15. The integrated system of claim 1, further comprising:
   an electrical power-system configured to supply electrical voltage and current to a plurality of motor and propeller assemblies being controlled by a plurality of motor controllers of a multirotor aircraft;

a power distribution monitoring and control subsystem for monitoring and controlling distribution of the supplied electrical voltage and current to the plurality of motor controllers and an avionics subsystem, wherein the plurality of motor controllers are commanded by one or more autopilot control units, where the one or more autopilot control units control electrical voltage and torque or current for each of the plurality of motor and propeller assemblies;

a mission planning computer comprising software, with wired or wireless (RF) connections to the one or more autopilot control units;

a wirelessly connected or wire-connected Automatic Dependent Surveillance-Broadcast (ADSB) or Remote ID unit providing the software with collision avoidance, traffic, emergency detection and weather information to and from the multirotor aircraft;

the one or more autopilot control units comprising a computer and input/output interfaces comprising at least one of interface selected from serial RS232, Controller Area Network (CAN), Ethernet, analog voltage inputs, analog voltage outputs, pulse-width-modulated outputs for motor control, an embedded or stand-alone air data computer, an embedded or stand-alone inertial measurement device, and one or more cross-communication channels or networks;

a DC-DC converter or starter/alternator configured to down-shift at least a portion of a primary voltage of the multirotor aircraft system to a standard voltage comprising one or more of the group consisting of 12V, 24V, 28V, or other standard voltage for avionics and non-motor purposes, with a battery of corresponding voltage to provide local current storage;

a means of combining pitch, roll, yaw, throttle, and other desired information onto a serial line, in such a way that multiple channels of command data pass to the one or more autopilot control units over the serial line, where control information is packaged in a plurality of frames that repeat at a periodic or aperiodic rate; and the one or more autopilot control units operating control algorithms generating commands to each of the plurality of motor controllers, managing and maintaining multirotor aircraft stability, and monitoring feedback.

16. The integrated system of claim 15, wherein the ADSB or Remote ID unit is operable to:

receive broadcast data from nearby aircraft and broadcast position data of the multirotor aircraft system to the nearby aircraft to provide the nearby aircraft with the position information to avoid potential collisions;

receive and display weather data on an avionics display system;

transmit desired state information to the one or more autopilot control units that is then used to determine an action or command to avoid collisions with the nearby aircraft or initiate emergency procedures;

perform calculations for flight path optimization, collision avoidance, threat detection and emergency procedures based upon a state of the multirotor aircraft including thermodynamic operating conditions and thermal references, states of the nearby aircraft, safety of on-board passengers, and available flight path dynamics pursuant to a presiding airspace system overseeing aircraft flight and flight resources; and use redundant attitude-based flight control, redundant computers, redundant motor control, and at least one voter to prevent deviation from a multirotor aircraft safety envelope;

wherein when the calculations indicate an uncorrectable state comprising one or more of: exceeding the multirotor aircraft safety envelope, exceeding operational parameters, detecting loss of control, measuring loss of stability, inability to maintain safety of occupants, inability to maintain flight-worthiness and function of the multirotor aircraft, then the system, using avionics and electronics for automated control of the multirotor aircraft, performs emergency procedures comprising initiation of means to safely descend in an emergency comprising at least activation of a ballistic airframe parachute deployed between the plurality of motor and propeller assemblies to suspend the multirotor aircraft and/or counter gravitational force to slow descent back to ground without interfering with the plurality of motor and propeller assemblies or endangering occupants of the multirotor aircraft.

17. The integrated system of claim 1, wherein the one or more temperature sensing devices or thermal safety sensors monitor temperatures and concentrations of gases in the fuel supply subsystem, further comprise the one or more fuel cell modules and a plurality of motor controllers, each configured to self-measure and report temperature and other parameters using a CAN bus to inform the autopilot control unit as to a valve, pump or combination thereof to enable to increase or decrease cooling using fluids wherein thermal energy is transferred from the coolant, and wherein heat exchangers warm LH2, and separate radiators dissipate waste heat, where both heat exchangers and radiators sources of cold and hot, thereby creating a temperature change in both the one or more sources and the one or more thermal energy destinations through the thermal energy transfer, for cabin environmental processes in the internal temperature zone using the HVAC subsystems comprising ducts and an air conditioning unit.

18. The integrated system of claim 1, wherein the HVAC subsystems further comprise one or more cabin temperature sensors, ducts in fluid communication with one or more fans controlling distribution of a secondary working fluid, ducts in fluid communication with a heat exchanger related to liquid hydrogen or other cold stored fuel, and at least one air conditioning unit comprising of a condenser, expansion valve, evaporator, compressor, conduits, in fluid communication with each other, and acting on the secondary working fluid external to the air conditioning unit.

19. A method for managing thermal energy in a multirotor aircraft, the method comprising:

measuring, using one or more temperature sensing devices or thermal energy sensing devices, thermodynamic operating conditions in a multirotor aircraft comprising:
a first temperature corresponding to one or more sources of thermal energy;
one or more additional temperatures corresponding to thermal references;

comparing, using at least two redundant autopilot control units that command a plurality of motor controllers and fluid control units with commands operating valves and pumps altering flows of fuel and coolant to different locations comprising the thermal energy destinations, wherein the at least two redundant autopilot control units communicate a voting process over a redundant network, at least the first temperature and the one or more additional temperatures corresponding to thermal references to calculate a comparison result;

computing, using the at least two redundant autopilot control units and an algorithm based on the comparison result, a temperature adjustment protocol comprising one or more priorities for energy transfer;

selecting and controlling, based on the temperature adjustment protocol, an amount and distribution of thermal energy transfer from the one or more sources designated by the at least two autopilot control units, wherein the distribution of thermal energy comprises one or more thermal energy destinations designated by the autopilot control unit; and executing thermal energy transfer from the one or more sources to the one or more thermal energy destinations using an integrated system for multimode thermal energy transfer, thereby creating a temperature change in both the one or more sources and the one or more thermal energy destinations through the thermal energy transfer.

20. The method of claim 19, wherein the one or more thermal references comprise one or more references selected from the group consisting of alternative components, alternative zones, operating parameters, warning parameters, equipment settings, occupant control settings and external reference information.

21. The method of claim 19, wherein the one or more sources and the one or more thermal energy destinations are each selected from the group consisting of a power generation subsystem, a fuel supply subsystem, a thermal energy interface, an internal temperature zone, and an external temperature zone.

22. The method of claim 21, wherein the power generation subsystem comprises one or more components selected from the group consisting of: one or more fuel cell modules configured to supply electrical voltage and current configured to supply electrical voltage and current, one or more battery arrays, one or more motor controllers, one or more motors, one or more circuit boards, one or more processors and one or more electronic components.

23. The method of claim 21, wherein the autopilot control unit computer processor performs selecting and controlling, based on the temperature adjustment protocol, an amount and distribution of thermal energy transfer from the one or more sources including:

from the one or more sources comprising the power generation subsystem, to the one or more thermal energy destinations comprising the internal temperature zone, using HVAC subsystems;

from the one or more sources comprising the power generation subsystem, to the one or more thermal energy destinations comprising the external temperature zone, using at least the at least one radiator or one or more exhaust ports;

from the one or more sources comprising the power generation subsystem, to the one or more thermal energy destinations comprising the fuel supply subsystem, using the thermal energy interface subsystem comprising a heat exchanger or a vaporizer;

from the one or more sources comprising the internal temperature zone, to the one or more thermal energy destinations comprising the fuel supply subsystem, using the HVAC subsystems and thereby reducing temperature in the internal temperature zone;

from the one or more sources comprising the external temperature zone, to the one or more thermal energy destinations comprising the fuel supply subsystem, using one or more vents; and combinations thereof.

24. The method of claim 21, wherein the executing thermal energy transfer from the power generation subsystem to the one or more thermal energy destinations comprises, using a fluid in fluid communication with a component of the power generation subsystem to transport heat or thermal energy to a different location corresponding to a thermal energy destination, thereby reducing the temperature or excess thermal energy of the one or more sources.

25. The method of claim 19, wherein the measuring, using one or more temperature sensing devices or thermal energy sensing devices, thermodynamic operating conditions in a multirotor aircraft comprising a first temperature corresponding to a source of thermal energy and one or more additional temperatures corresponding to thermal references further comprise measuring one or more selected from a group consisting of a fuel temperature, a fuel tank temperature, a fuel cell temperature, a battery temperature, a motor controller temperature, a coolant temperature, a radiator temperature, a cabin temperature, and an outside-air temperature.

26. The method of claim 19, wherein the temperatures are displayed for review using an interface to an ADSB or Remote ID unit or vehicle display system.

27. The method of claim 21, wherein the computing, using an autopilot control unit or a computer processor and an algorithm based on the comparison result, a temperature adjustment protocol comprises:

determining whether the power generation subsystem has a higher temperature than the internal temperature zone set temperature, and determining whether the internal set temperature exceeds a set maximum temperature;

determining whether the power generation subsystem has a higher temperature than an interface set temperature and determining whether the thermal energy interface subsystem temperature exceeds an interface maximum temperature;

determining whether the power generation subsystem has a higher temperature than the external temperature zone;

determining whether the external temperature zone has a higher temperature than the fuel supply subsystem; and determining a priority ranking of thermal destinations based on each determination.

28. The method of claim 21, wherein the selecting and controlling, based on the temperature adjustment protocol, an amount and distribution of thermal energy transfer from the one or more sources further comprises ordering the one or more thermal energy destinations, selecting and controlling, based on the temperature adjustment protocol, an amount and distribution of thermal energy transfer from the one or more sources further comprises:

determining a difference between temperatures of the power generation subsystem and the internal temperature zone;

determining a difference between temperatures of the power generation subsystem and the external temperature zone;

determining a difference between temperatures of the power generation subsystem and the fuel supply subsystem;

determining a difference between temperatures of the fuel supply subsystem and the internal temperature zone;

determining a difference between temperatures of the external temperature zone and the fuel supply subsystem; and adjusting the amount and distribution based on each positive difference not exceeding a maximum to allocate proportionately to each of the one or more thermal destinations based on respective temperature difference.

29. The method of claim 21, wherein the internal temperature zone further comprises an internal temperature outlet corresponding to a cabin environment designed to contain one or more pilots or passengers and a HVAC subsystems that further comprise a cabin temperature sensor, ducts in fluid communication with one or more fans controlling distribution of a secondary working fluid, and at least one air conditioning unit comprising of a condenser, expansion valve, evaporator, compressor, conduits, in fluid communication with each other, and acting on the secondary working fluid external to the air conditioning unit.

30. The method of claim 21, wherein the external temperature zone further comprises an external temperature outlet, comprising an exhaust port or a vent.

31. The method of claim 21, wherein the thermal energy interface further comprises one or more heat exchangers configured to transfer heat or thermal energy from coolant supplied by coolant conduits in fluid communication with the one or more heat exchangers, across heat exchanger walls and heat exchanger surfaces, to the fuel supplied by fuel lines in fluid communication with the one or more heat exchangers, using thermodynamics including conduction, wherein the coolant and the fuel remain physically isolated from one another.

32. The method of claim 19, wherein the executing thermal energy transfer from the one or more sources to the one or more thermal energy destinations further comprises diverting fluid flow of fuel or coolant using valves and coolant pumps.

33. The method of claim 19, wherein after executing thermal energy transfer from the one or more sources to the one or more thermal energy destinations, the method repeats measuring, using one or more temperature sensing devices or thermal energy sensing devices, thermodynamic operating conditions in a multirotor aircraft comprising a first temperature corresponding to a source of thermal energy, and one or more additional temperatures corresponding to thermal references, and then performs comparing, computing, selecting and controlling, and executing steps using post-transfer data for the one or more sources and the one or more thermal energy destinations to iteratively manage thermodynamic operating conditions in the multirotor aircraft.

* * * * *

UNITED STATES PATENT AND TRADEMARK OFFICE
CERTIFICATE OF CORRECTION

PATENT NO. : 11,649,059 B2
APPLICATION NO. : 16/880732
DATED : May 16, 2023
INVENTOR(S) : Brian D. Morrison It is certified that error appears in the above-identified patent and that said Letters Patent is hereby corrected as shown below:

In the Claims

Claim 16, Column 49, Lines 51-52, delete "the position" and insert --position--

Claim 23, Column 51, Line 52, delete "using at least the at least" and insert --using at least--

Claim 26, Column 52, Line 25, delete "the temperatures" and insert --temperatures--

Signed and Sealed this
Twenty-second Day of August, 2023

Katherine Kelly Vidal
Director of the United States Patent and Trademark Office